United States Patent
Banerjee et al.

(10) Patent No.: US 11,783,428 B2
(45) Date of Patent: *Oct. 10, 2023

(54) AGENT-FACILITATED CLAIMS DAMAGE ESTIMATION

(71) Applicant: Allstate Insurance Company, Northbrook, IL (US)

(72) Inventors: Suchandra Banerjee, Northbrook, IL (US); Jennifer A. Brandmaier, Chicago, IL (US); Mark E. Faga, Evanston, IL (US); Robert H. Johnson, Hoffman Estates, IL (US); Clint J. Marlow, Barrington Hills, IL (US); Curtis Murphy, Northbrook, IL (US); Kurt M. Stricker, Northfield, IL (US); Josh Campbell, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,499

(22) Filed: Jun. 20, 2022

(65) Prior Publication Data

US 2022/0318923 A1 Oct. 6, 2022

Related U.S. Application Data

(63) Continuation of application No. 16/995,003, filed on Aug. 17, 2020, now Pat. No. 11,367,144, which is a
(Continued)

(51) Int. Cl.
*G06Q 40/08* (2012.01)

(52) U.S. Cl.
CPC .................................. *G06Q 40/08* (2013.01)

(58) Field of Classification Search
None
See application file for complete search history.

(56) References Cited

U.S. PATENT DOCUMENTS

| | | |
|---|---|---|
| 4,899,292 A | 2/1990 | Montagna et al. |
| 5,128,859 A | 7/1992 | Carbone et al. |
| (Continued) | | |

FOREIGN PATENT DOCUMENTS

| | | |
|---|---|---|
| CN | 1828336 A | 9/2006 |
| EP | 1 215 612 A1 | 6/2002 |
| (Continued) | | |

OTHER PUBLICATIONS

DiTullio, "How Can We Stop Insurers Writing Estimates from Photos?,"Body Shop Business, retrieved from https://www.bodyshopbusiness.com/readers-choice-how-can-we-stop-insurers-writing-estimates-from-photos/, 7 pages (2016).
(Continued)

*Primary Examiner* — Narayanswamy Subramanian
(74) *Attorney, Agent, or Firm* — Foley & Lardner LLP

(57) ABSTRACT

Systems and methods provide for an automated system for analyzing damage to process claims and pre-claim consultations associated with an insured item, such as a vehicle. An enhanced claims processing server may analyze damage associated with the insured item using photos/video transmitted to the server from a user device (e.g., a mobile device). The mobile device may receive feedback from the server regarding the acceptability of submitted photos/video, and if the server determines that any of the submitted photos/video is unacceptable, the mobile device may capture additional photos/video until all of the data are deemed acceptable. In addition, the server may interface with third
(Continued)

party entities such as repair shops and may generate a payment for compensating a claimant for repair of the insured item.

17 Claims, 26 Drawing Sheets

Related U.S. Application Data continuation of application No. 13/834,161, filed on Mar. 15, 2013, now Pat. No. 10,783,585, which is a continuation-in-part of application No. 13/587,620, filed on Aug. 16, 2012, now Pat. No. 8,510,196, and a continuation-in-part of application No. 13/587,630, filed on Aug. 16, 2012, now abandoned, and a continuation-in-part of application No. 13/587,635, filed on Aug. 16, 2012, now Pat. No. 10,430,885.

(56) References Cited

U.S. PATENT DOCUMENTS

| | | |
|---|---|---|
| 5,317,503 A | 5/1994 | Inoue |
| 5,432,904 A | 7/1995 | Wong |
| 5,504,674 A | 4/1996 | Chen et al. |
| 5,950,169 A | 9/1999 | Borghesi et al. |
| 6,141,611 A | 10/2000 | Mackey et al. |
| 6,185,540 B1 | 2/2001 | Schreitmueller et al. |
| 7,092,369 B2 | 8/2006 | Fuccello et al. |
| 7,197,444 B2 | 3/2007 | Bomar et al. |
| 7,203,654 B2 | 4/2007 | Menendez |
| 7,263,493 B1 | 8/2007 | Provost et al. |
| 7,324,951 B2 | 1/2008 | Renwick et al. |
| 7,346,523 B1 | 3/2008 | Provost et al. |
| 7,432,938 B1 | 10/2008 | Reuter et al. |
| 7,586,654 B2 | 9/2009 | Hoberock |
| 7,702,529 B2 | 4/2010 | Wahlbin et al. |
| 7,734,485 B1 | 6/2010 | Bohanek |
| 7,809,587 B2 | 10/2010 | Dorai et al. |
| 7,873,710 B2 | 1/2011 | Kiley et al. |
| 7,889,931 B2 | 2/2011 | Webb et al. |
| 7,953,615 B2 | 5/2011 | Aquila et al. |
| 7,962,485 B1 | 6/2011 | Trandal et al. |
| 8,005,720 B2 | 8/2011 | King et al. |
| 8,015,036 B1 | 9/2011 | Leisure |
| 8,019,629 B1 | 9/2011 | Medina et al. |
| 8,035,639 B2 | 10/2011 | Witte |
| 8,081,795 B2 | 12/2011 | Brown |
| 8,095,394 B2 | 1/2012 | Nowak et al. |
| 8,239,220 B2 | 8/2012 | Kidd et al. |
| 8,306,258 B2 | 11/2012 | Brown |
| 8,510,196 B1 | 8/2013 | Brandmaier et al. |
| 8,554,587 B1 | 10/2013 | Nowak et al. |
| 8,650,106 B1 | 2/2014 | Hopkins, III |
| 8,712,893 B1 | 4/2014 | Brandmaier et al. |
| 8,768,038 B1 | 7/2014 | Sherman et al. |
| 9,137,417 B2 | 9/2015 | Macciola et al. |
| 9,424,569 B1 | 8/2016 | Sherman et al. |
| 9,691,189 B1 | 6/2017 | Creath |
| 9,824,453 B1* | 11/2017 | Collins ................. G06V 20/20 |
| 9,846,915 B2 | 12/2017 | Howe et al. |
| 9,970,881 B1 | 5/2018 | Hillman et al. |
| 10,332,209 B1 | 6/2019 | Brandmaier et al. |
| 10,373,262 B1 | 8/2019 | Haller et al. |
| 10,373,387 B1 | 8/2019 | Fields et al. |
| 10,380,696 B1 | 8/2019 | Haller et al. |
| 10,430,885 B1 | 10/2019 | Brandmaier et al. |
| 10,430,886 B1 | 10/2019 | Brandmaier et al. |
| 10,572,944 B1 | 2/2020 | Brandmaier et al. |
| 10,573,012 B1 | 2/2020 | Collins et al. |
| 10,580,075 B1 | 3/2020 | Brandmaier et al. |
| 10,621,675 B1 | 4/2020 | Genser et al. |
| 10,650,617 B2 | 5/2020 | Schmitt et al. |
| 10,783,585 B1 | 9/2020 | Banerjee et al. |
| 10,810,677 B1 | 10/2020 | Brandmaier et al. |
| 10,846,556 B2 | 11/2020 | Hou et al. |
| 10,902,525 B2* | 1/2021 | Kelsh ..................... G06Q 50/22 |
| 11,030,698 B2* | 6/2021 | Tofte ..................... G06Q 10/06 |
| 11,361,380 B2* | 6/2022 | Kelsh ..................... H04N 23/63 |
| 2001/0054806 A1 | 12/2001 | Calender |
| 2002/0002475 A1 | 1/2002 | Freedman et al. |
| 2002/0055861 A1 | 5/2002 | King et al. |
| 2002/0161533 A1 | 10/2002 | Uegaki |
| 2002/0188479 A1 | 12/2002 | Renwick et al. |
| 2003/0219169 A1 | 11/2003 | Sartor et al. |
| 2004/0064345 A1 | 4/2004 | Ajamian et al. |
| 2004/0103009 A1 | 5/2004 | Wahlbin et al. |
| 2004/0153346 A1 | 8/2004 | Grundel et al. |
| 2005/0125127 A1 | 6/2005 | Bomar et al. |
| 2005/0228683 A1 | 10/2005 | Saylor et al. |
| 2005/0246108 A1 | 11/2005 | Fournier |
| 2005/0251427 A1 | 11/2005 | Dorai et al. |
| 2006/0029296 A1 | 2/2006 | King et al. |
| 2006/0080154 A1 | 4/2006 | Larsen |
| 2006/0098899 A1 | 5/2006 | King et al. |
| 2007/0027726 A1 | 2/2007 | Warren et al. |
| 2008/0052134 A1 | 2/2008 | Nowak et al. |
| 2008/0059238 A1 | 3/2008 | Park et al. |
| 2008/0255722 A1 | 10/2008 | Mcclellan et al. |
| 2008/0255887 A1 | 10/2008 | Gruter |
| 2008/0267487 A1 | 10/2008 | Siri |
| 2009/0018859 A1 | 1/2009 | Purifoy et al. |
| 2009/0018874 A1 | 1/2009 | Blair et al. |
| 2009/0100106 A1 | 4/2009 | Anthony et al. |
| 2009/0138290 A1 | 5/2009 | Holden |
| 2009/0147988 A1 | 6/2009 | Jones et al. |
| 2009/0234678 A1 | 9/2009 | Arenas |
| 2009/0265193 A1* | 10/2009 | Collins .............. G06Q 30/0185 |
| | | 901/46 |
| 2009/0309893 A1 | 12/2009 | Boothroyd et al. |
| 2010/0036683 A1 | 2/2010 | Logan |
| 2010/0066012 A1 | 3/2010 | Yamazaki et al. |
| 2010/0088123 A1 | 4/2010 | Mccall et al. |
| 2010/0138298 A1 | 6/2010 | Fitzgerald et al. |
| 2010/0174564 A1 | 7/2010 | Stender et al. |
| 2010/0183246 A1 | 7/2010 | King et al. |
| 2011/0040692 A1 | 2/2011 | Ahroon |
| 2011/0054806 A1 | 3/2011 | Goldfine et al. |
| 2011/0085211 A1 | 4/2011 | King et al. |
| 2011/0161100 A1 | 6/2011 | Peak et al. |
| 2011/0161116 A1 | 6/2011 | Peak et al. |
| 2011/0161117 A1 | 6/2011 | Busque et al. |
| 2011/0161118 A1 | 6/2011 | Borden et al. |
| 2011/0196707 A1 | 8/2011 | Danico et al. |
| 2011/0213628 A1 | 9/2011 | Peak et al. |
| 2011/0218825 A1 | 9/2011 | Hertenstein |
| 2011/0270641 A1 | 11/2011 | Rossmark et al. |
| 2011/0313936 A1 | 12/2011 | Sieger |
| 2011/0313951 A1 | 12/2011 | Cook |
| 2012/0066012 A1 | 3/2012 | Brown |
| 2012/0290333 A1 | 11/2012 | Birchall |
| 2012/0297337 A1 | 11/2012 | St. Denis et al. |
| 2013/0100306 A1 | 4/2013 | Bekiares et al. |
| 2013/0290036 A1 | 10/2013 | Strange |
| 2013/0297353 A1 | 11/2013 | Strange et al. |
| 2013/0317861 A1 | 11/2013 | Tofte et al. |
| 2014/0032430 A1 | 1/2014 | Sieger |
| 2014/0108058 A1 | 4/2014 | Bourne et al. |
| 2014/0122133 A1 | 5/2014 | Weisberg et al. |
| 2014/0229207 A1 | 8/2014 | Swamy et al. |
| 2014/0266789 A1 | 9/2014 | Matus |
| 2014/0327940 A1 | 11/2014 | Amtrup et al. |
| 2015/0029346 A1 | 1/2015 | Sieger et al. |
| 2015/0073864 A1 | 3/2015 | Labrie et al. |
| 2015/0156419 A1 | 6/2015 | Aggarwal et al. |
| 2015/0294419 A1 | 10/2015 | Gonzalez Miranda et al. |
| 2015/0324639 A1 | 11/2015 | Macciola |
| 2015/0348204 A1 | 12/2015 | Daues |
| 2015/0363717 A1 | 12/2015 | Lim |
| 2015/0365600 A1 | 12/2015 | Pollack et al. |
| 2016/0171622 A1 | 6/2016 | Perkins et al. |
| 2017/0046788 A1 | 2/2017 | Macciola et al. |
| 2017/0111532 A1 | 4/2017 | Amtrup et al. |
| 2017/0116494 A1 | 4/2017 | Isaev |

(56) References Cited

U.S. PATENT DOCUMENTS

| | | | |
|---|---|---|---|
| 2017/0270612 A1 | 9/2017 | Howe et al. |
| 2017/0270650 A1 | 9/2017 | Howe et al. |
| 2017/0293894 A1 | 10/2017 | Taliwal et al. |
| 2017/0330207 A1 | 11/2017 | Labrie et al. |
| 2017/0330284 A1 | 11/2017 | Tofte et al. |
| 2017/0364159 A1 | 12/2017 | Eronen et al. |
| 2018/0260793 A1 | 9/2018 | Li et al. |
| 2019/0019295 A1 | 1/2019 | Lehtiniemi et al. |
| 2020/0065632 A1 | 2/2020 | Guo et al. |
| 2020/0242838 A1 | 7/2020 | Kuruvilla et al. |
| 2021/0312561 A1 | 10/2021 | Speasl et al. |
| 2022/0164895 A1 | 5/2022 | Beckwith et al. |

FOREIGN PATENT DOCUMENTS

| | | |
|---|---|---|
| JP | 2000-050156 A | 2/2000 |
| JP | 2010-157267 A | 7/2010 |
| KR | 20020008466 A | 1/2002 |
| KR | 20060031208 A | 4/2006 |
| WO | WO-2010/026170 A1 | 3/2010 |
| WO | WO-2011/157064 A1 | 12/2011 |
| WO | WO-2012/113084 A1 | 8/2012 |
| WO | WO-2013/003957 A1 | 1/2013 |
| WO | PCT/US2020/052698 | 9/2020 |

OTHER PUBLICATIONS

Farmers, "Farmers iClaim," retrieved from www.farmers.com/iclaim.html, 2 pages (2012).
Final Office Action for U.S. Appl. No. 13/834,210 dated Apr. 1, 2022, 17 pages.
Final Office Action for U.S. Appl. No. 16/450,270 dated May 5, 2021, 14 pages.
Final Office Action on U.S. Appl. No. 13/587,630 dated Feb. 5, 2015, 14 pages.
Final Office Action on U.S. Appl. No. 13/587,630 dated Jul. 12, 2016, 21 pages.
Final Office Action on U.S. Appl. No. 13/587,630 dated Oct. 5, 2018, 24 pages.
Final Office Action on U.S. Appl. No. 13/587,630 dated Oct. 6, 2017, 19 pages.
Final Office Action on U.S. Appl. No. 13/587,635 dated Aug. 21, 2014, 12 pages.
Final Office Action on U.S. Appl. No. 13/587,635 dated Aug. 22, 2017, 24 pages.
Final Office Action on U.S. Appl. No. 13/587,635 dated Feb. 23, 2016, 18 pages.
Final Office Action on U.S. Appl. No. 13/587,635 dated Jul. 27, 2015, 17 pages.
Final Office Action on U.S. Appl. No. 13/587,635 dated Nov. 13, 2018, 23 pages.
Final Office Action on U.S. Appl. No. 13/587,635 dated Sep. 23, 2013, 12 pages.
Final Office Action on U.S. Appl. No. 13/587,635 dated Sep. 29, 2016, 20 pages.
Final Office Action on U.S. Appl. No. 13/834,161 dated Jan. 12, 2018, 25 pages.
Final Office Action on U.S. Appl. No. 13/834,161 dated Mar. 13, 2015, 12 pages.
Final Office Action on U.S. Appl. No. 13/834,161 dated Oct. 13, 2016, 22 pages.
Final Office Action on U.S. Appl. No. 13/834,170 dated Jan. 14, 2019, 25 pages.
Final Office Action on U.S. Appl. No. 13/834,170 dated Mar. 13, 2015, 11 pages.
Final Office Action on U.S. Appl. No. 13/834,170 dated Mar. 14, 2018, 20 pages.
Final Office Action on U.S. Appl. No. 13/834,170 dated Nov. 4, 2016, 25 pages.
Final Office Action on U.S. Appl. No. 13/834,193 dated Apr. 29, 2015, 13 pages.
Final Office Action on U.S. Appl. No. 13/834,193 dated Mar. 29, 2017, 19 pages.
Final Office Action on U.S. Appl. No. 13/834,210 dated Dec. 2, 2016, 34 pages.
Final Office Action on U.S. Appl. No. 13/834,210 dated Mar. 14, 2018, 21 pages.
Final Office Action on U.S. Appl. No. 13/834,210 dated Mar. 16, 2015, 11 pages.
Final Office Action on U.S. Appl. No. 13/834,210 dated Mar. 20, 2019, 13 pages.
Final Office Action on U.S. Appl. No. 13/892,598 dated Dec. 1, 2015, 17 pages.
Final Office Action on U.S. Appl. No. 13/892,598 dated Jun. 26, 2018, 21 pages.
Final Office Action on U.S. Appl. No. 13/892,598 dated Nov. 18, 2014, 12 pages.
Final Office Action on U.S. Appl. No. 13/892,598 dated Oct. 17, 2016, 19 pages.
Final Office Action on U.S. Appl. No. 13/892,598 dated Sep. 18, 2017, 20 pages.
Final Office Action on U.S. Appl. No. 13/933,576 dated Apr. 12, 2019, 24 pages.
Final Office Action on U.S. Appl. No. 13/933,576 dated Apr. 6, 2017, 18 pages.
Final Office Action on U.S. Appl. No. 13/933,576 dated Mar. 16, 2018, 21 pages.
Final Office Action on U.S. Appl. No. 13/933,576 dated May 12, 2015, 19 pages.
Final Office Action on U.S. Appl. No. 14/063,517 dated Mar. 4, 2015, 13 pages.
Final Office Action on U.S. Appl. No. 14/063,517 dated Sep. 13, 2017, 19 pages.
Final Office Action on U.S. Appl. No. 14/063,517 dated Sep. 15, 2016, 18 pages.
Final Office Action on U.S. Appl. No. 14/063,517 dated Sep. 5, 2018, 24 pages.
Final Office Action on U.S. Appl. No. 14/063,533 dated Mar. 30, 2017, 19 pages.
Final Office Action on U.S. Appl. No. 14/063,533 dated May 8, 2015, 15 pages.
Final Office Action on U.S. Appl. No. 14/063,570 dated Apr. 30, 2015, 13 pages.
Final Office Action on U.S. Appl. No. 14/063,570 dated Mar. 16, 2018, 19 pages.
Final Office Action on U.S. Appl. No. 14/063,570 dated Mar. 20, 2019, 13 pages.
Final Office Action on U.S. Appl. No. 14/063,570 dated Mar. 31, 2017, 20 pages.
Final Office Action on U.S. Appl. No. 14/076,473 dated Jun. 13, 2016, 11 pages.
Final Office Action on U.S. Appl. No. 14/076,473 dated May 6, 2015, 11 pages.
Final Office Action on U.S. Appl. No. 14/190,976 dated Apr. 3, 2018, 13 pages.
Final Office Action on U.S. Appl. No. 14/190,976 dated Dec. 2, 2016, 29 pages.
Final Office Action on U.S. Appl. No. 14/190,976 dated Jan. 22, 2016, 24 pages.
Final Office Action on U.S. Appl. No. 14/269,387 dated Apr. 13, 2020, 19 pages.
Final Office Action on U.S. Appl. No. 14/269,387 dated Aug. 12, 2015, 14 pages.
Final Office Action on U.S. Appl. No. 14/269,387 dated Mar. 13, 2017, 7 pages.
Final Office Action on U.S. Appl. No. 14/269,387 dated Mar. 8, 2018, 9 pages.
Final Office Action on U.S. Appl. No. 14/269,387 dated May 3, 2019, 15 pages.
Final Office Action on U.S. Appl. No. 14/269,387 dated Nov. 13, 2020, 26 pages.

(56) References Cited

OTHER PUBLICATIONS

Final Office Action on U.S. Appl. No. 14/671,602 dated Jul. 6, 2018, 16 pages.
Final Office Action on U.S. Appl. No. 14/671,602 dated Nov. 1, 2017, 19 pages.
Final Office Action on U.S. Appl. No. 14/671,602 dated Oct. 18, 2016, 16 pages.
Final Office Action on U.S. Appl. No. 14/671,602 dated Sep. 23, 2015, 12 pages.
Final Office Action on U.S. Appl. No. 14/671,602 dated Sep. 30, 2019, 19 pages.
Final Office Action on U.S. Appl. No. 14/671,617 dated Dec. 3, 2015, 13 pages.
Final Office Action on U.S. Appl. No. 14/671,617 dated May 18, 2017, 17 pages.
Final Office Action on U.S. Appl. No. 14/671,617 dated Sep. 21, 2018, 16 pages.
Final Office Action on U.S. Appl. No. 15/374,278 dated Dec. 11, 2020, 20 pages.
Final Office Action on U.S. Appl. No. 15/374,278 dated Feb. 15, 2022, 19 pages.
Final Office Action on U.S. Appl. No. 15/374,278 dated Oct. 4, 2019, 16 pages.
Final Office Action on U.S. Appl. No. 15/855,057 dated Dec. 5, 2019, 20 pages.
Final Office Action on U.S. Appl. No. 15/855,057 dated Oct. 4, 2018, 15 pages.
Final Office Action on U.S. Appl. No. 16/450,270 dated Feb. 27, 2020, 15 pages.
Final Office Action on U.S. Appl. No. 16/586,008 dated Jul. 30, 2020, 21 pages.
International Search Report & Written Opinion for PCT/US2020/052698 dated Jan. 28, 2021, 8 pages.
Li & Dorai, "Applying Image Analysis to Auto Insurance Triage: A Novel Application," 2007 IEEE 9th Workshop on Multimedia Signal Processing, 4 pages (2007).
Mort & Drennan, "Marketing m-services: Establishing a usage benefit typology related to mobile user characteristics," Journal of Database Marketing & Customer Strategy Management 12, pp. 327-341 (2005).
Nationwide, "Get the Nationwide Mobile App for iPhone or iPod Touch," retrieved from www.nationwide.com/mobile/iphone-support.jsp, 1 page (2012).
Notice of Allowance for U.S. Appl. No. 16/995,003 dated Nov. 30, 2020, 9 pages.
Notice of Allowance for U.S. Appl. No. 17/026,598 dated Mar. 28, 2022, 6 pages.
Notice of Allowance on U.S. Appl. No. 13/587,620 dated Jun. 17, 2013, 8 pages.
Notice of Allowance on U.S. Appl. No. 13/587,630 dated Feb. 27, 2014, 7 pages.
Notice of Allowance on U.S. Appl. No. 13/587,635 dated May 20, 2019, 6 pages.
Notice of Allowance on U.S. Appl. No. 13/834,161 dated May 20, 2020, 7 pages.
Notice of Allowance on U.S. Appl. No. 13/834,170 dated Jun. 17, 2014, 7 pages.
Notice of Allowance on U.S. Appl. No. 13/834,210 dated Jun. 2, 2014, 7 pages.
Notice of Allowance on U.S. Appl. No. 13/892,598 dated May 15, 2019, 5 pages.
Notice of Allowance on U.S. Appl. No. 13/933,576 dated Jan. 29, 2020, 10 pages.
Notice of Allowance on U.S. Appl. No. 14/063,517 dated Jun. 2, 2014, 8 pages.
Notice of Allowance on U.S. Appl. No. 14/063,517 dated Nov. 18, 2019, 15 pages.
Notice of Allowance on U.S. Appl. No. 14/063,570 dated Nov. 18, 2020, 14 pages.
Notice of Allowance on U.S. Appl. No. 14/076,435 dated Dec. 5, 2013, 9 pages.
Notice of Allowance on U.S. Appl. No. 14/190,976 dated Aug. 13, 2015, 17 pages.
Notice of Allowance on U.S. Appl. No. 14/671,602 dated Aug. 19, 2020, 11 pages.
Notice of Allowance on U.S. Appl. No. 14/671,617 dated Oct. 18, 2019, 12 pages.
Notice of Allowance on U.S. Appl. No. 15/855,057 dated Jun. 12, 2020, 5 pages.
Notice of Allowance on U.S. Appl. No. 16/570,421 dated Jun. 11, 2020, 9 pages.
Notice of Allowance on U.S. Appl. No. 16/586,008 dated May 17, 2022, 9 pages.
Notice of Allowance on U.S. Appl. No. 16/586,008 dated Nov. 15, 2021, 10 pages.
Notice of Allowance on U.S. Appl. No. 16/748,206 dated Feb. 4, 2022, 7 pages.
Notice of Allowance on U.S. Appl. No. 16/748,206, dated Mar. 4, 2021, 9 pages.
Notice of Allowance on U.S. Appl. No. 16/995,003 dated Apr. 7, 2021, 5 pages.
Notice of Allowance on U.S. Appl. No. 16/995,003 dated Feb. 17, 2022, 5 pages.
Notice of Allowance on U.S. Appl. No. 17/008,079 dated Feb. 22, 2022, 11 pages.
Notice of Allowance on U.S. Appl. No. 17/026,598 dated Mar. 19, 2021, 8 pages.
Notice of Allowance on U.S. Appl. No. 17/026,598 dated Oct. 1, 2021, 7 pages.
Office Action for U.S. Appl. No. 14/269,387 dated Apr. 14, 2022, 20 pages.
Office Action on U.S. Appl. No. 13/587,620 dated Feb. 27, 2013, 6 pages.
Office Action on U.S. Appl. No. 13/587,630 dated Apr. 25, 2016, 15 pages.
Office Action on U.S. Appl. No. 13/587,630 dated Aug. 21, 2014, 6 pages.
Office Action on U.S. Appl. No. 13/587,630 dated Mar. 22, 2019, 13 pages.
Office Action on U.S. Appl. No. 13/587,630 dated Mar. 30, 2018, 20 pages.
Office Action on U.S. Appl. No. 13/587,630 dated May 9, 2017, 24 pages.
Office Action on U.S. Appl. No. 13/587,630 dated Sep. 30, 2013, 5 pages.
Office Action on U.S. Appl. No. 13/587,635 dated Apr. 23, 2014, 11 pages.
Office Action on U.S. Appl. No. 13/587,635 dated Feb. 7, 2017, 24 pages.
Office Action on U.S. Appl. No. 13/587,635 dated Jan. 13, 2015, 14 pages.
Office Action on U.S. Appl. No. 13/587,635 dated Jun. 2, 2016, 19 pages.
Office Action on U.S. Appl. No. 13/587,635 dated Jun. 25, 2013, 13 pages.
Office Action on U.S. Appl. No. 13/587,635 dated Mar. 28, 2018, 21 pages.
Office Action on U.S. Appl. No. 13/587,635 dated Oct. 30, 2015, 16 pages.
Office Action on U.S. Appl. No. 13/834,161 dated Aug. 1, 2016, 21 pages.
Office Action on U.S. Appl. No. 13/834,161 dated Dec. 3, 2013, 4 pages.
Office Action on U.S. Appl. No. 13/834,161 dated Dec. 4, 2014, 10 pages.
Office Action on U.S. Appl. No. 13/834,161 dated Jun. 20, 2018, 22 pages.
Office Action on U.S. Appl. No. 13/834,161 dated May 19, 2014, 5 pages.
Office Action on U.S. Appl. No. 13/834,161 dated Oct. 9, 2018, 19 pages.

(56) References Cited

OTHER PUBLICATIONS

Office Action on U.S. Appl. No. 13/834,161 dated Sep. 25, 2017, 24 pages.
Office Action on U.S. Appl. No. 13/834,170 dated Aug. 15, 2018, 25 pages.
Office Action on U.S. Appl. No. 13/834,170 dated Aug. 22, 2014, 6 pages.
Office Action on U.S. Appl. No. 13/834,170 dated Feb. 26, 2014, 4 pages.
Office Action on U.S. Appl. No. 13/834,170 dated Jul. 29, 2016, 24 pages.
Office Action on U.S. Appl. No. 13/834,170 dated Sep. 25, 2017, 19 pages.
Office Action on U.S. Appl. No. 13/834,193 dated Mar. 26, 2014, 4 pages.
Office Action on U.S. Appl. No. 13/834,193 dated Oct. 24, 2016, 21 pages.
Office Action on U.S. Appl. No. 13/834,193 dated Oct. 30, 2014, 7 pages.
Office Action on U.S. Appl. No. 13/834,210 dated Apr. 29, 2021, 14 pages.
Office Action on U.S. Appl. No. 13/834,210 dated Aug. 25, 2014, 5 pages.
Office Action on U.S. Appl. No. 13/834,210 dated Aug. 29, 2016, 25 pages.
Office Action on U.S. Appl. No. 13/834,210 dated Jan. 23, 2014, 4 pages.
Office Action on U.S. Appl. No. 13/834,210 dated Oct. 20, 2017, 31 pages.
Office Action on U.S. Appl. No. 13/834,210 dated Sep. 4, 2018, 24 pages.
Office Action on U.S. Appl. No. 13/892,598 dated Apr. 5, 2016, 17 pages.
Office Action on U.S. Appl. No. 13/892,598 dated Apr. 5, 2017, 22 pages.
Office Action on U.S. Appl. No. 13/892,598 dated Jan. 9, 2018, 21 pages.
Office Action on U.S. Appl. No. 13/892,598 dated May 20, 2015, 18 pages.
Office Action on U.S. Appl. No. 13/892,598 dated May 6, 2014, 12 pages.
Office Action on U.S. Appl. No. 13/892,598 dated Nov. 14, 2018, 19 pages.
Office Action on U.S. Appl. No. 13/933,576 dated Aug. 8, 2013, 4 pages.
Office Action on U.S. Appl. No. 13/933,576 dated Dec. 26, 2013, 5 pages.
Office Action on U.S. Appl. No. 13/933,576 dated Jan. 20, 2015, 10 pages.
Office Action on U.S. Appl. No. 13/933,576 dated Oct. 13, 2016, 25 pages.
Office Action on U.S. Appl. No. 13/933,576 dated Sep. 17, 2018, 22 pages.
Office Action on U.S. Appl. No. 14/063,517 dated Aug. 21, 2014, 5 pages.
Office Action on U.S. Appl. No. 14/063,517 dated Feb. 26, 2014, 4 pages.
Office Action on U.S. Appl. No. 14/063,517 dated Jun. 17, 2016, 15 pages.
Office Action on U.S. Appl. No. 14/063,517 dated Mar. 12, 2018, 17 pages.
Office Action on U.S. Appl. No. 14/063,517 dated Mar. 22, 2019, 13 pages.
Office Action on U.S. Appl. No. 14/063,517 dated May 24, 2017, 18 pages.
Office Action on U.S. Appl. No. 14/063,533 dated Apr. 9, 2014, 4 pages.
Office Action on U.S. Appl. No. 14/063,533 dated Nov. 10, 2016, 19 pages.
Office Action on U.S. Appl. No. 14/063,533 dated Nov. 20, 2014, 8 pages.
Office Action on U.S. Appl. No. 14/063,570 dated Apr. 9, 2014, 4 pages.
Office Action on U.S. Appl. No. 14/063,570 dated Dec. 8, 2017, 20 pages.
Office Action on U.S. Appl. No. 14/063,570 dated Nov. 20, 2014, 9 pages.
Office Action on U.S. Appl. No. 14/063,570 dated Nov. 9, 2018, 24 pages.
Office Action on U.S. Appl. No. 14/063,570 dated Oct. 21, 2016, 22 pages.
Office Action on U.S. Appl. No. 14/076,473 dated Aug. 11, 2015, 15 pages.
Office Action on U.S. Appl. No. 14/076,473 dated Dec. 3, 2014, 8 pages.
Office Action on U.S. Appl. No. 14/190,976 dated Aug. 13, 2015, 17 pages.
Office Action on U.S. Appl. No. 14/190,976 dated Jul. 10, 2017, 14 pages.
Office Action on U.S. Appl. No. 14/190,976 dated May 23, 2016, 27 pages.
Office Action on U.S. Appl. No. 14/269,387 dated Dec. 2, 2016, 9 pages.
Office Action on U.S. Appl. No. 14/269,387 dated Dec. 3, 2019, 16 pages.
Office Action on U.S. Appl. No. 14/269,387 dated Jun. 25, 2021, 21 pages.
Office Action on U.S. Appl. No. 14/269,387 dated May 18, 2015, 13 pages.
Office Action on U.S. Appl. No. 14/269,387 dated Nov. 2, 2018, 13 pages.
Office Action on U.S. Appl. No. 14/269,387 dated Oct. 26, 2021, 26 pages.
Office Action on U.S. Appl. No. 14/341,043 dated Feb. 12, 2016, 12 pages.
Office Action on U.S. Appl. No. 14/341,139 dated Feb. 16, 2016, 12 pages.
Office Action on U.S. Appl. No. 14/671,602 dated Aug. 3, 2016, 14 pages.
Office Action on U.S. Appl. No. 14/671,602 dated Feb. 19, 2020, 19 pages.
Office Action on U.S. Appl. No. 14/671,602 dated Feb. 21, 2019, 12 pages.
Office Action on U.S. Appl. No. 14/671,602 dated Mar. 21, 2018, 15 pages.
Office Action on U.S. Appl. No. 14/671,602 dated May 14, 2015, 14 pages.
Office Action on U.S. Appl. No. 14/671,602 dated May 16, 2017, 17 pages.
Office Action on U.S. Appl. No. 14/671,617 dated Dec. 7, 2017, 21 pages.
Office Action on U.S. Appl. No. 14/671,617 dated Jun. 3, 2015, 11 pages.
Office Action on U.S. Appl. No. 14/671,617 dated Mar. 22, 2019, 10 pages.
Office Action on U.S. Appl. No. 14/671,617 dated Nov. 25, 2016, 17 pages.
Office Action on U.S. Appl. No. 15/374,278 dated Jul. 16, 2020, 17 pages.
Office Action on U.S. Appl. No. 15/374,278 dated May 17, 2019, 14 pages.
Office Action on U.S. Appl. No. 15/374,278 dated Oct. 15, 2021, 20 pages.
Office Action on U.S. Appl. No. 15/855,057 dated Jul. 30, 2019, 17 pages.
Office Action on U.S. Appl. No. 15/855,057 dated Mar. 27, 2018, 9 pages.
Office Action on U.S. Appl. No. 16/450,270 dated Aug. 28, 2019, 17 pages.
Office Action on U.S. Appl. No. 16/450,270 dated Nov. 10, 2020, 16 pages.

(56) References Cited

OTHER PUBLICATIONS

Office Action on U.S. Appl. No. 16/586,008 dated Jun. 30, 2021, 21 pages.
Office Action on U.S. Appl. No. 16/586,008 dated Mar. 26, 2020, 24 pages.
Office Action on U.S. Appl. No. 16/586,008 dated Mar. 8, 2021, 21 pages.
Office Action on U.S. Appl. No. 17/026,598 dated Nov. 27, 2020, 20 pages.
Office Action on U.S. Appl. No. 16/450,270 dated Dec. 7, 2021, 17 pages.
Office Action on U.S. Appl. No. 17/008,079 dated Sep. 15, 2021, 26 pages.
Phillips, "Image Processing in C," R&D Publications, Second Edition, pp. 47-275 (2000).
Security First Insurance, "Security First Mobile," retrieved from www.securityfirstflorida.com/security-first-mobile.html, 2 pages (2012).
Snowbound, "Imaging Technology Saves the Day for Insurance Claim Processing," retrieved from https://snowbound.com/resources/articles/business-benefits-industry-information/imaging-technology-saves-day-insurance, 6 pages (no date).
State Farm, "State Farm Pocket Agent—What comes from having a good neighbor right in your pocket?," retrieved from www.statefarm.com/mobile/iphone/pocketagent.asp, 3 pages (2012).
Techopedia, "Stereoscopic Imaging," retrieved from https://www.techopedia.com/definition/91/stereoscopic-imaging, 6 pages (no date, retrieved Apr. 7, 2019).
USAA, "Mobile Apps—USAA at your fingertips," retrieved from www.usaa.com/inet/pages/mobile_access_methods_mobileapps, 2 pages (2012).
Final Office Action on U.S. Appl. No. 16/450,270 dated Jul. 15, 2022, 11 pages.
Notice of Allowance on U.S. Appl. No. 14/269,387 dated Aug. 10, 2022, 11 pages.
Notice of Allowance on U.S. Appl. No. 15/374,278 dated Jul. 27, 2022, 10 pages.
Non-Final Office Action on U.S. Appl. No. 13/834,210 dated Oct. 14, 2022, 17 pages.
Notice of Allowance on U.S. Appl. No. 16/900,056 dated Oct. 11, 2022, 12 pages.
Notice of Allowance on U.S. Appl. No. 17/120,472 dated Nov. 23, 2022, 9 pages.
Wei & Peng, "Application of Mobile Information System in Vehicle Insurance," 5th ACIS International Conference on Software Engineering Research, Management & Applications (SERA 2007), pp. 599-603 (2007).
Ditullio, "Reader's Choice: How Can We Stop Insurers Writing Estimates from Photos?," Body Shop Business, Babcox Media Inc., 2 pages (2016).
Li & Dorai, "Applying Image Analysis to Auto Insurance Triage: A Novel Application," IEEE 9th Workshop on Multimedia Signal Processing, 4 pages (2007).
Mort & Drennan, "Marketing m-services: Establishing a usage benefit typology related to mobile user characteristics," Journal of Database Marketing & Customer Strategy Management 12(4), pp. 327-341 (2005).
Non-Final Office Action on U.S. Appl. No. 16/450,270 dated Jun. 13, 2023, 11 pages.
Office Action on U.S. Appl. No. 17/862,159 dated Mar. 28, 2023, 13 pages.
Sudol, et al., "Looktel—A comprehensive platform for computer-aided visual assistance," IEEE Computer Society Conference on Computer Vision and Pattern Recognition—Workshops, pp. 73-80 (2010).

\* cited by examiner

1000

Server associated with third party entity receives data related to damage of an insured item (1001)

Server associated with third party entity evaluates information related to insurance policy associated with the insured item (1003)

Server associated with third party entity analyzes data related to damage of insured item and information related to insurance policy (1005)

Server associated with third party entity calculates an overall valuation of submitting an insurance claim (1007)

Server associated with third party entity transmits suggestion of whether or not to submit an insurance claim for the damaged item (1009)

Server associated with third party entity transmits incentives based on consumer details, insurance policy details, and damage details (1011)

FIG. 10

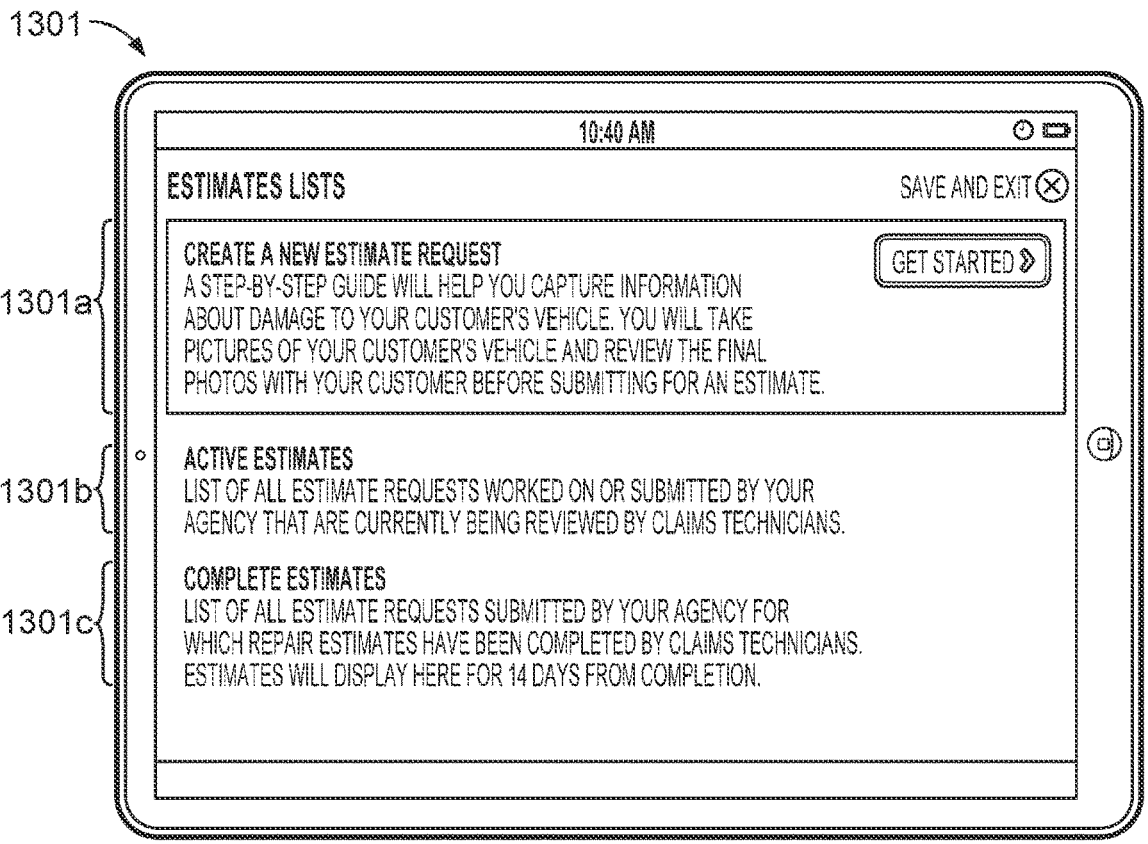
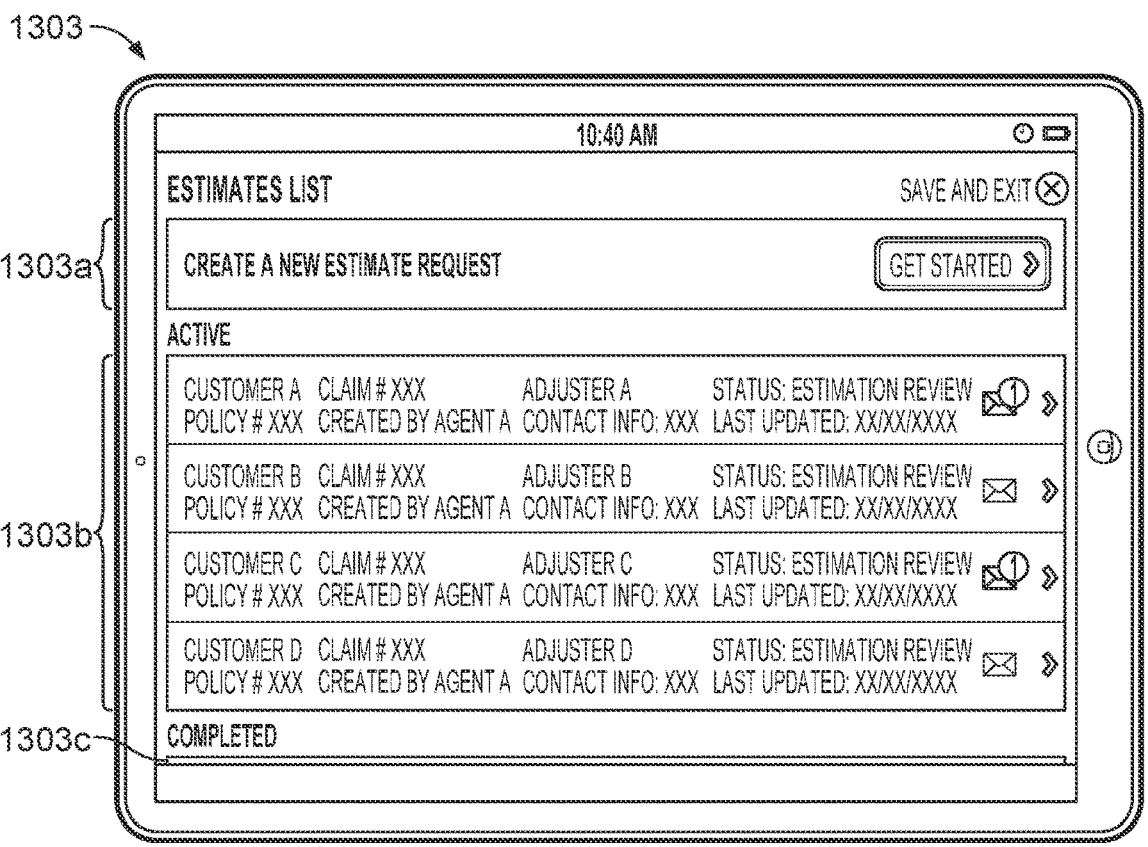
FIG. 13

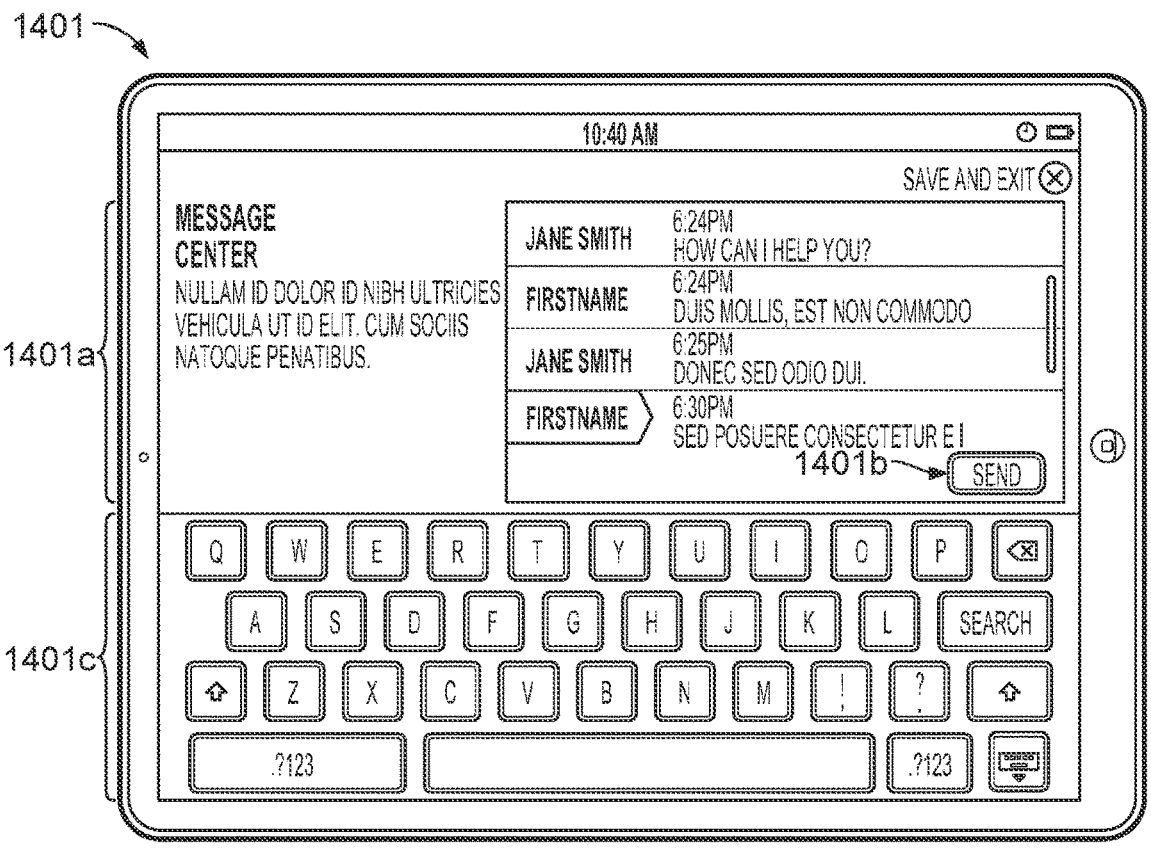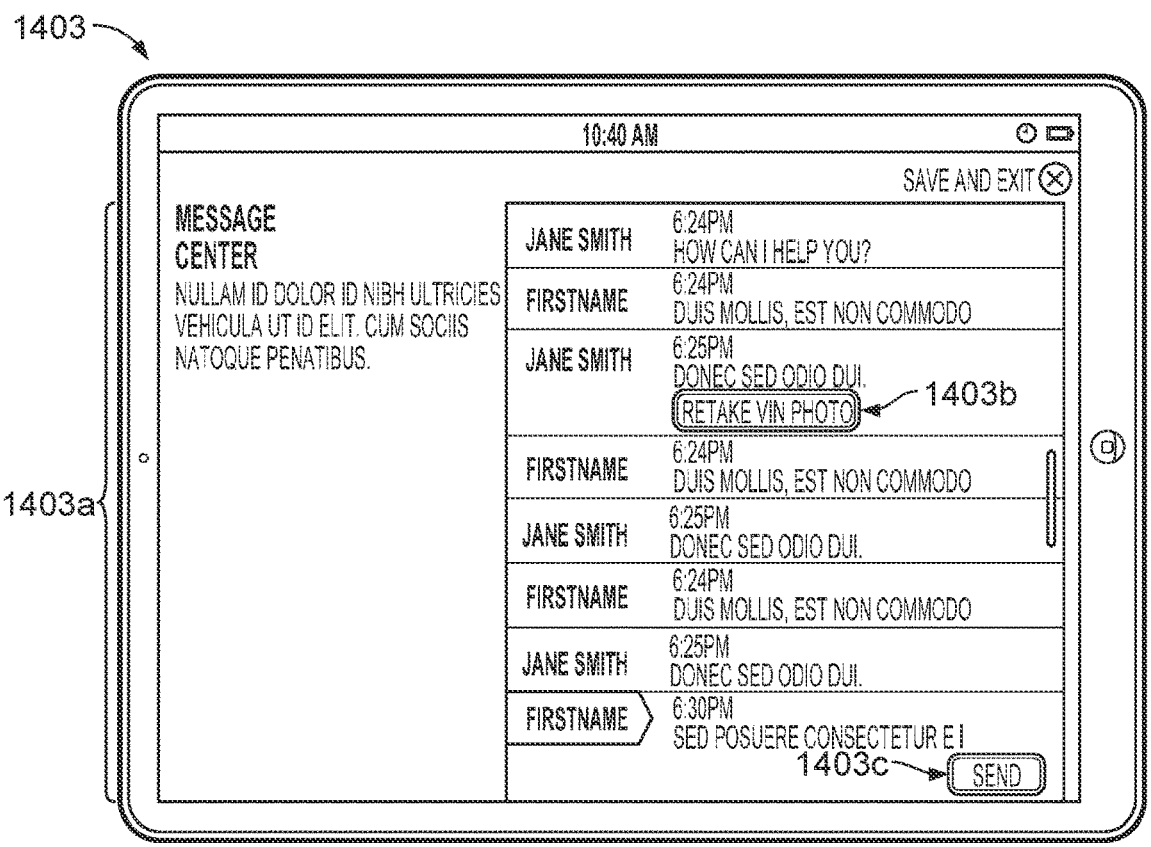
FIG. 14

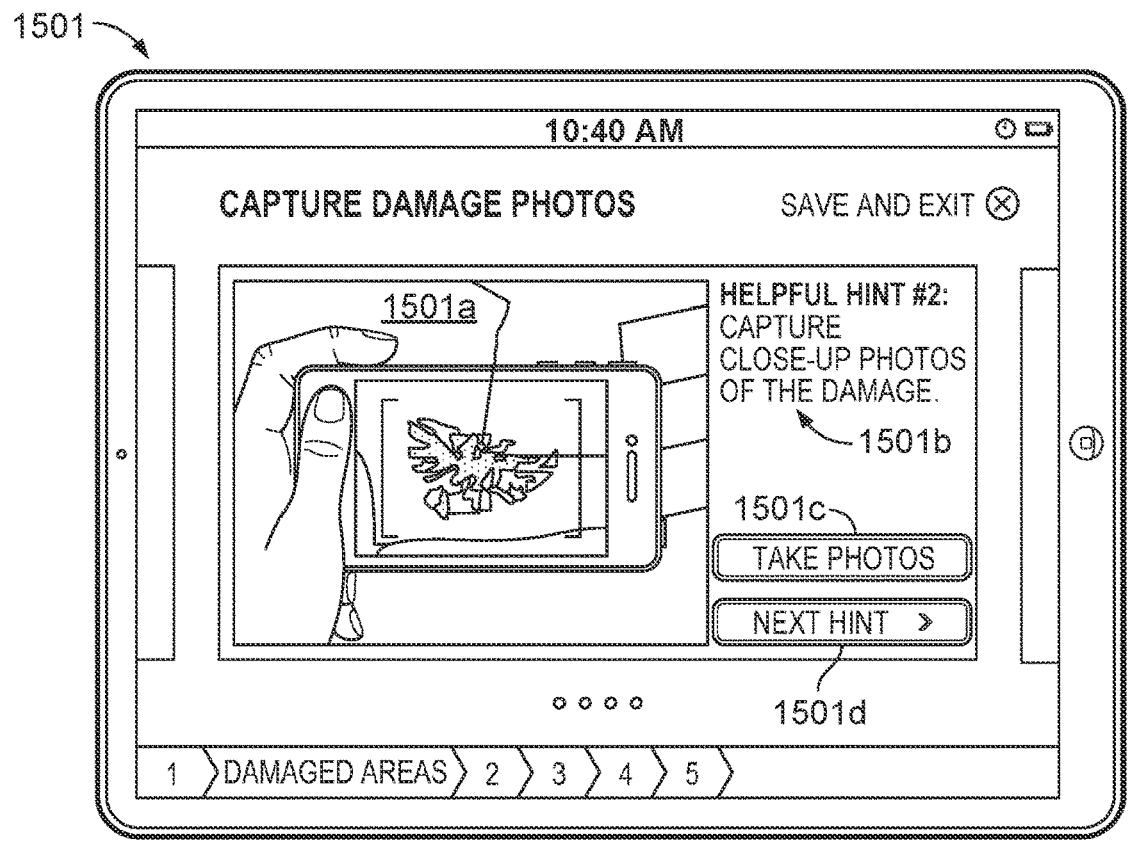
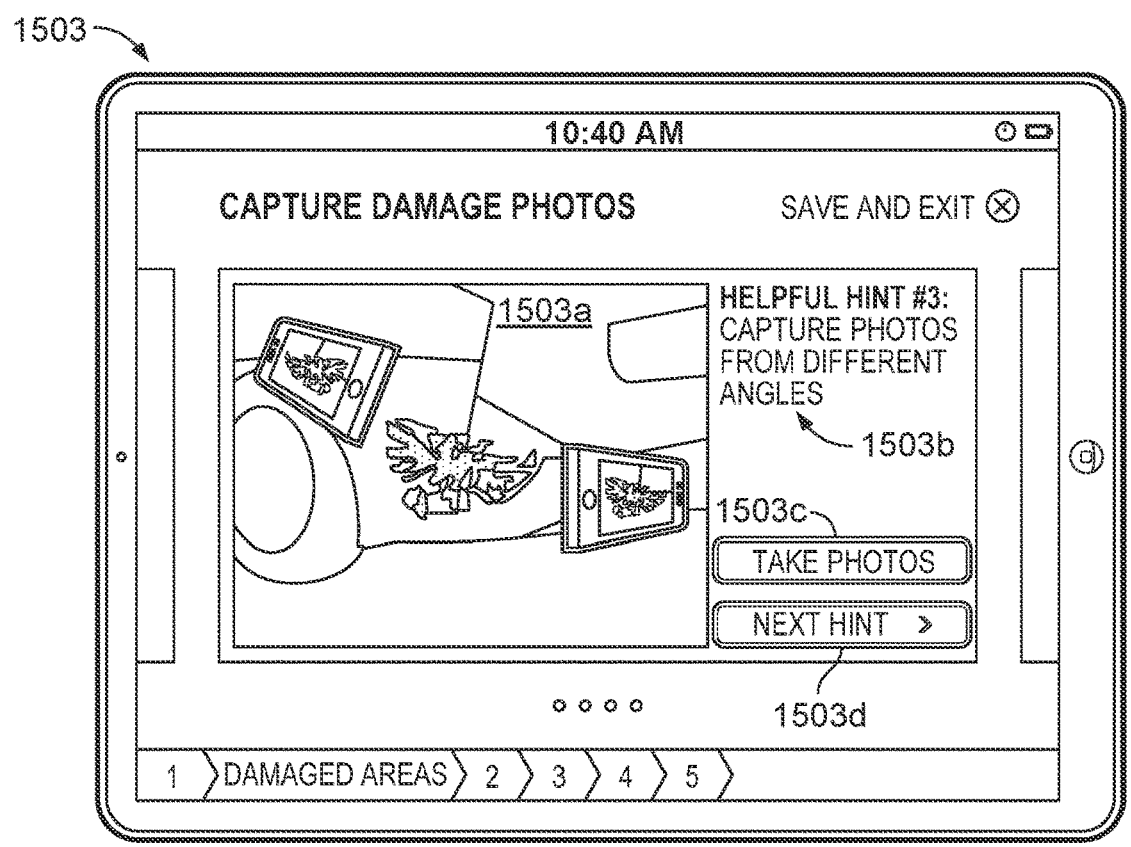
FIG. 15

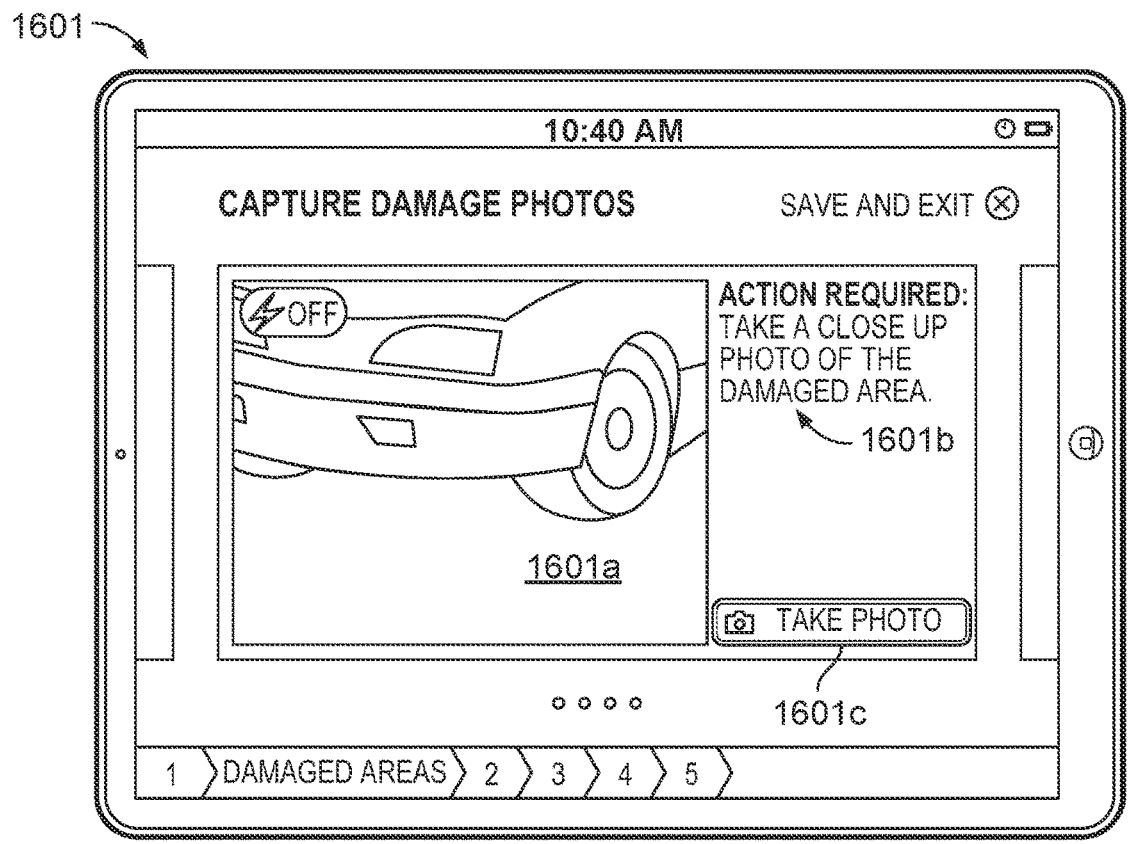
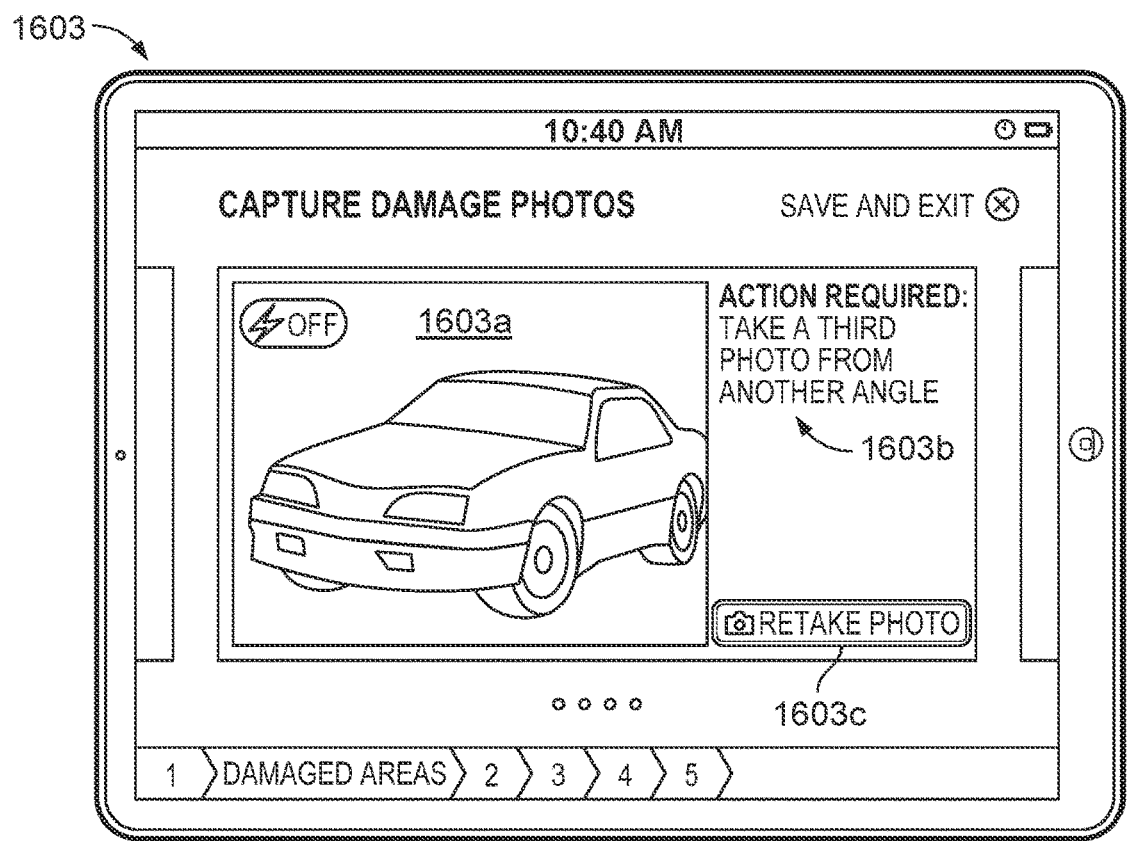
FIG. 16

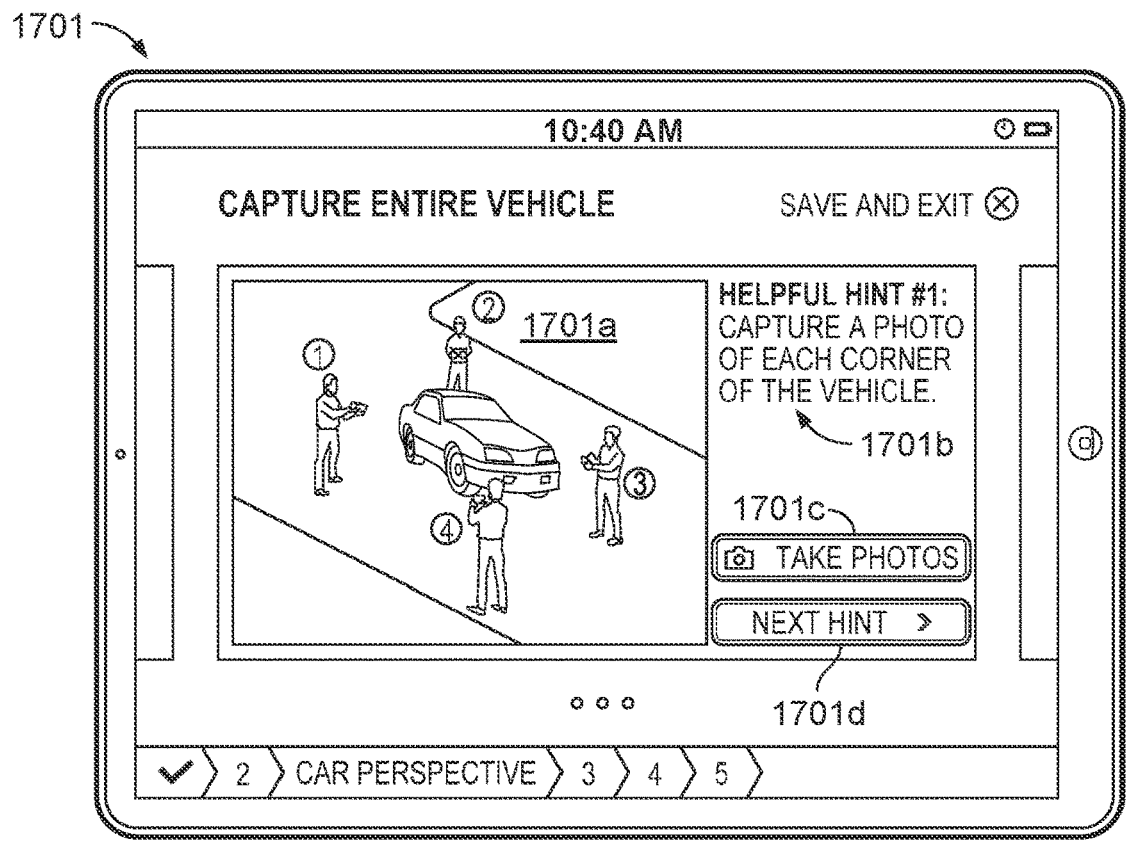
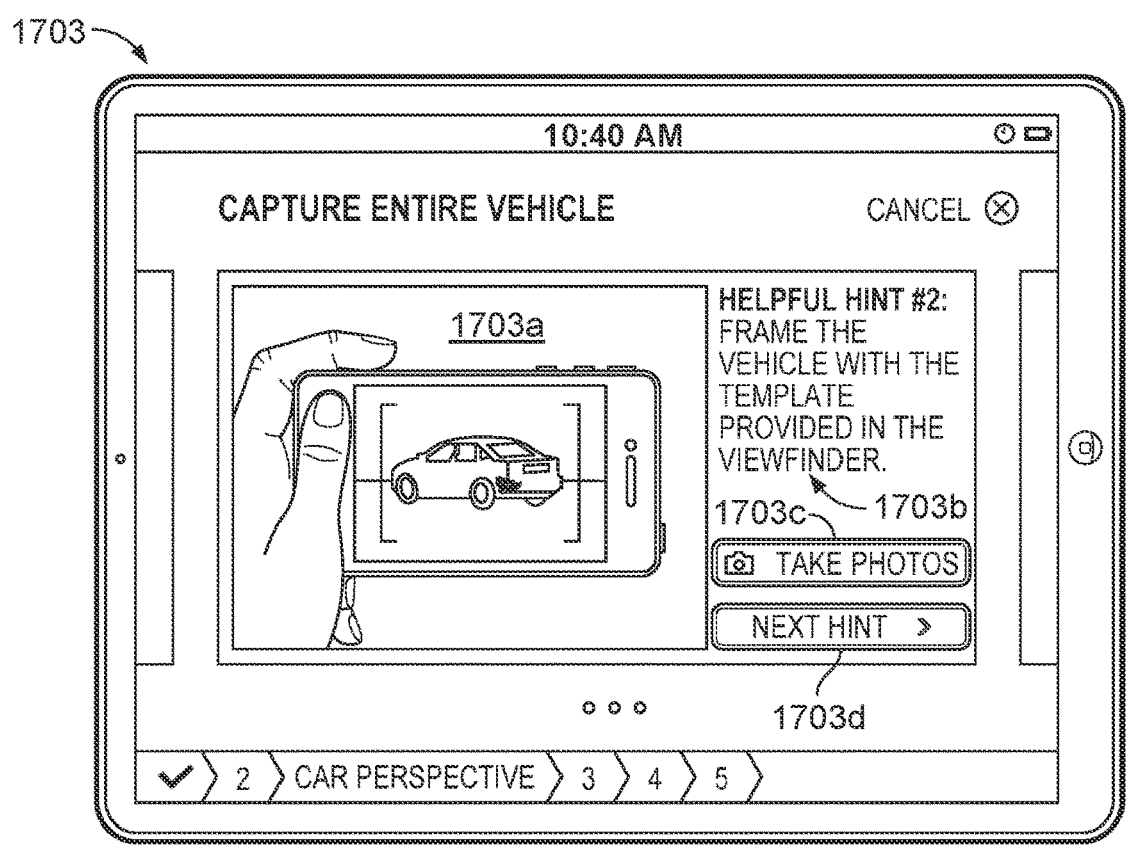
FIG. 17

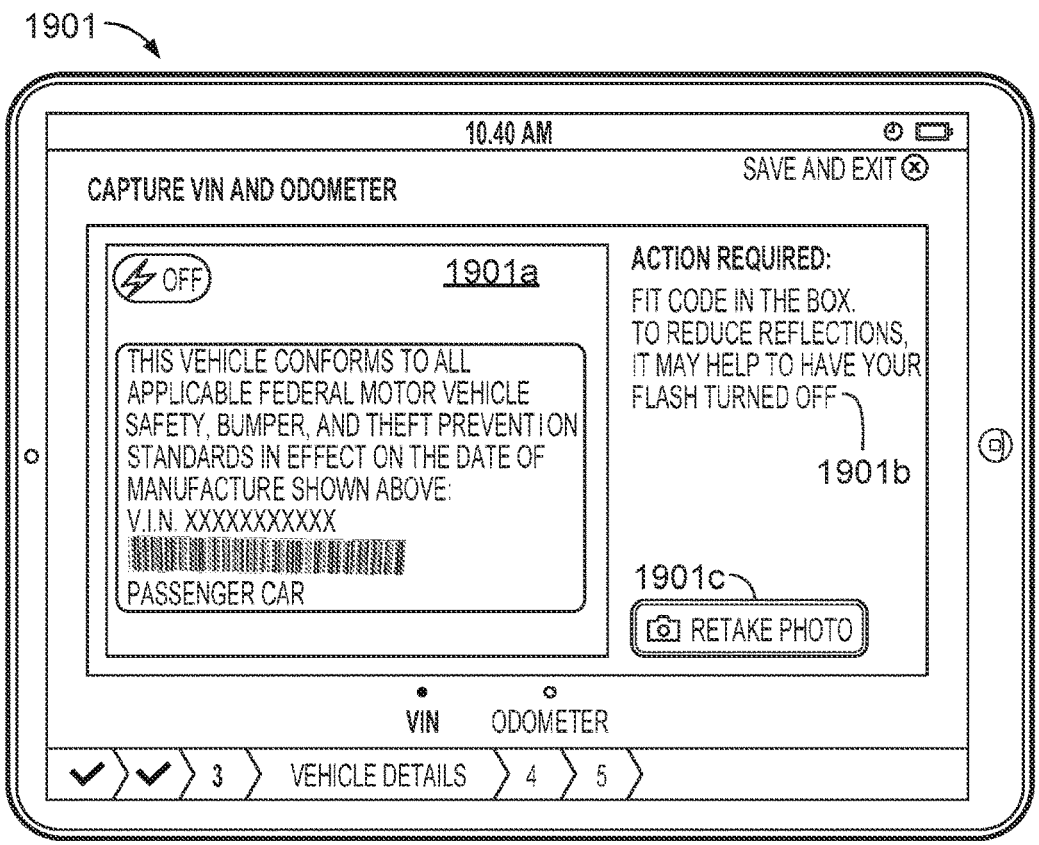
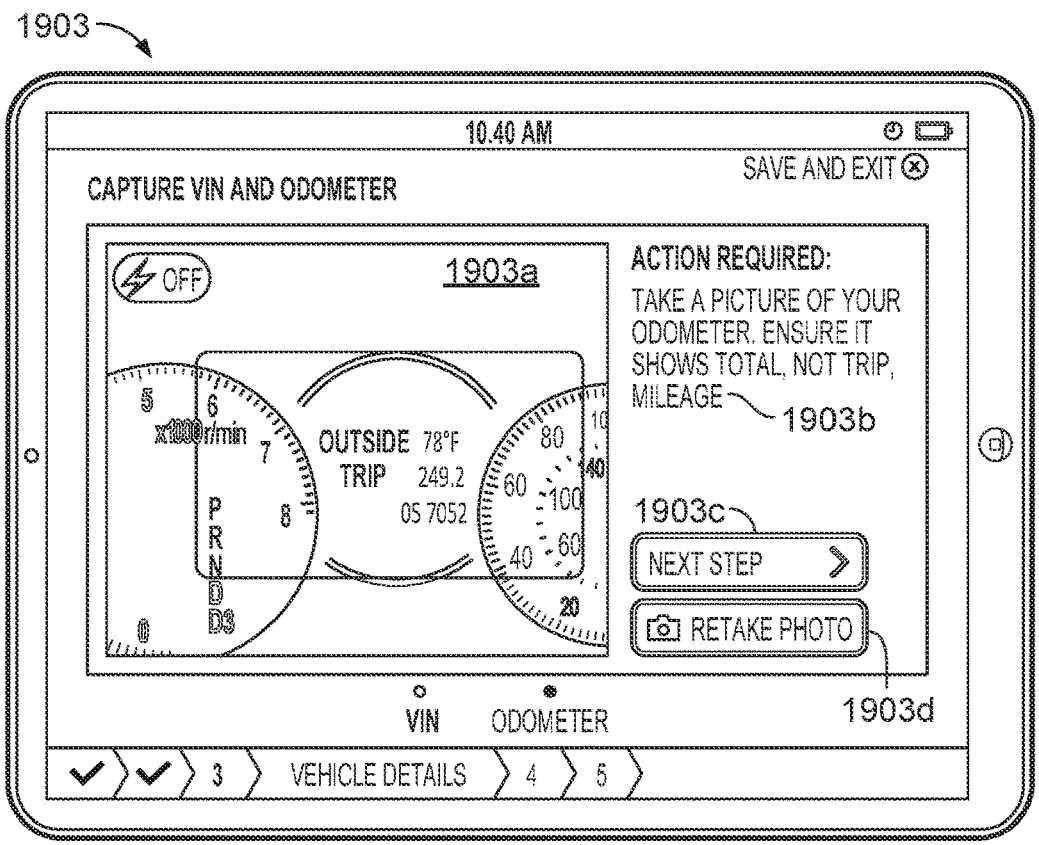
FIG. 19

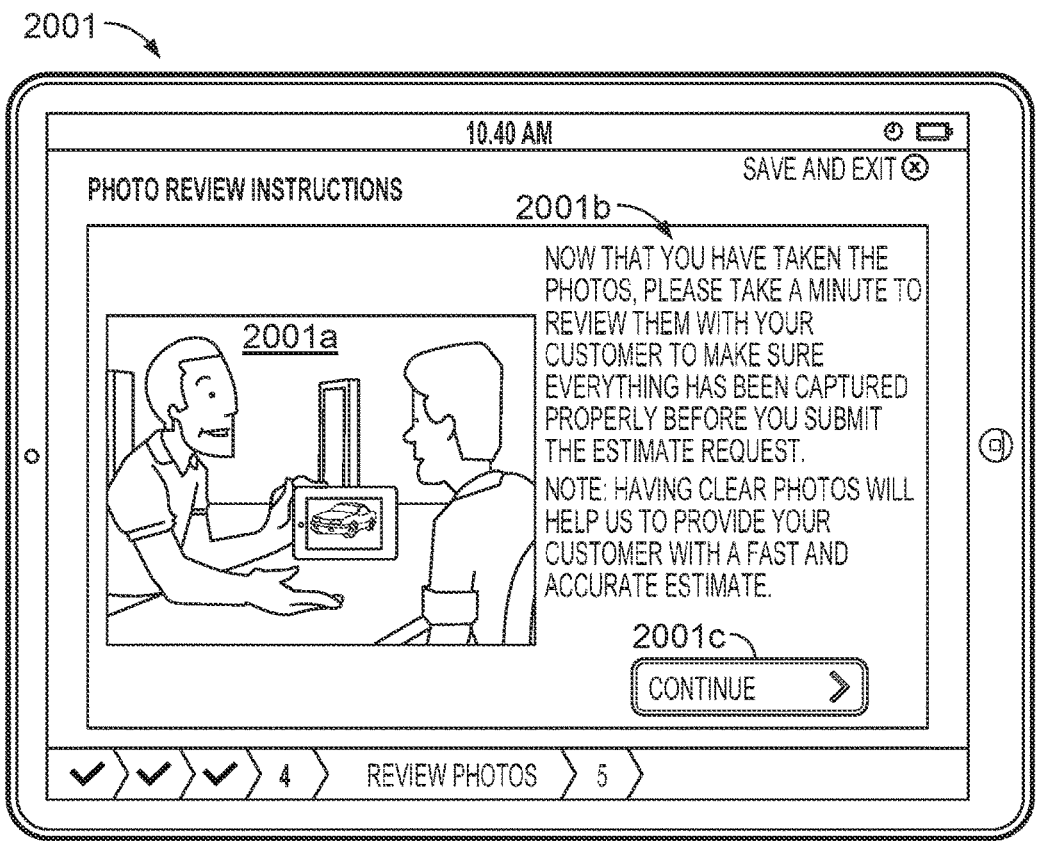
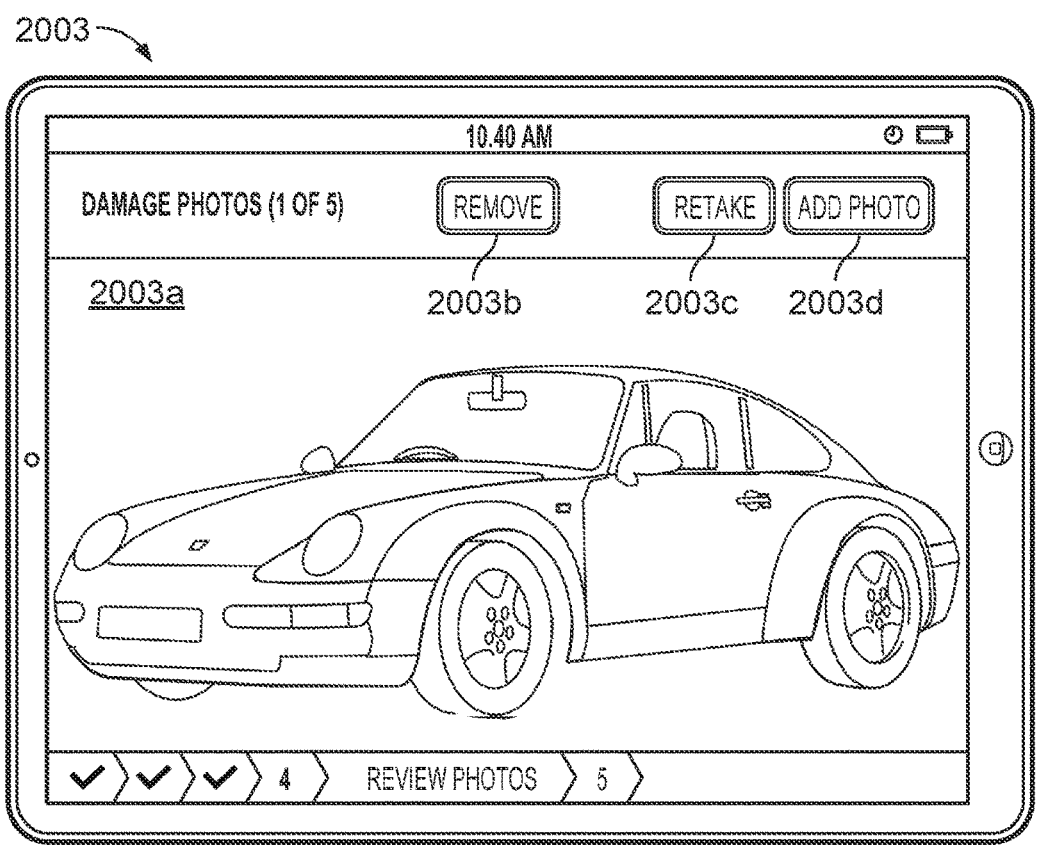
FIG. 20

AGENT-FACILITATED CLAIMS DAMAGE ESTIMATION

CROSS-REFERENCE TO RELATED APPLICATIONS

This application is a continuation of U.S. patent application Ser. No. 16/995,003, filed Aug. 17, 2020, which is a continuation of U.S. patent application Ser. No. 13/834,161, filed Mar. 15, 2013, now U.S. Pat. No. 10,783,585, which is a continuation-in-part of U.S. patent application Ser. No. 13/587,620, filed Aug. 16, 2012, now U.S. Pat. No. 8,510,196, a continuation-in-part of U.S. patent application Ser. No. 13/587,630, filed Aug. 16, 2012, now abandoned, and a continuation-in-part of U.S. patent application Ser. No. 13/587,635, filed Aug. 16, 2012, now U.S. Pat. No. 10,430,885, the contents of which are incorporated herein in their entireties by reference.

TECHNICAL FIELD

The present disclosure relates to systems and methods for analyzing damage to an item for insurance purposes.

BACKGROUND

Conventional insurance claims processing is a complex process that starts with a first notification of loss related to an insured item. Upon notification of loss, the claim may be routed to multiple claims adjusters that analyze different aspects of the damage associated with the insured item in order to determine whether compensation for the loss is appropriate.

In general, conventional claims adjustment can involve paperwork processing, telephone calls, and potentially face-to-face meetings between claimant and adjuster. In addition, a significant amount of time can elapse between a first notice of loss from the claimant and the final settlement of the claim.

In addition, while consumers may take advantage of conventional claims processing to determine if they will receive any compensation for loss associated with an item, consumers have traditionally had very few options for obtaining advice associated with loss prior to submission of an insurance claim.

BRIEF SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the disclosure involve a streamlined and efficient process for claims management and disclose methods, computer-readable media, and apparatuses for automating the processing and settling of claims related to an insured item. A mobile device may transmit data (e.g., images, video, etc.) related to damage associated with an insured item to an enhanced claims processing server. The enhanced claims processing server may manage analysis of damage associated with the insured item and settlement of a claim related to the damage.

In another aspect of the disclosure, an enhanced claims processing server may analyze damage data received from a mobile device to generate a repair cost estimate for repairing the insured item.

In another aspect of the disclosure, an enhanced claims processing server may receive damage data associated with damage to an insured item, prior to submission of a claim for the damage. This data may be analyzed along with other data related to terms of an insurance policy that insures the insured item to provide advice to insurance consumers on the overall monetary valuation of submitting an insurance claim for damage to the insured item.

In another aspect of the disclosure, a user device may be used as a portal that enables a third party entity such as a repair agency to view and learn more about damage associated with an insured item while the damage is still being assessed through a claims adjustment process.

Further aspects of the disclosure may be provided in a computer-readable medium having computer-executable instructions that, when executed, cause a computer, user terminal, or other apparatus to at least perform one or more of the processes described herein.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, serve to explain the principles of the disclosure. In the drawings:

FIG. 10 shows a flow chart for providing pre-claim consultations with a third party entity in accordance with certain aspects of the present disclosure.

FIG. 13 shows two display screens displayed on a user device that allow a user to capture damage information associated with a new claim and/or access information related to claims that have been previously submitted for claims adjustment, in accordance with certain aspects of the present disclosure.

FIG. 14 shows two display screens displayed on a user device for displaying messages associated with a given claim, in accordance with certain aspects of the present disclosure.

FIG. 15 shows a first set of two display screens displayed on a user device for providing user instructions for capturing images related to damage associated with an insured item, in accordance with certain aspects of the present disclosure.

FIG. 16 shows two display screens that display images of damage being captured by a user device, in accordance with certain aspects of the present disclosure.

FIG. 17 shows a second set of two display screens displayed on a user device for providing user instructions for capturing images related to damage associated with an insured item, in accordance with certain aspects of the present disclosure.

FIG. 19 shows two display screens displayed on a user device for displaying instructions related to capturing images for processing a claim associated with damage of an insured item, in accordance with certain aspects of the present disclosure.

FIG. 20 shows two display screens displayed on a user device for reviewing images depicting damage to an insured item, as captured by an imaging device, in accordance with certain aspects of the present disclosure.

DETAILED DESCRIPTION

In accordance with various aspects of the disclosure, methods, computer-readable media, and apparatuses are disclosed through which insurance claims may be settled through an enhanced automated process. In certain aspects, when an enhanced claims processing server receives data regarding an insured item (e.g., a vehicle, etc.) from a computing device (e.g., a mobile device), the server processes the data and manages settlement of a claim associated with the insured item.

The automated process may utilize various hardware components (e.g., processors, communication servers, memory devices, sensors, etc.) and related computer algorithms to generate image data related to damage associated with an insured item, determine if the image data conforms to a predetermined set of criteria, analyze the image data to assess loss associated with the insured item, and determine if a payment is appropriate to the claimant as compensation for assessed loss.

Figure 1:
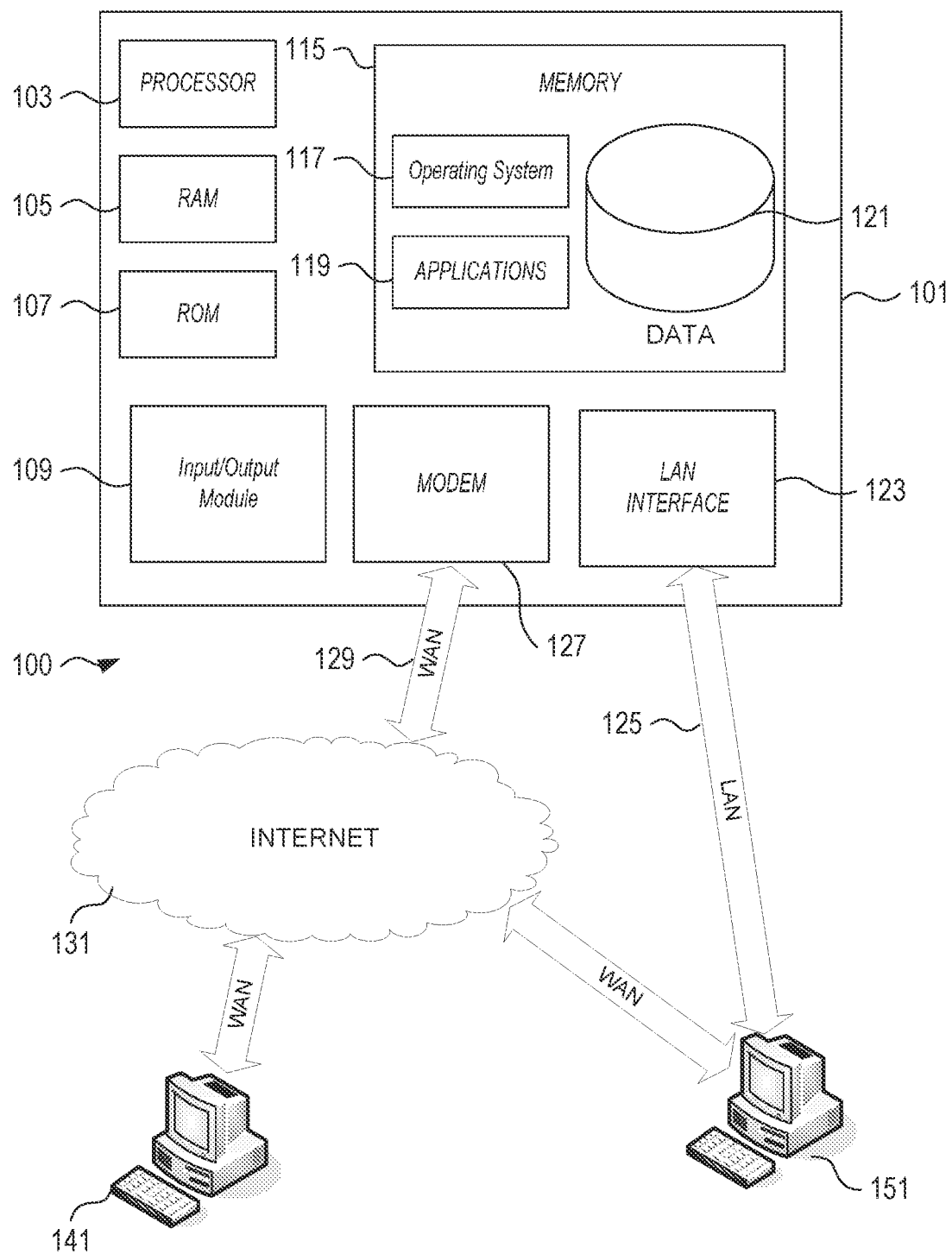
FIG. 1 shows an illustrative operating environment in which various aspects of the disclosure may be implemented.

FIG. 1 illustrates a block diagram of an enhanced claims processing server 101 (e.g., a computer server) in communication system 100 that may be used according to an illustrative embodiment of the disclosure. The server 101 may have a processor 103 for controlling overall operation of the enhanced claims processing server 101 and its associated components, including RAM 105, ROM 107, input/output module 109, and memory 115.

I/O 109 may include a microphone, keypad, touch screen, and/or stylus through which a user of enhanced claims processing server 101 may provide input, and may also include one or more of a speaker for providing audio output and a video display device for providing textual, audiovisual, and/or graphical output. Software may be stored within memory 115 to provide instructions to processor 103 for enabling device 101 to perform various functions. For example, memory 115 may store software used by the device 101, such as an operating system 117, application programs 119, and an associated database 121. Processor 103 and its associated components may allow the device 101 to run a series of computer-readable instructions to analyze image data depicting damage to an insured item (e.g., vehicle, etc.). Processor 103 may determine the general location of damage associated with the vehicle by analyzing images of the vehicle and comparing these images with reference images of a similar vehicle with no damage or with similar damage. In addition, processor 103 may assess the loss associated with the damaged vehicle and transmit terms for settling an insurance claim related to the loss to a user of a mobile device.

The server 101 may operate in a networked environment supporting connections to one or more remote computers, such as terminals 141 and 151. The terminals 141 and 151 may be personal computers or servers that include many or all of the elements described above relative to the server 101. Also, terminal 141 and/or 151 may be data stores for storing image data of insured items that have been analyzed by the enhanced claims processing server 101 in the past. In yet other embodiments, terminals 141 and 151 may represent mobile devices with built-in cameras for capturing image data associated with a damaged item.

The network connections depicted in FIG. 1 include a local area network (LAN) 125 and a wide area network (WAN) 129, but may also include other networks. When used in a LAN networking environment, the server 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the enhanced claims processing server 101 according to an illustrative embodiment of the disclosure may include computer executable instructions for invoking functionality related to calculating an appropriate payment for assessed damage associated with an insured item.

Enhanced claims processing server 101 and/or terminals 141 or 151 may also be mobile terminals including various other components, such as a battery, speaker, camera, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including non-transitory memory storage devices, such as a hard disk, random access memory (RAM), and read only memory (ROM).

Figure 2:
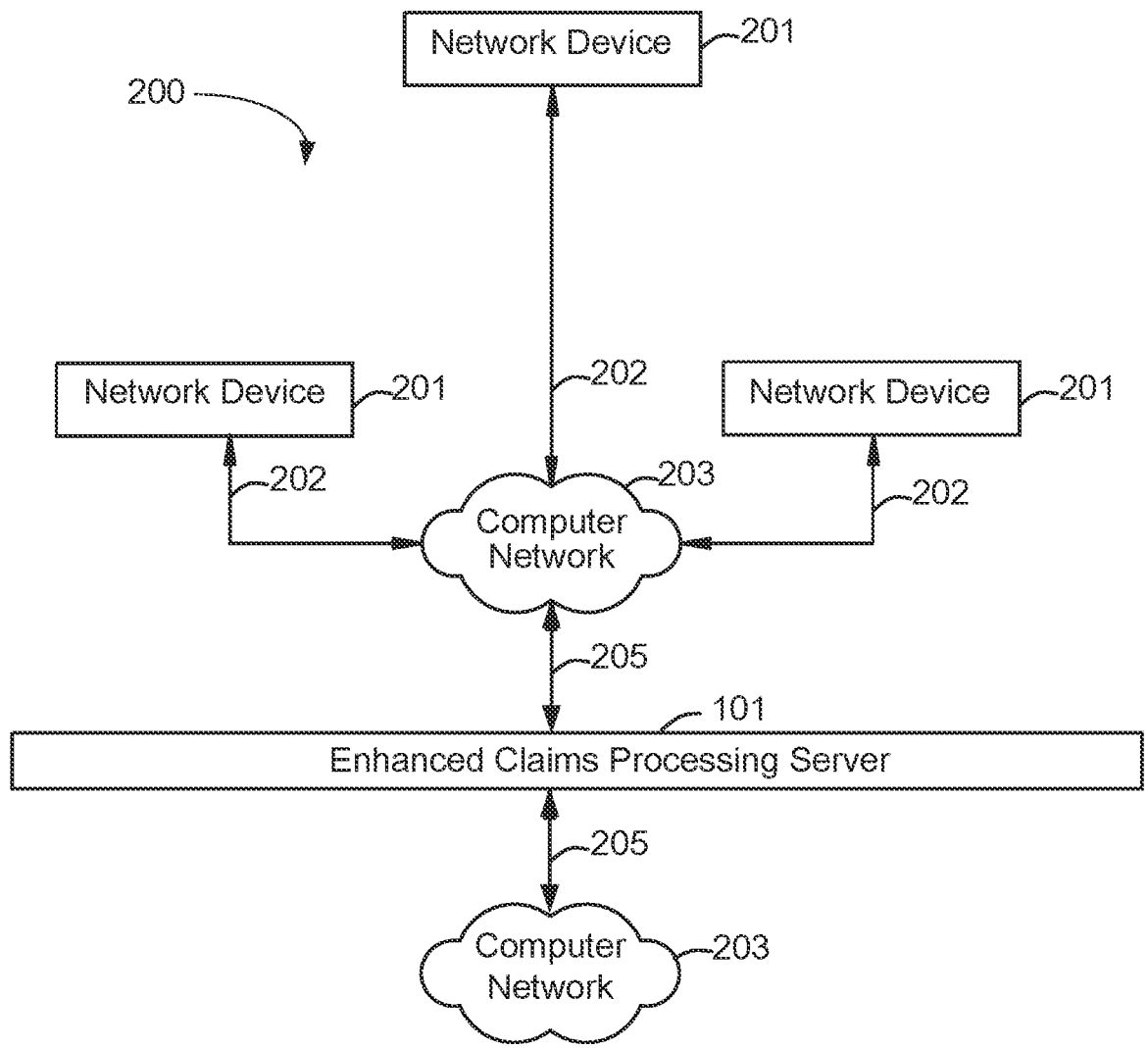
FIG. 2 shows a system of network devices and servers that may be used to implement the processes and functions of certain aspects of the present disclosure.

Referring to FIG. 2, a system 200 for implementing methods according to the present disclosure is shown. As illustrated, system 200 may include one or more network devices 201. Devices 201 may be local or remote, and are connected by one or more communications links 202 to computer network 203 that is linked via communications links 205 to enhanced claims processing server 101. In certain embodiments, network devices 201 may run different algorithms used by server 101 for analyzing image data showing damage associated with an insured item, or, in other embodiments, network devices 201 may be data stores for storing reference image data of insured items. In yet other embodiments, network devices 201 may represent mobile user devices configured to capture image data (e.g., via a camera, etc.) associated with a damaged insured item and to transmit the image data to server 101. In system 200, enhanced claims processing server 101 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between network devices 201 and server 101, such as network links, dial-up links, wireless links, hard-wired links, etc.

The steps that follow in the Figures may be implemented by one or more of the components in FIGS. 1 and 2 and/or other components, including other computing devices.

In accordance with aspects of the disclosure, a user (e.g., a claimant) of a mobile device (e.g., mobile phone, personal digital assistant (PDA), etc.) may take a variety of photos associated with damage to an insured vehicle. The photos may include wide shots of the damaged vehicle, pictures of an identification number associated with the damaged vehicle (e.g., a vehicle identification number (VIN), etc.), current odometer reading, and/or multiple angles/close-up shots of the damage associated with the insured vehicle.

Once the user is satisfied that the appropriate photos have been taken, the user may transmit the photos to an enhanced claims processing server 101. The enhanced claims processing server 101 may be configured to receive and analyze the photos to determine if they meet a predefined set of criteria (e.g., not too blurry, correct angles, etc.) for completeness, accuracy, etc. If the photos do not meet the minimum criteria, server 101 may transmit a message (e.g., via a feedback loop), informing the mobile device that alternative and/or additional photos must be taken. This process of assuring that the photos are compliant for further analysis may be repeated until the user of device 201 has complied with all of the rules set forth by enhanced claims processing server 101. Server 101 may then analyze the photos to generate an output, including a cost estimate to repair the damage associated with the insured vehicle and/or to replace a damaged part of the insured vehicle. In some aspects, to generate this output, server 101 may analyze the photos and determine the location of damage (e.g., exterior parts, etc.), extent of damage, and/or the cost of parts/labor to fix the damage.

In some instances, depending on the amount of damage to the insured vehicle, the cost estimate may represent the cost of replacing the insured vehicle itself. Along with the cost estimate for repair/replacement of the insured vehicle, server 101 may also output various claims documents, including disclosures, brochures, guarantees, etc. If appropriate, server 101 may transmit a payment to the user and/or to an account associated with the user, for the cost of repairing the damage or replacing a part. In addition, server 101 may inform the user approximately how long it will take to repair/replace the insured vehicle.

In some aspects, damage inspection and appraisal in the automated claims processing scheme discussed herein may be completed in thirty minutes or less.

Although embodiments of the disclosure discussed herein relate to an insured vehicle analyzed by enhanced claims processing server 101, one of ordinary skill in the art would recognize that other types of insured items, including homes, may be employed with a similar scheme.

In certain aspects, the use of server 101 may aid in cutting down time between a first notice of loss and settlement of the claim (e.g., real-time settlement of a claim) associated with the loss (e.g., via a payment and/or information regarding repair/replacement of an insured item). In addition, because the methods discussed herein are automated and allow claims adjusters to inspect damages remotely or reduce the involvement of claims adjusters, less time and money may be spent to transport these adjusters to inspection locations. The automated nature of this process may also create the opportunity for remote human inspections of damage associated with insured items.

Also, the technologies used in the claims adjustment processes implemented by server 101 may aid in attracting technology savvy consumers to an entity (e.g., an insurance company) managing server 101.

Figure 3:
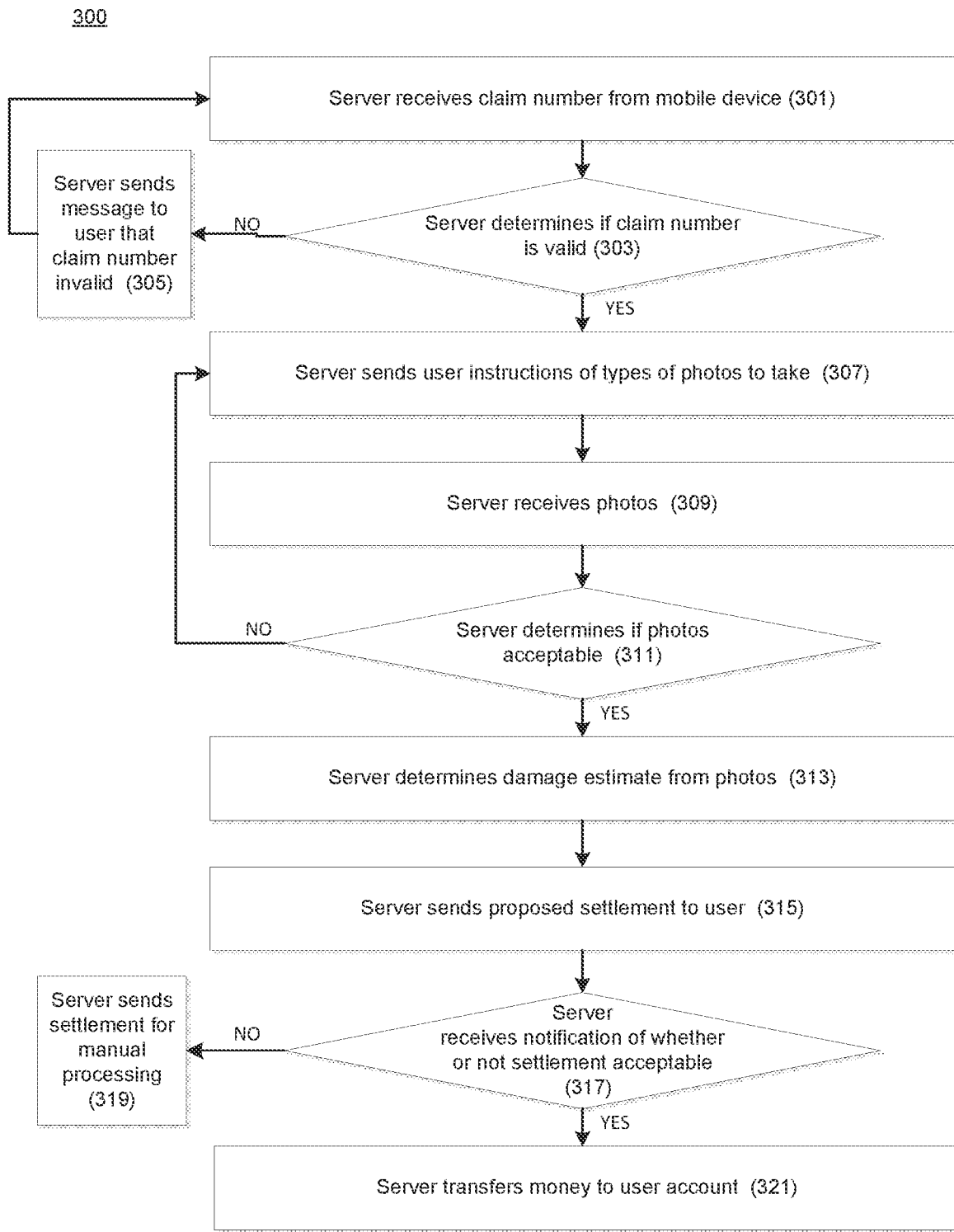
FIG. 3 shows a flow chart for an automated damage assessment process in accordance with certain aspects of the present disclosure.

FIG. 3 shows an automated damage assessment process 300 in accordance with at least one aspect of the present disclosure. In certain aspects, an application related to damage assessment and claims processing may be downloaded onto a mobile device (e.g., iPad™, iPhone™, Android™, etc.) associated with a user (e.g., a customer of an insurance company) to facilitate one or more steps of the process in FIG. 3.

The process of FIG. 3 may start out at step 301 where a user (e.g., a customer) associated with an entity managing enhanced claims processing server 101 (e.g., insurance company) may enter a claim number (e.g., a number related to damage associated with an insured vehicle, etc.) into a damage assessment and claims processing application running on a mobile device (e.g., network device 201). To generate a claim number, a claimant may contact an entity managing enhanced claims processing server 101 (e.g., an insurance company, etc.) with a first notice of loss (FNOL). The claimant may contact the insurance company in any number of ways, including via agent, by phone, by email, via a company website, etc. As part of the FNOL, the claimant may provide basic identifying and/or validating information (e.g., name, age, claim number, etc.) and vehicle information, including the make, model, and year of manufacture. The claimant may also provide the general areas of damage to the vehicle and any other relevant details (e.g., condition of glass, under carriage, engine, wheels, airbags, etc. associated with the vehicle). In one embodiment, this information may be provided from a remote location (e.g., location of an accident, claimant's home, agent's office, etc.) using an application loaded onto a smart phone or tablet (e.g., iPad™, iPhone™, Android™, etc.).

The mobile device may then transmit the entered claim number and related information to enhanced claims processing server 101. The process may then move to step 303 where server 101 may determine if the claim number received in step 301 is valid. If server 101 determines that the claim number is not valid, then server 101 may transmit a message to the mobile device, stating that the claim number is invalid in step 305. The user may then enter another claim number (step 301).

If server 101 determines that the claim number is valid, the process may move to step 307 where server 101 may send the user instructions of the types of image data (e.g., photos, video, etc.) that should be captured of damage associated with the insured vehicle. It should also be noted that in some embodiments server 101 may not receive a claim number and may proceed in providing user instructions on the types of image data that should be captured without receiving a claim number. The user may receive instructions on various types of photos/video, including photos/video of the entire vehicle, VIN door tag, current odometer reading, and/or the damaged areas. In some aspects, the user may capture image data related to at least two different angles of the damage for each panel (e.g., hood, fender, door, bumper, etc.) based on an initial claim description.

When the user of the mobile device receives these instructions, the user may use a camera associated with the mobile device to take the photos and transmit these photos to the server 101. The user may be allowed to preview each photo before selecting the image. Once a photo has been selected, the image may be shown on a display associated with the mobile device under a photo type (e.g., a photo of the entire vehicle, VIN door tag, current odometer reading, and/or damaged area). If the user is not satisfied with any photo, the user may delete the photo by selecting it and then retake the photo. In some aspects, the user may annotate the photos (e.g., by drawing a line from one end of the dent to the other, etc.) prior to transmitting them to server 101. In yet other embodiments, server 101 may itself annotate any received photos/video.

In some embodiments, any approved photo may not be sent to server 101 until all of the images have been captured. In some aspects, server 101 may support a website interface through which photos may be uploaded by a user of a mobile device. Also, the use of multiple photos (e.g., via stereoscopic techniques), video (e.g., by walking around the vehicle to generate a complete view), and/or three-dimensional photos/video may assist in determining the depth of damage to a vehicle. In some aspects, determining the depth of damage may help in classifying the damage (e.g., a turbulent dent versus a dish dent). In addition, the degree of damage by area and depth may be automatically estimated through tools similar to ultrasound tools. Knowing the depth of damage may also assist in automatically determining the cost of repair or replacement. In addition, as the user is taking video/photos of damage associated with the insured vehicle, a claims adjuster associated with an entity managing server 101 (e.g., an insurance company) may interface with the user in real-time (e.g., via messaging, phone, email, etc.) as the photos are being sent to the adjuster and/or as the video is being streamed to the adjuster and describe to the user the photos/video that still need to be taken and/or where to place a camera as the photos/video are captured.

After server 101 receives image data transmitted from a mobile device in step 309, server 101 (or an individual/group associated with the entity managing server 101) may determine if the photos are acceptable in step 311. For instance, server 101 may determine that the photos are too blurry and/or that the photos do not capture the correct angles to clearly show damage associated with the insured vehicle. As an example, server 101 may employ a bar code scanning mechanism and/or an optical character recognition (OCR) system for detecting the VIN from a submitted photo. In other aspects, the mobile device itself may use a bar code scanning mechanism and/or an OCR system for determining the VIN number. In this example, if the VIN cannot be detected from the photo and/or using these techniques, then the submitted photo may be deemed to be unacceptable. If server 101 determines that that the photos are not acceptable, the process may move back to step 307 where the server 101 may send the user instructions on what types of photos to take and/or what changes need to be made to the previously submitted photos. In yet other embodiments, a dispatcher associated with an entity managing server 101 (e.g., an insurance company) may determine if submitted photos are acceptable. In other embodiments, the mobile device may itself determine if any given photo is blurry and/or inaccurate and prompt the user to retake the photo. In this aspect, the application for damage assessment and claims processing running on the mobile device may have computer-executable instructions stored within a memory of the mobile device for automatically detecting and/or rejecting a photo/video captured within a given category.

If server 101 determines that the photos are acceptable, server 101 may attach the photos to the user's claim in a database associated with server 101. Server 101 may also determine a damage estimate (e.g., an estimate for repairing and/or replacing any damaged parts) after analyzing the photos in step 313 based on predefined rules. The damage estimate may be generated by comparing the photos submitted by the mobile device with photos of similarly damaged vehicles or with photos of non-damaged vehicles of similar make/model. To perform this comparison, server 101 may access a database (e.g., network device 201) of photos of vehicles with various types of damage and/or vehicles with no damage. To initially populate the database with photos for later use, each user may be required to upload various photos of a vehicle upon purchase of the vehicle. Also, as server 101 analyzes recently submitted photos, previously uploaded photos of a given vehicle may be used to determine any pre-existing damage on the vehicle. Once database 201 includes photos/video from many cases of vehicle damage, server 101 may determine a damage estimate for a new case based on the prior cases.

Server 101 may not need to build a new damage estimate piece-by-piece for a given damaged vehicle. In this regard, server 101 (or an individual/group associated with the entity managing server 101) may generate a new damage estimate based on a holistic view of a damaged vehicle. Over time, server 101 may build a database (e.g., network device 201) of specific damage templates (e.g., damages to more than one part of a vehicle that are commonly associated with one another) and estimated/actual costs for repairing damages associated with these templates. Once this database has been built, damage estimates associated with subsequently analyzed vehicles may be generated from a holistic view of the vehicles by accessing information within the historical database.

For instance, if a first type of damage to the front bumper of a vehicle is commonly associated with a second type of damage to the headlights of the same vehicle and this damage template is associated with a predetermined repair cost in the database, server 101 may use this repair cost to generate a new estimate for subsequent vehicles that exhibit damage similar to this damage template.

In one example, the damage estimates retrieved from the historical database may be adjusted based on differences associated with a current case. For instance, the damage estimate may be adjusted based on the average inflation rate (e.g., for parts, labor, etc.) between the date at which the damage estimate within the historical database was generated and the current date. In other embodiments, the damage estimate may be adjusted for small differences such as the make, model, and year of manufacture when the vehicle in the historical database and the currently analyzed vehicle are compared. Similarly, the damage estimate may be adjusted based on differences in the precise damage associated with the vehicle in the historical database and the damage associated with the vehicle currently being analyzed. In yet other examples, the damage estimate may be adjusted based on the terms of an insurance policy that covers damage to the insured vehicle currently being analyzed. One of ordinary skill in the art would understand that any number of factors may be considered when adjusting the damage estimate retrieved for vehicles stored in the historical database to more accurately reflect a damage estimate for a currently analyzed vehicle.

In other aspects, when a vehicle exhibits more than one type of damage, server 101 may access the historical database multiple times (one for each type of damage) and then add one or more interaction terms to the sum of the cost estimates for each type of damage. For instance, extending the example above of damage to a front bumper and to the headlights of a vehicle, server 101 may generate a first damage estimate for repairing the front bumper and a second damage estimate for repairing the headlights. Server 101 may then add these two damage estimates to generate a total damage estimate.

In this embodiment, server 101 may also calculate an interaction term (which may be a positive or a negative value) that represents either an increased (e.g., because the damages taken collectively introduce more complexity and are thus more expensive to repair than if handled individually) or decreased (e.g., because the damages taken collectively have overlapping repair procedures and are thus less expensive to repair than if handled individually) cost of repairing the vehicle when both of these types of damages occur together. The effective total damage estimate may then be the sum of the total damage estimate and the interaction term.

One of ordinary skill in the art would understand that a given damage template may be built based on any number of specific damage types/locations. In addition, server 101 may generate any number of interaction terms for a given analysis. For instance, if a damage estimate is based on damage to three parts of a vehicle, server 101 may generate interaction terms that relate to increased/decreased cost associated with repair to the following part groups: the first two parts, the first and third parts, the second and third parts, and all three parts at once. In other embodiments, server 101 may generate an interaction term for only some of the damaged parts.

In certain aspects, server 101 may also query the claimant with regards to the type of third party service provider (e.g., repair shop, etc.) they would prefer after damage analysis and claims processing is complete.

In other aspects, exterior damage associated with the vehicle may be used to predict (e.g., via predictive modeling using the database of past assessed exterior/interior damage for other similar cases, etc.) the likelihood of interior (e.g., mechanical, cabin, etc.) damage to the vehicle and/or potential difficulties in repairing the vehicle.

Once the image data has been analyzed, server 101 may include computer-executable instructions to recognize the extent of damage to various parts of the vehicle (e.g., chassis, etc.), including various types of dents and edge damage, and to identify various parts of the vehicle.

In some aspects, the detection of damage to the vehicle may be based on object recognition algorithms that compare images (e.g., comparing x, y, and z coordinates of each point on the images) of the vehicle in question to reference images of similar vehicles (e.g., same model, make, year of manufacture, etc.) with no damage. More specifically, server 101 may access a database of images storing the reference images of vehicles of various models and makes. By using object recognition/edge detection algorithms (e.g., involving blur filters, gray-scaling, custom algorithms, etc.), server 101 may determine where damage is located as well as the potential size/area of the damage. Server 101 may also access internal/external databases storing images, damage depth map information (e.g., from previously assessed analyses, etc.), and/or processed claims reports from damaged vehicles that server 101 has assessed previously. In particular, server 101 may access images/depth map information from previously assessed damaged vehicles for use as a guidepost in assessing the damage of a new vehicle. If no reference information (e.g., data, images) exists, axis symmetry information may also be used to identify possible irregularities and/or damage.

In some aspects, the algorithm employed by server 101 may use a comparison of an image of a damaged vehicle with an image of an undamaged version of the same vehicle to "subtract out" and isolate the damaged area of a vehicle. If an exact replica of an undamaged vehicle corresponding to a damaged vehicle under study is not available for this comparison, server 101 may further use various additional image processing algorithms, including blurring filters, etc. to detect a damaged portion of a vehicle.

In additional aspects, server 101 may grayscale all image data to make processing faster. Further, edge filters may be applied to both the image data from the damaged vehicle and its corresponding reference image data so that the edges of a damaged area may be "subtracted out" and identified in the image data of the damaged vehicle. Once the damaged area has been identified in the image data, server 101 may further process the damaged area to sharpen the area, to make the edges more prominent, and to fill any missing links found in the edges. Afterwards, server 101 may color, texture, and/or otherwise "fill in" the damaged area surrounded by the edges and extract the damaged area from the surrounding image data. Once the damaged area has been isolated, server 101 may calculate the precise area of the damage.

Similarly, server 101 may determine the depth of a damaged area (e.g., via stereoscopic methods, etc.) and may analyze raw depth data to further investigate points of interest (e.g., a point that has a much larger depth than surrounding points, etc.). Using this analysis, the damaged area may be further characterized (e.g., a dented area may be detected and if, for example, the general slope of the dent is high, the dent may be characterized as deep and rounded whereas if the slope is low, the dent may be characterized as shallow.)

In addition, if the server 101 retrieves image data or claims reports associated with a similar or the same previously analyzed vehicle that has similar or the same types of damage (e.g., as a result of a similar accident to a similar vehicle or part, etc.) as a vehicle currently being analyzed, server 101 may use a damage analysis or cost estimate of identifying/repairing the damage or replacing a damaged part of the previously analyzed vehicle to generate a damage analysis/cost estimate for the currently analyzed vehicle. In other words, server 101 may perform one or more database queries to match characteristics of the current analysis with previous analyses. For instance, the queries may seek to match the size, depth, and location of a dent on a current vehicle with a similar dent on a vehicle with a similar chassis configuration, make, model, and year of manufacture. For instance, consider a case where the vehicle in question is a new model that has not been analyzed before by server 101. In this scenario, server 101 may attempt to match the vehicle currently being analyzed with its closest match, which in this case may be a similar model from the previous year with the same chassis configuration (e.g., a twin chassis configuration).

In matching a vehicle currently being analyzed with one that has been previously analyzed, server 101 may assign a confidence factor to the match. Server 101 may assign the highest confidence factor (e.g., a confidence factor of 100%) to a comparison between the exact same types of vehicles (e.g., cars of the same make, model, year of manufacture, etc.) having the exact same type of damage (e.g., a predetermined type of dent, etc.). For instance, a comparison between vehicles with two completely different types of damage would have a confidence factor of 0%. As the similarities between the currently analyzed vehicle and previously analyzed vehicles are reduced, server 101 may assign a lower confidence factor to the comparison. For instance, output drawn from comparisons between vehicles of the same make and model but with different years of manufacture may be associated with a slightly lower confidence factor than 100%. In some aspects, confidence factors may decrease further when vehicles of different models and years of manufacture (e.g., vehicles with different chassis configurations, trim line configurations, etc.) but the same make are compared. In one embodiment, server 101 may assign a threshold confidence factor (e.g., 70%, etc.) below which output generated by a comparison performed by server 101 may not be considered reliable. If the confidence factor associated with a comparison between two vehicles falls below this threshold and there is no reliable comparison within the database, server 101 may then use physical details of the damage (e.g., size, location, area, etc.) to provide output such as a cost estimate for damage repair/replacement and/or the amount of time required for repair/replacement.

Server 101 may also use stored data to determine appropriate vendors for repairing/replacing the vehicle and the amount of time for repair/replacement. The wait time for repair/replacement may depend on various factors, including the size (e.g., area, depth, etc.), classification (e.g., turbulent dent, etc.), and location of the damage.

In addition, server 101 may determine if parts nearby to damaged parts may also need to be blended into the damaged area. In other words, if a part of the vehicle needs to be refinished (e.g., repainted) either because it is being replaced or repaired, parts within a predetermined distance of the repaired/replaced part may need to be blended (e.g., color-matched) to the repaired/replaced part.

In some aspects, server 101 may acquire the knowledge of all previous claims processed by server 101, as well as the knowledge of human adjusters, to accurately process future claims. In this way, server 101 may use machine learning to evolve its cost and/or repair estimation procedure based on past experience.

To estimate the cost and repair/replacement time associated with the damage to the vehicle and to determine whether to suggest that the vehicle be replaced or repaired, server 101 may also consider the extent/severity of the damage (area, depth, location, classification, etc.). For instance, damage to a character line (e.g., edge of a door associated with the vehicle) would be more difficult (e.g., more expensive and/or more time-consuming, etc.) to repair than damage to a more central location on the vehicle. Server 101 may also consider the actual cash value and the salvage value of the vehicle and any relevant local, state, and national laws in this analysis. In some aspects, server 101 may generate a rough cost estimate of repairing the damage just based on the extent of the damage; then server 101 may refine this estimate by analyzing previous cost estimates provided by server 101 and/or actual repair data received from third party service providers (e.g., repair shops, etc.) that have repaired similar vehicles with similar damage. In additional aspects, server 101 may generate a basic cost estimate by taking into account factors such as the number of hours predicted for the repair, the labor rate, and the current market conditions. In this aspect, server 101 may compare this basic cost estimate with the cost of merely replacing the vehicle (e.g., a total loss) or the damaged part within the vehicle and based on the comparison, server 101 may suggest the cheaper option. These estimates may also be transmitted to existing platforms (e.g., Audatex®, Mitchell®, etc.) for comparison purposes.

If the analyzed damage to the vehicle is different from the damage indicated by the claimant during the FNOL, server 101 may query the claimant as to the discrepancy. For instance, if the claimant initially provided information relating to damage on the left side of the vehicle but server 101 discovers that the primary damage occurred on the right side, server 101 may question the claimant as to when the damage occurred (e.g., was the damage due to a previous incident or preexisting condition?, is the claimant being truthful?, etc.). Server 101 may also ask the claimant to sign a statement as to the truth of the information provided. The claimant may have the option of answering the questions as they come up or the questions may be queued until the server 101 has finished processing the image analysis of the vehicle. If discrepancies between the claimant's answers and the analyzed damage to the vehicle continue to exist, server 101 may request the involvement of a human claims adjuster.

In other embodiments, a technician associated with an entity managing server 101 (e.g., an insurance company) may analyze the photos to determine a damage estimate. Also, in certain aspects, the process discussed herein may allow a user to upload photos/video that fall into alternative and/or additional categories (e.g., photos for each vehicle part, etc.).

As part of the image/video damage analysis, server 101 may ask the user to compare damage associated with the insured vehicle to damage depicted in a series of photos/video sent by server 101. In other embodiments, server 101 may request that the user classify the type of damage associated with the insured vehicle. For instance, server 101 may ask the user questions such as, "Does the damage to your vehicle look more like the damage shown in photo A or photo B?" Server 101 may ask any number of questions until server 101 has reached a clear understanding of all the damage to the insured vehicle and a damage estimate can be calculated.

In some ways, this process may allow the user to estimate the damage to the insured vehicle. As an example, consider a scenario where a driver's side door is dented and the driver's side window is cracked in a four-door sedan. Assume that the damage is centrally located on the driver's side window and door. Once server 101 receives a valid claim number related to this damaged sedan, server 101 may transmit, to a user device, one or more images depicting various types of damage to the driver's side window and door of four-door sedans that have been previously analyzed and/or stored in memory. The first image or images transmitted to the user device may be based on previously submitted information regarding an accident that caused the damage or any other type of input provided by a claimant and/or related parties. Thus, the first image or images transmitted to the user device may not depict damage that precisely conforms to the damage of the sedan currently being analyzed. For instance, if two images are initially transmitted to the user device, one of the images may depict damage to the corner of the driver's side window and door and the other image may depict damage that is located closer to the center. In this scenario, a user of the user device (e.g., a mobile phone), upon analyzing the two images, may select the image that depicts the centrally-located damage. The mobile device may then transmit the selection to server 101, and server 101 may use this information to generate a damage estimate.

Alternatively, suppose that both images initially transmitted from server 101 depict damage to the corner of the driver's side door and window in a four-door sedan. In this scenario, if both images are equally unrepresentative of the damage to the sedan in question, the user may transmit a message to server 101, stating how the reference images are equally unrepresentative. In response to this message, server 101 may transmit another image or images responsive to the information provided by the user in the message. Once again, the user may select one or more images that most closely depict damage to the sedan in question. Suppose that, on the second pass, server 101 again transmits two images and that, in this instance, both images depict damage to four-door sedans with centrally-located damage to the driver's side door and window. However, suppose that one of the images does not depict damage that is as severe as that exhibited by the sedan in question. In this scenario, the user may choose the image that depicts damage with the severity level consistent with the damage to the sedan in question.

By iterating through multiple rounds of image analysis and data exchange between server 101 and a user device, server 101 may, with each successive round, determine more precisely the damage associated with the sedan in question. When server 101 determines that the damage to the sedan has been fully characterized, server 101 may use the various responses provided by the user device to calculate a damage estimate for the damage to the sedan and transmit a settlement based on the calculated estimate.

In other embodiments, server 101 may transmit an insurance claim to a claims adjuster for manual processing of the claim if server 101 cannot calculate an accurate damage estimate after a predetermined number of question/answer rounds.

In additional embodiments, the user may transmit audio (e.g., by speaking into the mobile device, etc.) and/or an audio file that includes a description of what happened to cause the damage to the vehicle (e.g., the specifics of an accident, etc.). This audio/audio file may be translated into text and incorporated into the photos/video of damage and/or analyzed to determine if the damage matches any narrative description provided by the user. Also, the user may transmit a text file describing damage and/or an accident that caused the damage. In yet other embodiments, the user may capture and transmit the sound of the vehicle being started and/or the sound of the vehicle running to server 101 (e.g., to determine if a muffler associated with the damaged vehicle is broken, etc.).

Based on the analysis and the damage estimate, server 101 may transmit a proposed settlement (e.g., cash compensation, etc.) for the assessed loss to the user of the mobile device in step 315. After the user receives the proposed settlement, the user may notify server 101 whether or not the proposed settlement is acceptable in step 317.

If the settlement terms are not acceptable, then the process may move to step 319 where server 101 may transmit the settlement to a claims adjuster for manual processing. If the settlement terms are acceptable, the process may move to step 321 where server 101 may transfer any funds related to the assessed loss directly to a bank account associated with the user.

In some aspects, users may provide feedback designed to evaluate their experience through process 300. This feedback may be used to improve process 300 for future users and may involve the use of surveys, questionnaires, email, etc.

In other aspects, server 101 may determine and/or transmit supplemental adjustments to an initial damage/repair estimate. For instance, server 101 may determine that there is a 95% chance that repair option A must be performed, a 50% chance that additional repair option B must also be performed, and a 10% chance that additional repair option C must also be performed. When a repair shop examines the damage to a damaged vehicle and notices that there is less/additional damage, server 101 may use this information to revise an initial damage estimate with a supplemental adjustment to the initial estimate. Also, in cases where server 101 predicts that there may be many supplemental adjustments (e.g., above a predetermined threshold number of supplemental adjustments) to the initial estimate of damage, a claims adjuster may manually evaluate the damage and determine the likelihood of each of the supplemental adjustments.

In addition, server 101 may provide the user with a list of repair facilities for repairing the vehicle. Once the vehicle enters the repair process, messages may be pushed to the mobile device of the user to identify where the vehicle is located is in the repair process (e.g., which step of the repair process is the current step, etc.). These messages may identify who is working on the vehicle and/or may include photos/video of the vehicle as it is being repaired. The messages may also identify when the repair process may be completed.

In some aspects, some types of claims may be excluded from the automated process illustrated in FIG. 3. These claims may include comprehensive claims, claims with injuries to any involved parties, claims involving non-drivable vehicles or air bag deployments, claims with loss descriptions that include undercarriage/mechanical damage, claims involving motorcycle and/or recreational vehicle (RV) losses, and claims involving users that already have an estimate for damage associated with an insured vehicle.

Figure 4:
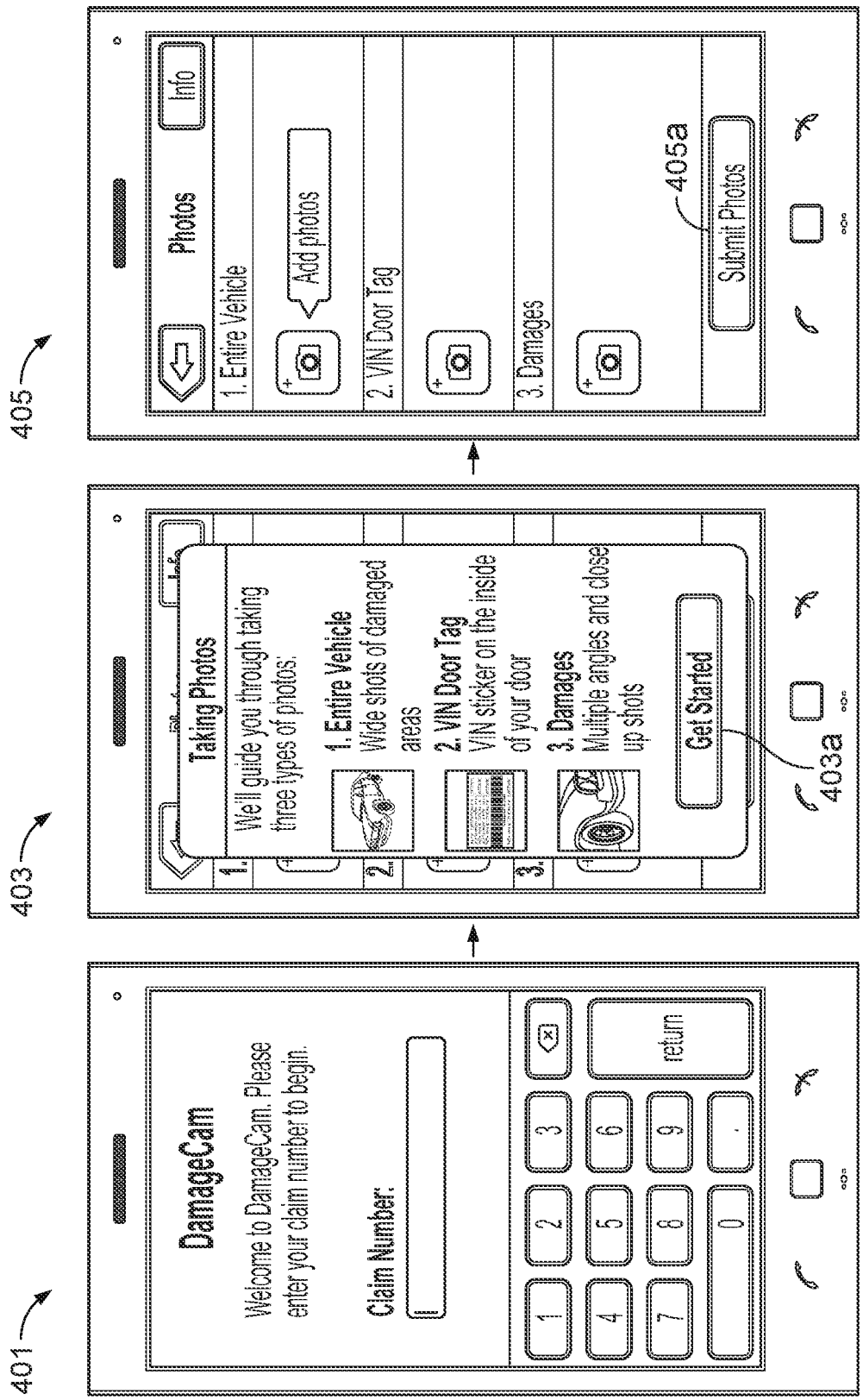
FIG. 4 shows a series of initial display screens displayed when a user starts a damage assessment and claims processing application stored on a mobile device in accordance with certain aspects of the present disclosure.

FIGS. 4-8 show various display screens displayed to a user of a mobile device in accordance with at least one aspect of the present disclosure. FIG. 4 shows a series of initial display screens displayed when a user starts a damage assessment and claims processing application stored on a mobile device (e.g., network device 201) in accordance with at least one aspect of the present disclosure. Screen 401 may be the initial screen that the user views upon starting the application. Screen 401 may allow the user to enter a claim number to begin a damage assessment and claims processing method. In certain aspects, the claim number may be used to compare a damage estimate generated by analysis of photos submitted by the user to a damage estimate generated manually by a claims adjuster using more conventional claims adjustment techniques. Once a user enters a valid claim number, the mobile device may display screen 403, where the user is presented with photo instructions that explain to the user the types of photos that should be taken. Screen 403 may include instructions on taking photos of the entire insured vehicle, VIN door tag, current odometer reading, and any damaged areas of the insured vehicle. When a user presses the "Get Started" button 403a on screen 403, the mobile device may display screen 405, which allows a user to select and start taking any of the types of photos listed in screen 403 (e.g., photos of the entire vehicle, VIN door tag, current odometer reading, and/or damaged areas). The "Submit Photos" button 405a on screen 405 may be inactive until at least one photo of each type is taken by the user.

Figure 5A:
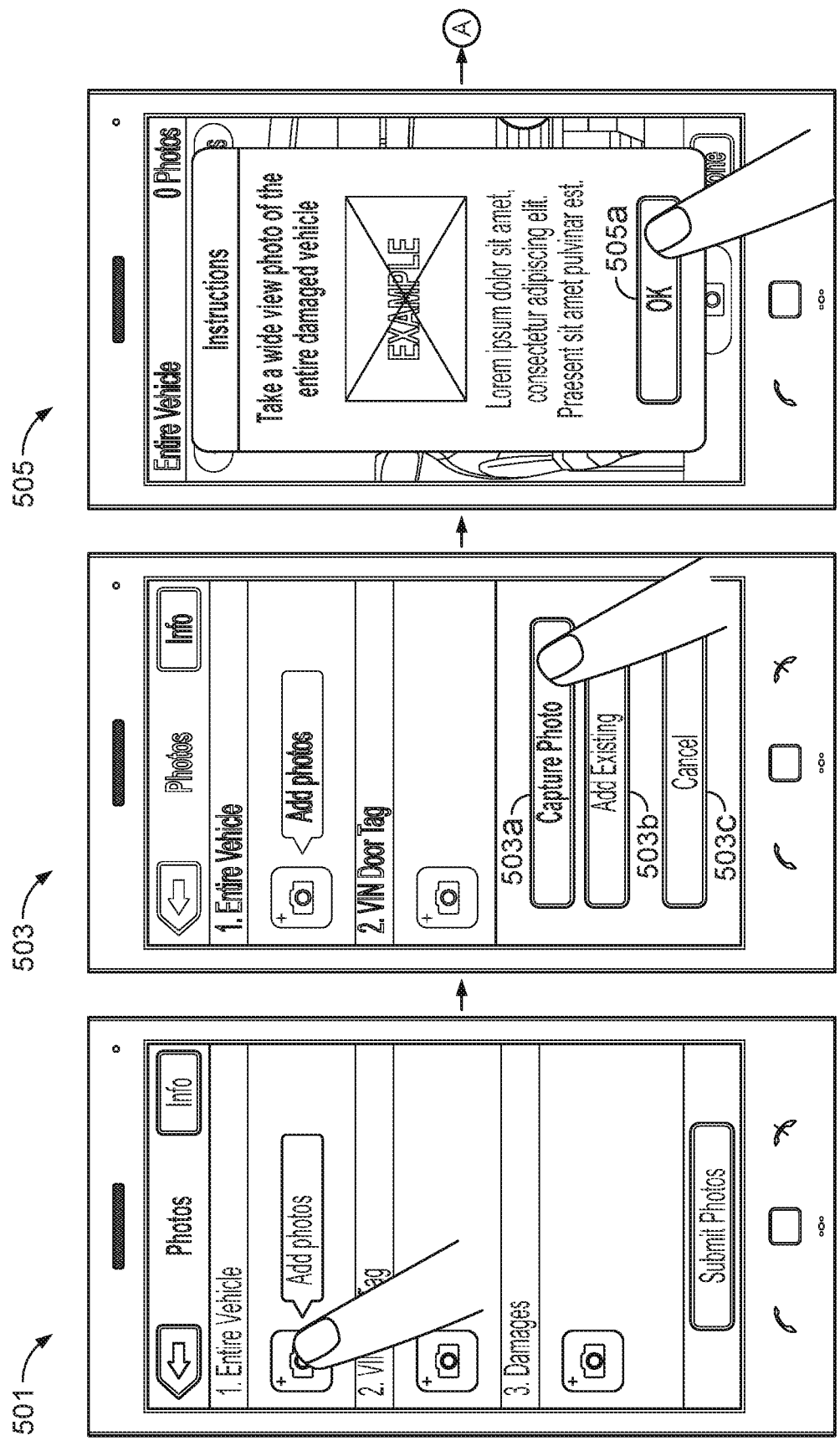
FIG. 5a shows a first series of display screens displayed on a mobile device as a user takes photos of a damaged vehicle in accordance with certain aspects of the present disclosure.
Figure 5A:
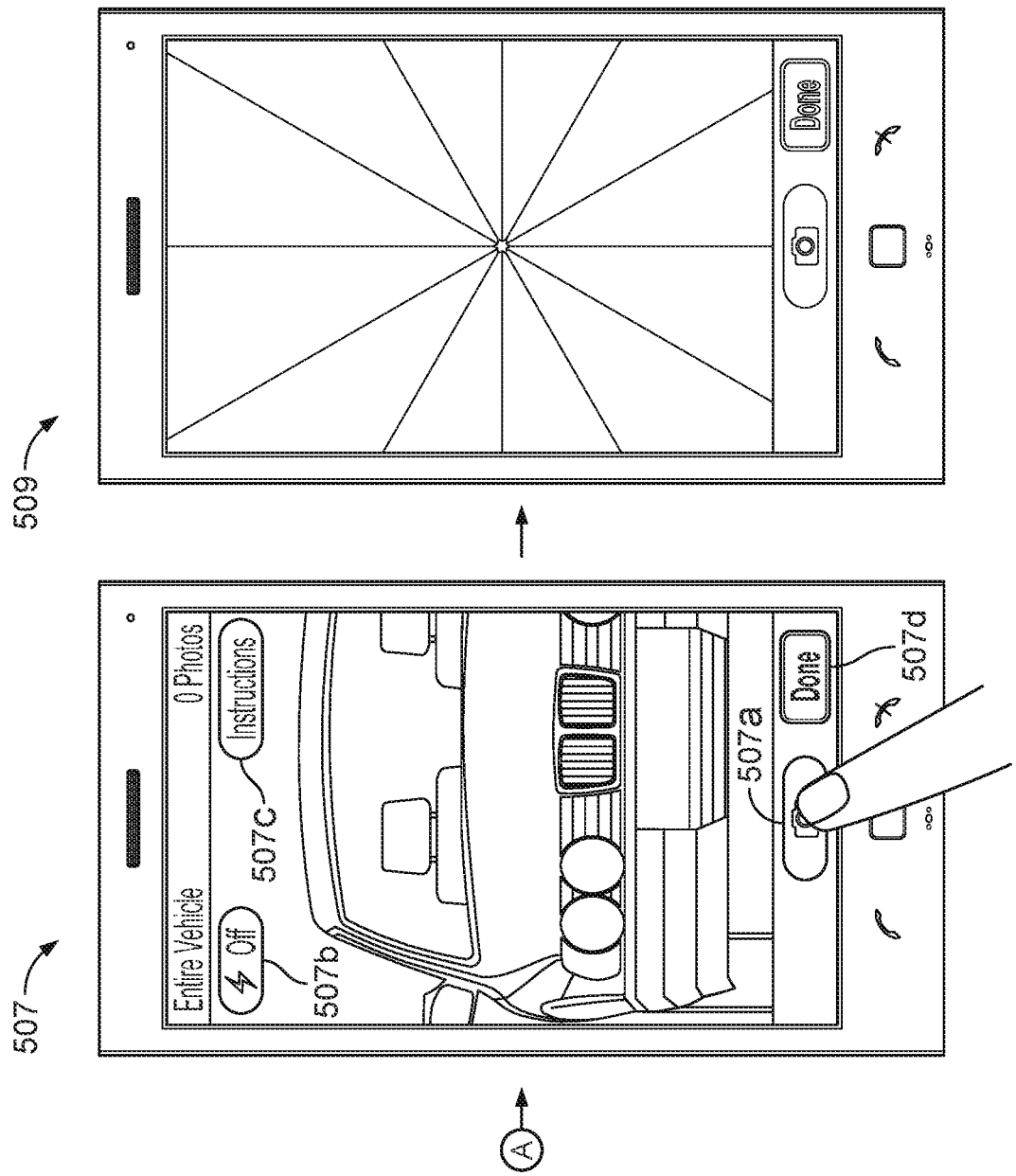

FIG. 5a shows a first series of display screens displayed on a mobile device as a user takes photos of a damaged vehicle in accordance with at least one aspect of the present disclosure. In display screen 501, the user may select to take a photo of the entire vehicle, the VIN door tag, and/or the specific damaged area(s). In the example of FIG. 5a, a user selects to take a photo of the entire vehicle. When a user selects one of the photo categories in screen 501, screen 503 may allow the user to select the "Capture Photo" button 503a to start the camera functionality within the mobile device, the "Adding Existing" button 503b to choose a photo from the photo roll, and/or the "Cancel" button 503c to cancel out of the previous command.

Assuming that the user selects the "Capture Photo" button 503a in screen 503, the mobile device may display screen 505 where instructions related to the current photo type (e.g., a wide view of the entire vehicle) may be overlaid on top of the camera. The user may select the "OK" button 505a on screen 505 to close the overlay and cause display of the camera screen 507. Camera screen 507 may include a camera shutter button 507a (e.g., for taking a photo) and flash button 507b (e.g., for turning the camera flash on/off). The "Instructions" button 507c on screen 507 may open the instructions overlay from screen 505, and the "Done" button 507d on screen 507 may save all photos that have been taken to a memory of the mobile device and may return the user to the main photos screen 501. When the user selects the shutter button 507a in screen 507, the mobile device may display screen 509 to indicate that a photo is being taken. In some aspects, all buttons on screen 509 may be disabled after the user selects the shutter button 507a.

Figure 5B:
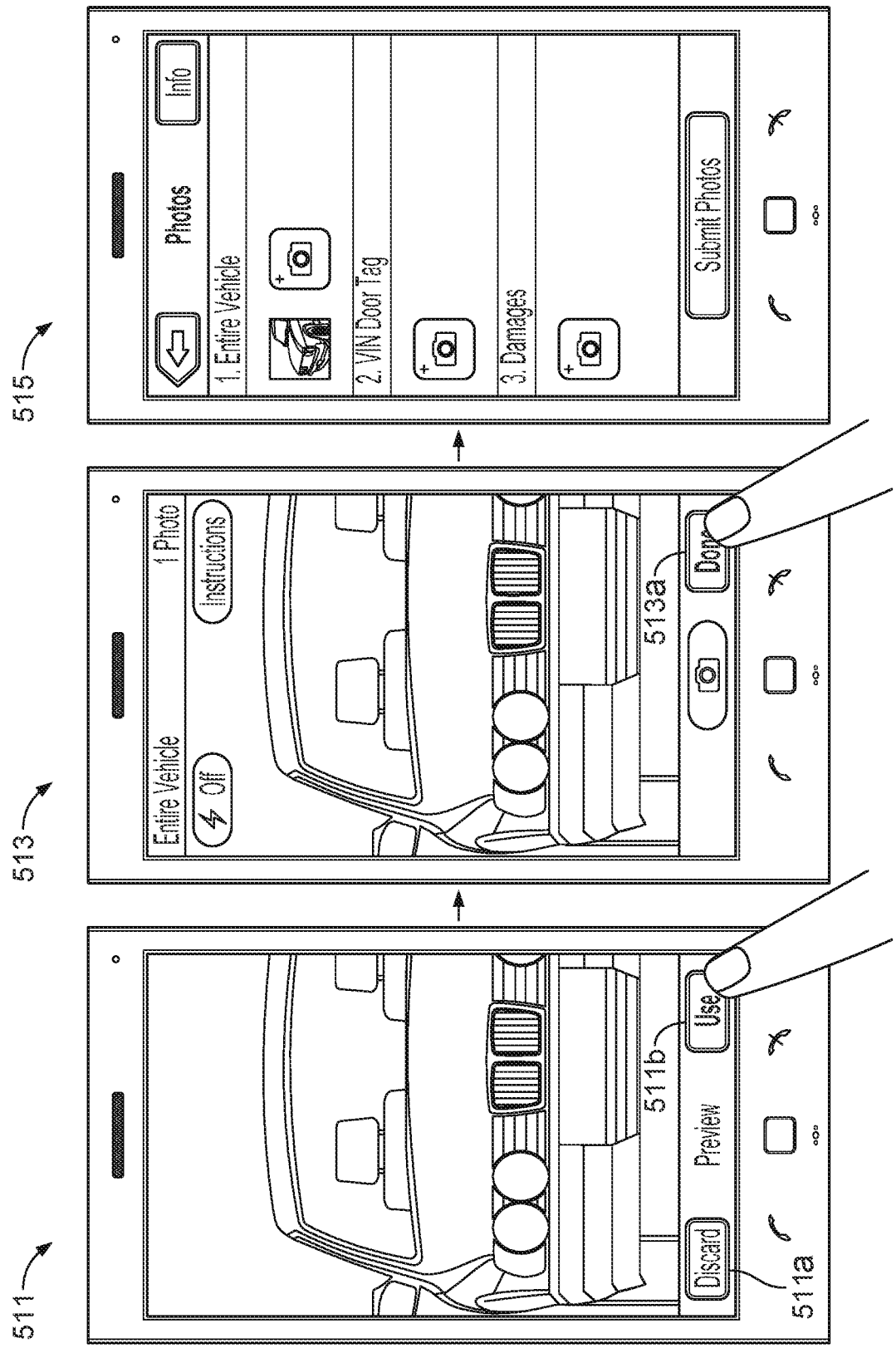
FIG. 5b shows a second series of display screens displayed on a mobile device as a user takes photos of a damaged vehicle in accordance with certain aspects of the present disclosure.

FIG. 5b shows a second series of display screens displayed on a mobile device as a user takes photos of a damaged vehicle in accordance with at least one aspect of the present disclosure. Screen 511 may allow a user to preview a photo that has been taken and take an appropriate action on this photo. In particular, the user may select a "Discard" button 511a to discard the photo or a "Use" button 511b to use the photo for damage assessment and claims processing. Assuming that the user selects "Use" button 511b, the user may proceed to take other photos within the selected photo type. When the user has taken all the photos of a given photo type, the user may select the "Done" button 513a on screen 513. After selecting the "Done" button 513a on screen 513, the mobile device may display screen 515, where thumbnail image(s) of the photo(s) that the user has already taken may be displayed in the corresponding categories.

Figure 6:
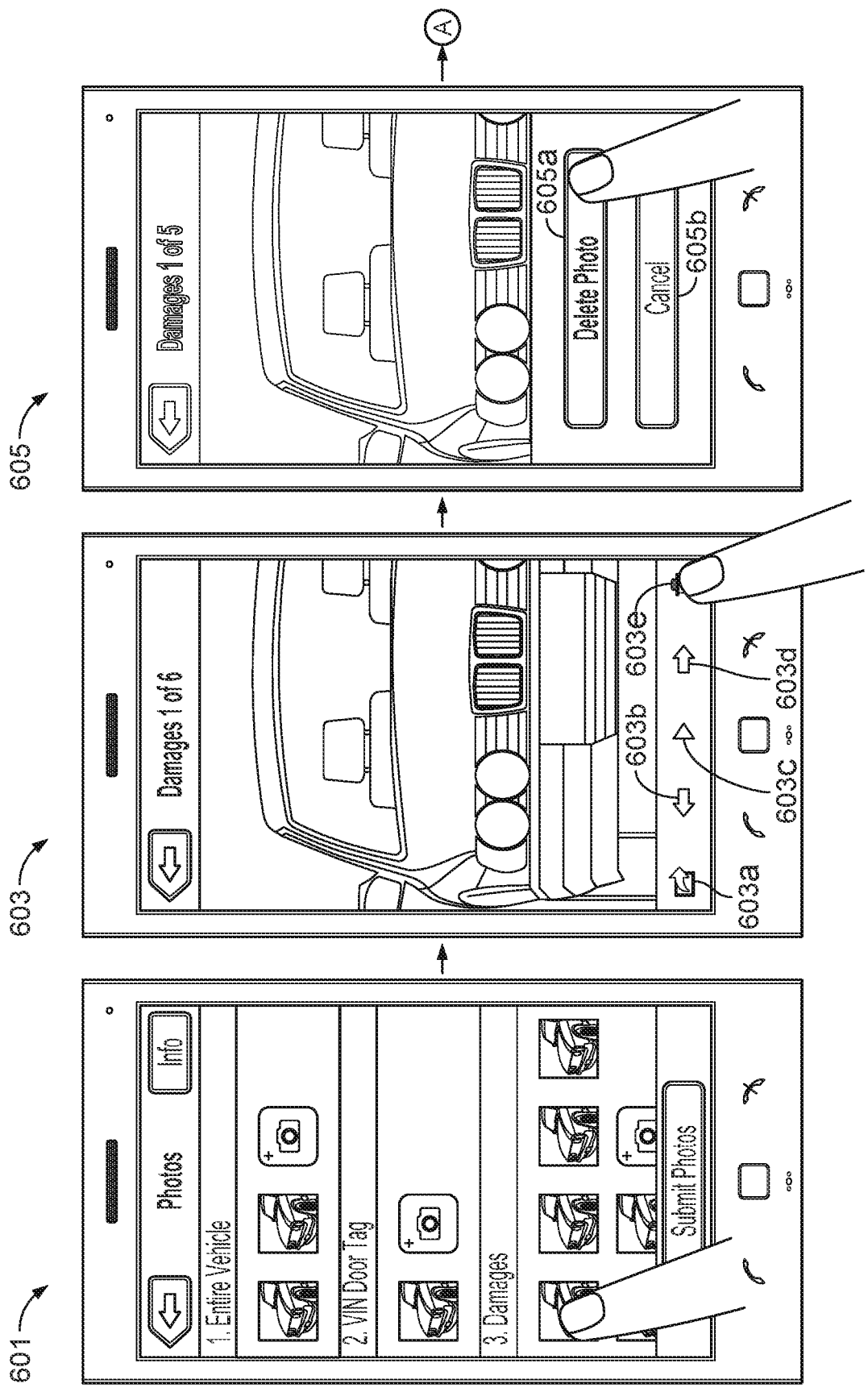
FIG. 6 shows a series of display screens displayed on a mobile device for enabling a user to delete photos that have already been taken in accordance with certain aspects of the present disclosure.
Figure 6:
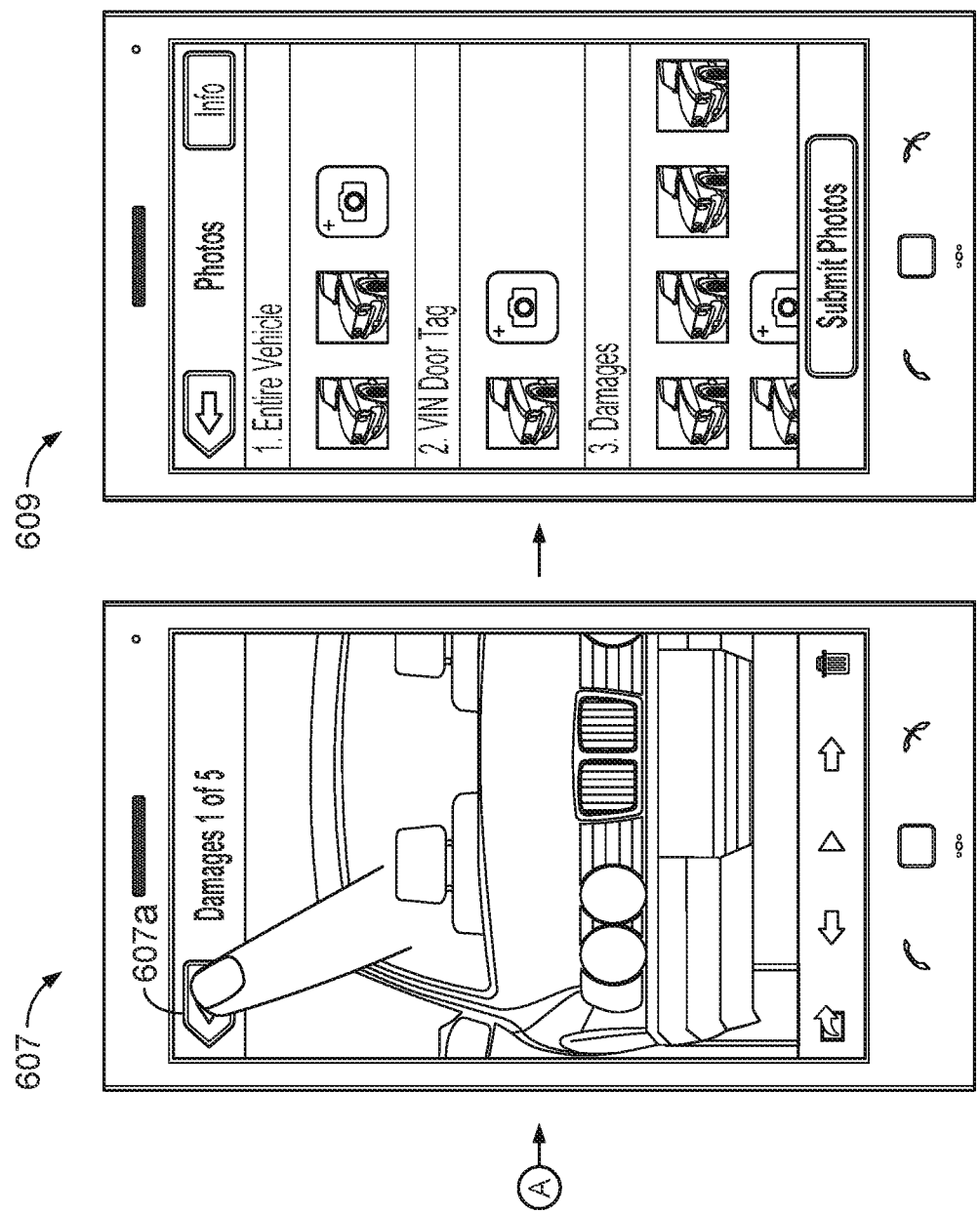

FIG. 6 shows a series of display screens displayed on a mobile device for enabling a user to delete photos that have already been taken in accordance with at least one aspect of the present disclosure. Screen 601 displays thumbnails of all photos that have already been taken. When a user selects one of the thumbnails in screen 601, the mobile device may display screen 603, where a series of buttons may be displayed, including an additional options button 603a for displaying additional options associated with the current photo (e.g., email photo, use photo as wallpaper, etc.), a scroll to previous photo button 603b for scrolling to the previously-viewed photo in the photo reel, a play photo reel button 603c for sequentially displaying each photo in the photo reel, a scroll to next photo button 603d for scrolling to the next photo in the reel, and a delete button 603e for deleting the currently-viewed photo. If the user selects delete button 603e, the photo currently displayed may be queued for deletion and mobile device may display screen 605. Screen 605 includes an action panel with a "Delete Photo" button 605a for confirming that the currently-viewed photo is to be deleted and a "Cancel" button 605b for cancelling deletion of the currently-viewed photo. If the user selects "Delete Photo" button 605a, the currently-viewed photo is deleted and the next photo in the current category is displayed in screen 607. If the user selects a back button 607a on screen 607, the user may back out to return to photos screen 609. Screen 609 may display the remaining thumbnails stored in a memory of the mobile device, with the image that the user deleted in screen 605 removed from the list of thumbnails.

Figure 7:
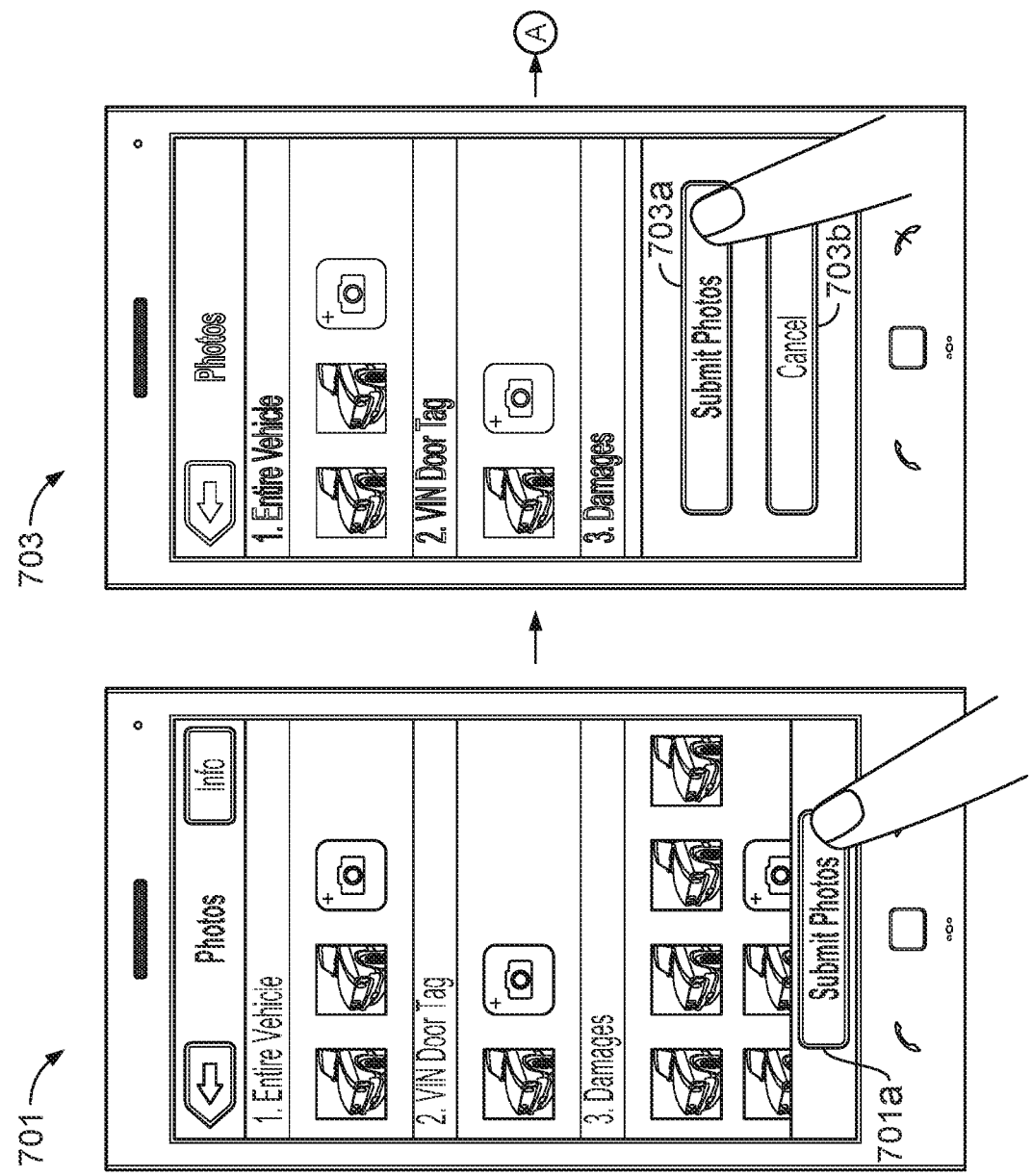
FIG. 7 shows a series of display screens displayed on a mobile device for enabling a user to submit photos for review by an enhanced claims processing server, in accordance with certain aspects of the present disclosure.
Figure 7:
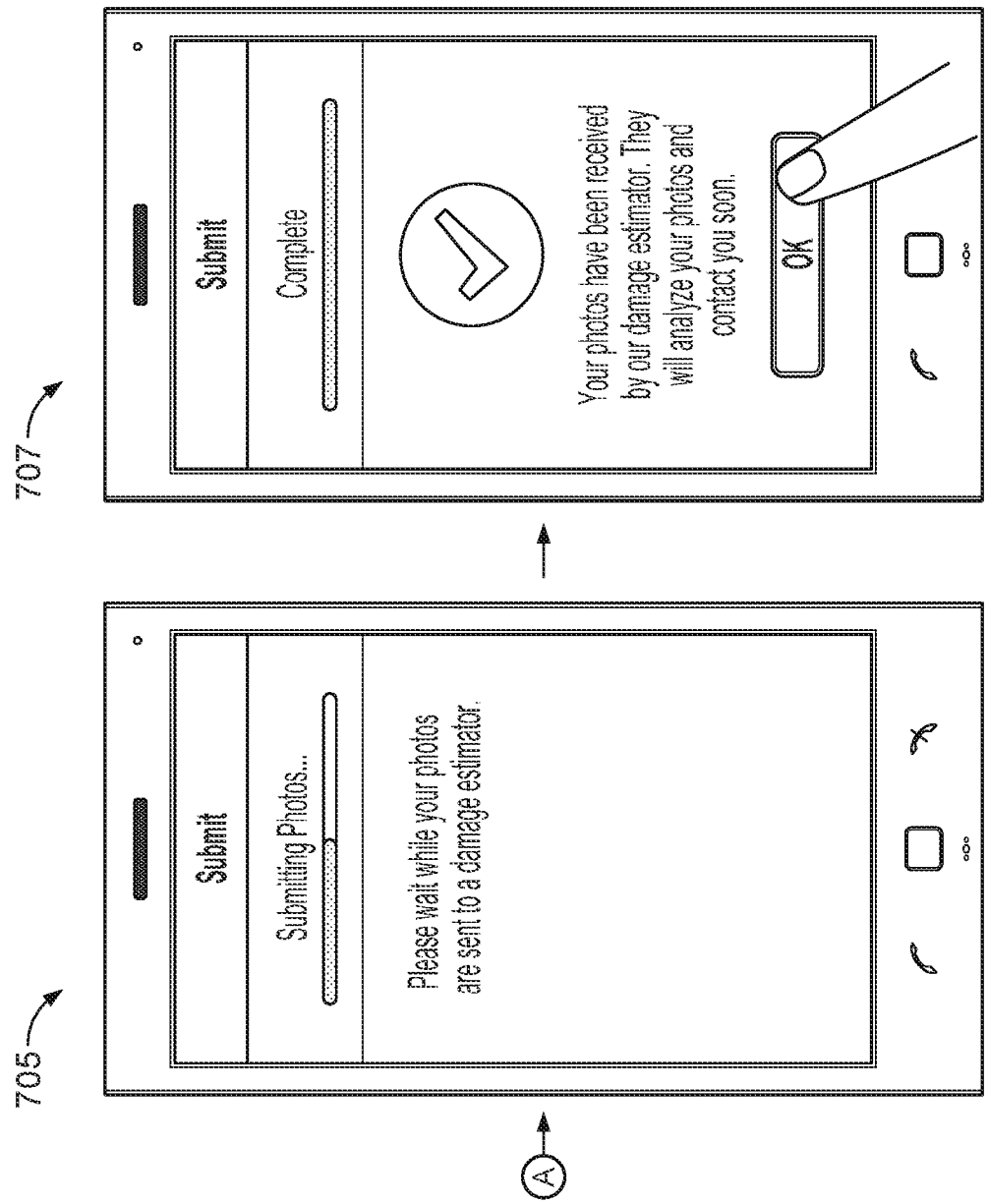

FIG. 7 shows a series of display screens displayed on a mobile device for enabling a user to submit photos for review by an enhanced claims processing server 101, in accordance with at least one aspect of the present disclosure. Screen 701 may include a "Submit Photos" button 701a for submitting photos to server 101 when all photos have been taken. When a user presses "Submit Photos" button 701a, the mobile device may display screen 703, which includes an action panel with the "Submit Photos" button 703*a* for confirming that the captured photos are to be submitted to server 101 and a "Cancel" button 703*b* for cancelling the submission. If the user selects "Submit Photos" button 703*a*, the mobile device may display screen 705 where an upload progress bar may indicate the progress of the photo upload. Once the photos have been fully uploaded, the mobile device may display screen 707, which indicates that the photos have been uploaded and explains any next steps that should be taken.

Figure 8:
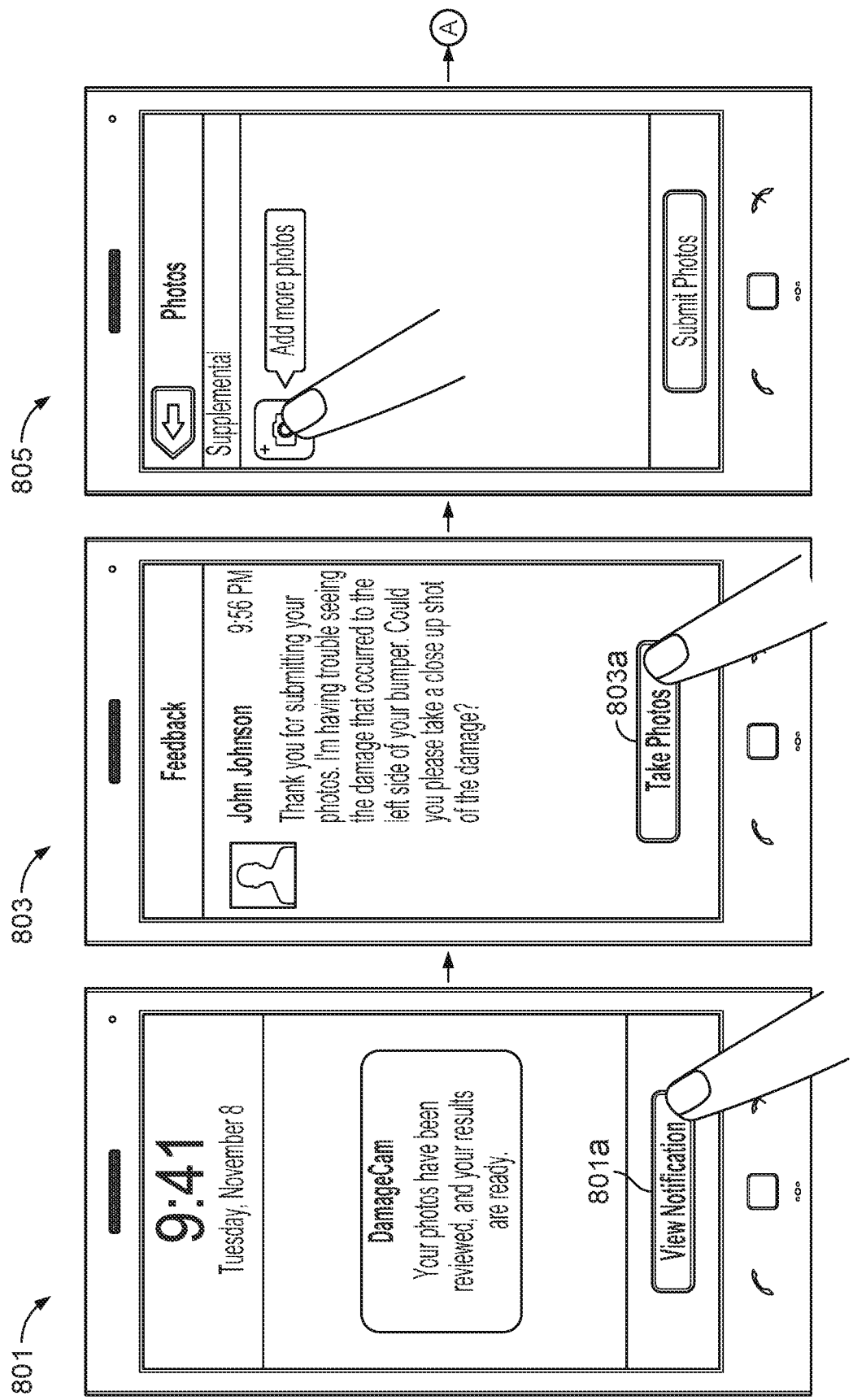
FIG. 8 shows a series of display screens displayed on a mobile device for enabling a user to receive feedback from an enhanced claims processing server regarding previously submitted photos, in accordance with certain aspects of the present disclosure.
Figure 8:
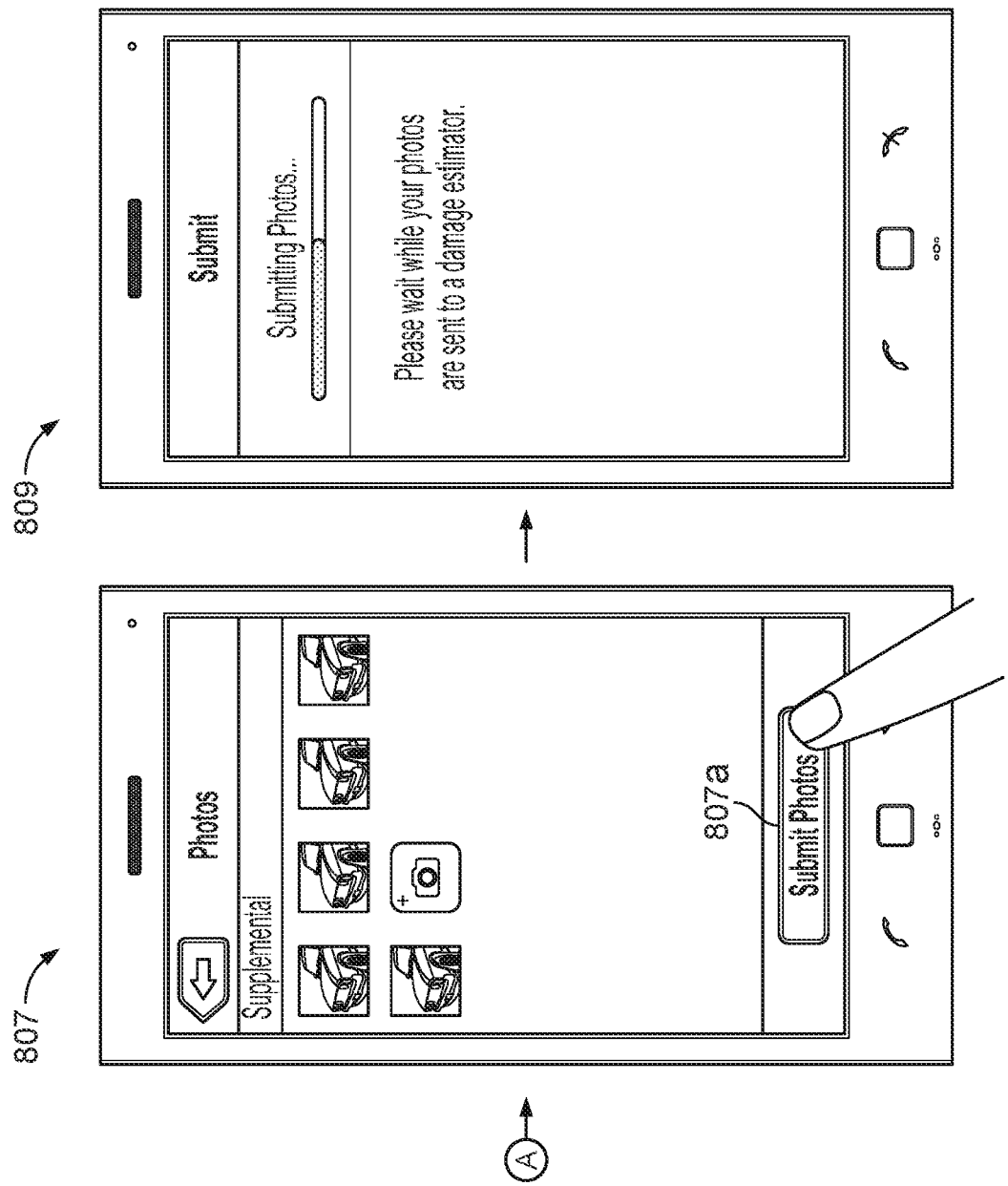

FIG. 8 shows a series of display screens displayed on a mobile device for enabling a user to receive feedback from an enhanced claims processing server 101 regarding previously submitted photos, in accordance with at least one aspect of the present disclosure. When enhanced claims processing server 101 completes review of the photos submitted in FIG. 7, server 101 may transmit a notification to the mobile device that feedback is ready for review. When the mobile device receives the notification, screen 801, which includes a notification that feedback is ready, may be displayed. When a user selects the "View Notification" button 801*a*, the mobile device may display screen 803, which may include a detailed description of any feedback received from server 101. In this case, server 101 has transmitted a message that asks the user to take additional photos (e.g., of the damage to the left side of a bumper). Screen 803 may also include a "Take Photos" button 803*a* which may allow the user to take additional photos of the damaged vehicle. When the user presses "Take Photos" button 803*a*, the mobile device may display screen 805 which allows the user to take more photos of the damaged vehicle (e.g., in response to the feedback received in screen 803) using the same process depicted in FIGS. 5*a* and 5*b*.

Once all required photos have been taken, the user may press the "Submit Photos" button 807*a* in screen 807 to submit the photos taken via screen 805 to enhanced claims processing server 101. When the user presses the "Submit Photos" button 807*a* in screen 807, the mobile device may display screen 809, which includes a progress bar that shows the progress of the photo upload to server 101.

Aspects of the disclosure allow for customers/potential customers of an entity managing enhanced claims processing server 101 (e.g., an insurance company) to obtain advice about the advantages/disadvantages of formally submitting an insurance claim for damage associated with an insured item (e.g., a vehicle, home, etc.). In this regard, enhanced claims processing server 101 may process information that addresses a pre-claim consultation between potential customer/customer and an entity managing server 101. In particular, data analyzed by enhanced claims processing server 101 may be used to assign a projected overall monetary valuation of a submitted claim for a given set of conditions associated with damage to an insured item so that a customer/potential customer may decide whether or not to submit a claim.

In some aspects, a customer/potential customer of an entity managing enhanced claims processing server 101 (e.g., an insurance company) or an agent associated with the entity managing enhanced claims processing server 101 may generate data (photos, video, descriptive text, etc.) associated with damage to an insured item. This data may be transmitted to enhanced claims processing server 101, where the data may be analyzed along with data associated with the terms of an insurance policy associated with (e.g., insuring) the damaged item.

In some aspects, an agent associated with the entity managing enhanced claims processing server 101 may obtain details of an insurance policy associated with a damaged item in one of several ways. For instance, if the damaged item is associated with a customer of the entity managing enhanced claims processing server 101, the agent may access a database associated with enhanced claims processing server 101 for this information. In other aspects, an agent of the entity managing enhanced claims processing server 101 may simply ask a customer/potential customer associated with the damaged item for details such as deductible amounts, premium levels, special provisions, coverage limits, etc. of the relevant insurance policy. The agent may then transmit these details to enhanced claims processing server 101.

Enhanced claims processing server 101 may then analyze information related to damage of the insured item and information related to an associated insurance policy providing insurance coverage for the insured item to determine consequences of formally submitting an insurance claim to seek compensation for the damage. For instance, by analyzing the extent of deductions associated with the insurance policy covering the insured item and the extent that rewards (e.g., safe driver reward, etc.) will be lost for submitting a claim, enhanced claims processing server 101 may calculate the extent that the premium amount associated with the insurance policy covering the damaged item will increase during a subsequent term if the claim is submitted. In addition to calculating an effect on premium and rewards, enhanced claims processing server 101 may also calculate other effects such as a surcharge or probability of renewal. Based on this information, an agent associated with the entity managing enhanced claims processing server 101 may provide advice to the customer/potential customer on whether or not the customer/potential customer stands to benefit by formally submitting the insurance claim. In other aspects, enhanced claims processing server 101 may directly transmit this advice to a customer/potential customer.

In other aspects, this process may also allow enhanced claims processing server 101 and/or an agent associated with the entity managing enhanced claims processing server 101 to offer upsell materials. For instance, by examining details of an accident, the type of insurance maintained by the insured, and other details of the insured, including other assets maintained by the insured and other types of insurance maintained by people similar to the insured, enhanced claims processing server 101 may provide an offer for a new insurance product and/or discounts associated with already purchased insurance products to entice a customer/potential customer to either become a customer of an entity managing enhanced claims processing server 101 and/or to purchase additional products offered by the entity managing enhanced claims processing server 101.

Figure 9:
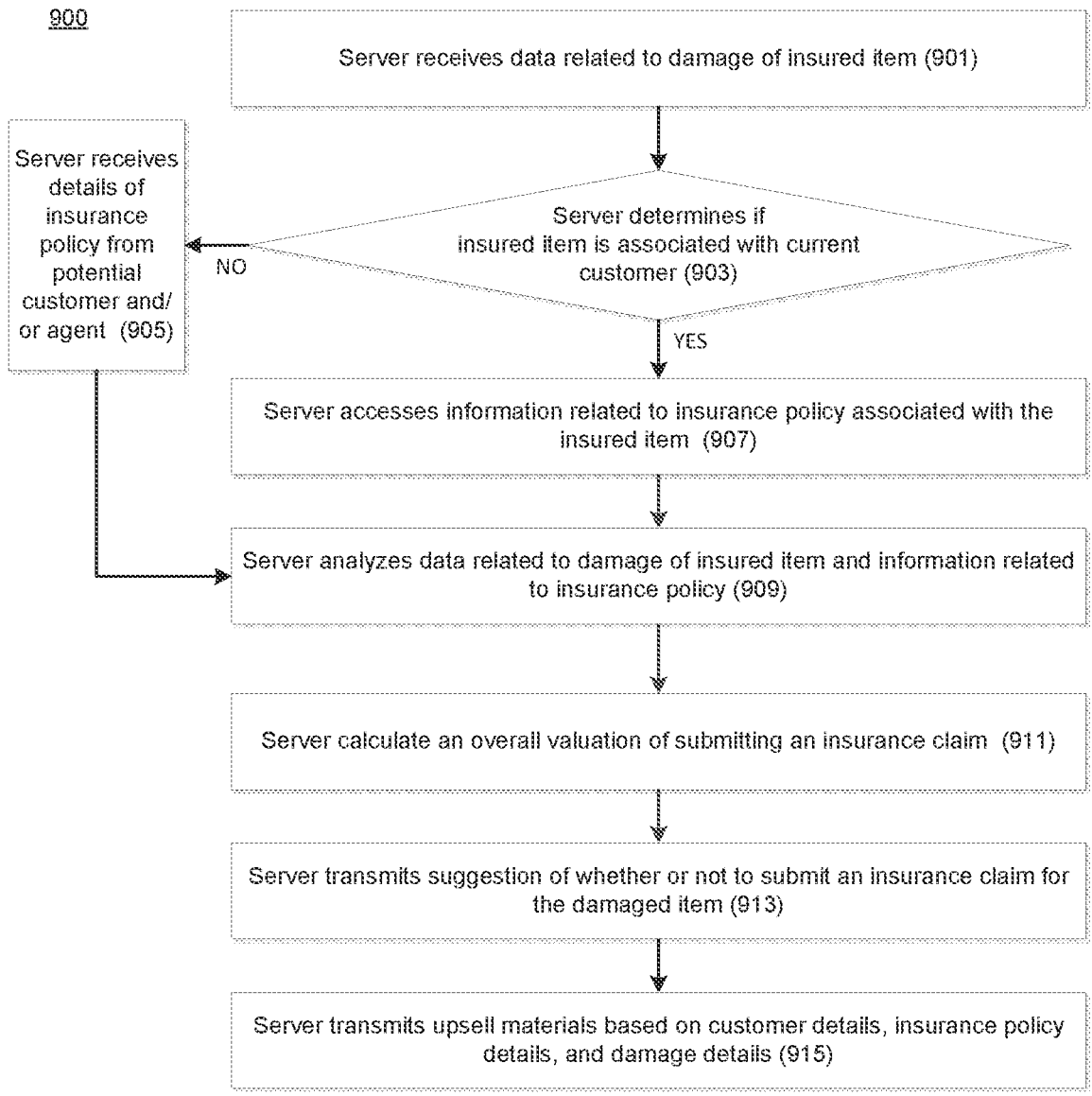
FIG. 9 shows a flow chart for providing pre-claim consultations in accordance with certain aspects of the present disclosure.

FIG. 9 shows a flow chart 900 for providing pre-claim consultations in accordance with at least one aspect of the present disclosure. The process may begin at step 901 where enhanced claims processing server 101 may receive data related to damage of an insured item. Server 101 may receive this data, for example, through a mobile device operated by a user and/or through an agent associated with an entity managing server 101.

Once this data is received, server 101 may determine if the insured item is associated with a current customer of the entity managing server 101 in step 903. If the insured item is not associated with a current customer of an entity managing server 101, server 101 may receive details of an insurance policy insuring the insured item directly from the potential customer (e.g., via a mobile device, etc.) and/or from an agent associated with the entity managing server 101 in step 905. If the insured item is associated with a current customer of an entity managing server 101, server 101 may access information related to details of an insurance policy associated with the insured item from an associated database (e.g., a database of customer information) in step 907.

Either from step 905 or 907, the process may move to step 909 where enhanced claims processing server 101 may analyze data related to damage of the insured item and information related to the relevant insurance policy. Based on this analysis, server 101 may calculate the overall consequences (e.g., overall monetary valuation of benefit/detriment) of submitting an insurance claim for damage to the insured item in step 911. For instance, server 101 may calculate the overall monetary valuation by examining a projected increase in premium amount and a projected refund (e.g., settlement amount) for submitting the claim. Once the overall consequences are calculated, the process may then move to step 913 where server 101 may transmit the calculations to a potential customer/customer. Server 101 may also offer a suggestion or other information to help the potential customer/customer decide whether or not to submit an insurance claim for the damaged item.

The process may also move optionally to step 915 where server 101 may transmit upsell materials (e.g., information about new products/services, special promotions, etc.) based on customer details, insurance policy details, damage details, etc.

As an example, consider a scenario where a customer of an insurance company gets into an at-fault automobile accident that damages the front fender of his car. Assume that the customer drives the car to a branch office of the insurance company where he has an automobile insurance policy. The customer seeks advice on whether or not he should submit a claim for damage to his car. The insurance agent at the branch office may take several photos of the damaged fender and may transmit this information to enhanced claims processing server 101, along with details associated with the customer (e.g., name, age, insurance policy number, etc.).

Once this information is received, server 101 may first determine if the received photos clearly depict damage to the insured vehicle. If they do not clearly depict any damage, server 101 may request additional photos from the customer and/or from the insurance agent. Once all relevant photos have been taken, server 101 may access the relevant insurance policy covering the damaged vehicle.

Assume that in this scenario, the customer pays a $100 monthly premium with a zero deductible to maintain his insurance policy. Also, assume that enhanced claims processing server 101 calculates that the rating plan for his insurance policy dictates a premium increase of $50 a month for a one-year period (accident-free) for the severity of accident that he experienced. Finally, assume that enhanced claims processing server 101 further estimates that the assessed damage to his automobile is $500. Thus, server 101 calculates that he would pay an extra $600 ($50 times 12 months=$600) in premium during the course of the subsequent year and a settlement amount of $500 for assessed damage, if he were to submit the claim.

In this scenario, server 101 may transmit a summary of the monetary valuation and suggest that the customer could choose not to submit the claim, given that the overall increase in premium exceeds the benefit (i.e., settlement amount) from submitting the claim.

Further aspects of the disclosure allow for customers of a given entity managing enhanced claims processing server 101 (e.g., an insurance company) to obtain insurance claim advice from a third party entity prior to submission of a claim for damage to an insured item. The third party entity may be another insurance company, an insurance broker, or some other entity separate from the entity at which the insured is a customer. An enhanced claims processing server 101 associated with a third party entity may obtain details (premium amounts, deductible amounts, coverage limits, etc.) about an insurance policy associated with an insured item and information about damage associated with the insured item from the insured, from the entity at which the insured is a customer, and/or from a public source (e.g., public records databases that store accident information, etc.). In one embodiment, this aspect of the disclosure may allow consumers to obtain insurance advice anonymously (e.g., by entering relevant information related to damage of an insured item through a web site).

In some aspects, enhanced claims processing server 101 associated with a third party entity may infer details about an insurance policy associated with the insured based on known details about insurance policies maintained by other consumers with characteristics similar to the insured. For instance, if the third party entity is another insurance company, the third party entity may itself maintain a customer database that stores customer information like age, occupation, income level, etc. and information about insurance policies maintained by these customers. In this scenario, server 101 associated with the third party entity may match characteristics of the insured to characteristics of current customers of the third party entity. Once matched, server 101 associated with a third party entity may infer that characteristics of insurance policies maintained by customers similar to the insured are also associated with an insurance policy maintained by the insured.

If the third party entity is not an insurance company and/or if the third party entity does not have access to customer information storing insurance policy details, enhanced claims processing server 101 associated with a third party entity may use other methods to infer insurance policy details associated with the insured. For instance, server 101 associated with a third party entity may run algorithms that approximate insurance policy details associated with a given consumer based on inputs such as age, gender, income level, the insured item under consideration, etc.

Once enhanced claims processing server 101 associated with a third party entity has calculated details about an insurance policy that insures a damaged item that is associated with a consumer that is not currently a customer of the third party entity, server 101 associated with a third party entity may analyze the information related to the damage associated with an insured item and other information related to the insurance policy that insures the damaged item to calculate an overall monetary valuation of submitting an insurance claim for damage to the insured item.

Based on the overall monetary valuation, enhanced claims processing server 101 associated with a third party entity may suggest whether or not to submit an insurance claim for damage to the insured item. As before, the monetary valuation may consider information such as a projected amount by which a premium of an insurance policy maintained by the insured will increase and a projected settlement amount that will be paid to the insured for damage associated with assessed loss to the insured item, among other things.

In other aspects, enhanced claims processing server 101 associated with a third party entity may provide other incentives/services to a consumer when the consumer seeks advice prior to formal submission of an insurance claim for damage associated with an insured item. For instance, after transmitting, to the consumer, a suggestion of whether or not to submit an insurance claim for damage to an insured item, server 101 associated with a third party entity may offer to pay for the assessed loss (or a portion thereof) associated with damage to the insured item, if the consumer will agree to become a customer of the third party entity. In this regard, enhanced claims processing server 101 associated with a third party entity may offer a customized insurance product that may better cover damage to the insured item and/or that may result in a better overall monetary valuation of formally submitting a claim for damage to the insured item.

FIG. 10 shows a flow chart 1000 for providing pre-claim consultations with a third party entity in accordance with at least one aspect of the present disclosure. The process may start out at step 1001 where an enhanced claims processing server 101 associated with a third party entity may receive data related to damage of an insured item. Server 101 may receive this data in a variety of ways, such as via a mobile device of a consumer associated with the damaged item, via an agent associated with the third party entity, etc. The process may then move to step 1003 where server 101 associated with the third party entity may evaluate information related to an insurance policy associated with the insured item. As outlined above, server 101 may evaluate this information in a variety of ways. Because the insured is not a customer of the third party entity, server 101 associated with the third party entity may determine information related to an insurance policy associated with the insured item directly from the insured, by evaluating known insurance policy details of people similar to the insured, by running an algorithm that uses publicly available information related to insurance purchasing tendencies of those with predetermined characteristics, etc.

The process may then move to step 1005 where server 101 associated with a third party entity may analyze the data related to damage of the insured item and the information related to an insurance policy of the insured. Based on this analysis, enhanced claims processing server 101 associated with a third party entity may calculate an overall valuation of submitting an insurance claim for damage associated with the insured item in step 1007. This valuation may consider information such as a projected premium increase for maintaining an insurance policy associated with the damaged item and a projected settlement amount for assessed damage associated with the insured item, if a claim for the damage is actually submitted.

Next the process may move to step 1009 where enhanced claims processing server 101 may transmit, to either an agent associated with a third party entity and/or the consumer in question, a suggestion or other information to help the consumer decide whether or not to submit an insurance claim for damage associated with the insured item. Finally, in step 1011, enhanced claims processing server 101 may transmit, to either an agent associated with a third party entity and/or the consumer in question, one or more incentives based on consumer details (age, gender, etc.), insurance policy details (level of coverage, premium levels, deductible amounts, etc.), and/or details associated with a damaged item. These incentives may relate to an offer for insurance that better covers the assessed loss for damage to the insured item and/or an offer to pay for the assessed loss (or a portion thereof), if the insured agrees to become a customer of the third party entity. Also, if the insured agrees to purchase an insurance policy offered by the third party entity, these incentives may also relate to an extension of accident forgiveness for an accident related to the pre-claim consultation in question.

As an example, consider a scenario where a consumer goes to an insurance company for a second opinion on damage associated with her insured vehicle. Assume also that she is dissatisfied with the advice given to her by the insurance company at which she is a customer, and so she arrives at a third party insurance company to determine if other options might be available to her.

An insurance agent associated with the third party entity may obtain demographic details associated with the consumer and may transmit these details to an enhanced claims processing server 101 associated with the third party insurance company. These details may include information related to age, income level, and address of the consumer in question, among other things. The insurance agent associated with the third party entity may also help the consumer take a few photos of her damaged vehicle and may transmit these images to server 101 associated with the third party entity.

In this particular scenario, assume that the consumer is reluctant to divulge the details of her insurance policy with the third part insurance agency. Therefore, server 101 associated with the third party insurance company may cross-reference her demographic characteristics with those of people similar to her that are already customers of the third party insurance company. Server 101 associated with the third party entity may then evaluate characteristics of insurance policies maintained by people similar to the consumer in question and may infer that these characteristics are also characteristics of an insurance policy maintained by the consumer in question.

Server 101 associated with the third party entity may then analyze the image data depicting damage to her damaged vehicle to assess the loss associated with the damage. This analysis, combined with inferred details about the insurance policy maintained by the consumer, may be used to estimate an overall monetary valuation of submitting an insurance claim for damage associated with her vehicle. Assume that in this case, the consumer in question pays a $50 monthly premium to maintain her automobile insurance policy and has a $500 deductible associated with this policy. Assume also that enhanced claims processing server 101 associated with the third party entity determines that the assessed loss associated with her vehicle is $300 and that her monthly premium will increase by $20 per month for a six month period (after which it will return to $50 per month) if she were to submit a claim for her loss. Thus, server 101 associated with the third party entity may estimate that the consumer in question stands to benefit very little by submitting a claim for her loss (as the assessed loss is less than her deductible and her premium would increase as a result of the submitted claim). Therefore, enhanced claims processing server 101 associated with the third party entity may suggest that she could choose not to submit a claim for this loss.

In this scenario, enhanced claims processing server 101 associated with the third party entity may further suggest additional insurance products to the consumer. These insurance products may be tailored to better cover the type of damage associated with her vehicle. For example, enhanced claims processing server 101 associated with the third party entity may suggest an insurance product that has a lower deductible (e.g., a $100 deductible) with a smaller increase in premium for accidents of the nature experienced by the consumer. To further incentivize this insurance product, enhanced claims processing server 101 associated with the third party insurance company may offer to pay for the assessed loss (i.e., $300) if the consumer in question agrees to become a customer of the third party insurance company.

In both the processes discussed in FIG. 9 and FIG. 10, an agent of an entity managing enhanced claims processing server 101 may perform a manual calculation to estimate any effects of formally submitting an insurance claim for loss associated with an insured item.

Aspects of the disclosure enable a user device (e.g., mobile phone, tablet, etc.) to serve as a portal for efficiently providing access to services provided by third party entities to consumers (e.g., customers, potential customers) who are undergoing a claims adjustment process as a result of damage to an insured item. In this aspect, a consumer and/or an agent associated with an entity (e.g., an insurance company) managing enhanced claims processing server 101 may transmit, to server 101, images, video, and/or data related to damage associated with an insured item, and server 101 may stream this information to a third party entity (e.g., a preferred partner of the entity managing server 101) in real-time as server 101 is analyzing this information to assess damage associated with the insured item.

A third party entity may provide any of various types of services that may be of interest to a consumer. For instance, a third party entity may represent a repair agency for repairing damage to damaged vehicles. By viewing the damage to a damaged vehicle as the claims adjustment process is still on-going, the repair agency may be able to estimate an approximate cost and best strategy for repairing the damage, thereby allowing an entity managing enhanced claims processing server 101 and associated consumers to plan the repair process much more efficiently. Enhanced claims processing server 101 may also transmit information related to damage of an insured item to multiple repair agencies, for example, to compare repair cost estimates and repair strategies.

Moreover, server 101 may use feedback received from third party entities such as repair agencies in the claims adjustment process itself (e.g., for generating a settlement value for settling claims related to the damage). For instance, enhanced claims processing server 101 may generate (e.g., by analyzing data related to damage of an insured item and other information related to an insurance policy maintained by a consumer associated with the insured item) a first cost estimate for repairing damage associated with an insured item and may receive a second cost estimate for this repair from a third party repair shop. If the first cost estimate and the second cost estimate differ by a predetermined threshold, server 101 may then compare the two values to calculate a final cost estimate for repairing the damage to the insured item and thereby settling an insurance claim related to the damage.

Third party entities may also represent other entities such as junkyards, vehicle dealers, governmental agencies, etc. For instance, consumers may be interested in allowing junkyards to view damage associated with an insured car to estimate how much compensation they would receive for the car if the car was declared a total loss. Similarly, a consumer may be interested in allowing vehicle dealers to view damaged vehicles to estimate trade-in values if the consumer were interested in trading in a damaged vehicle for another vehicle. Moreover, consumers may be interested in transmitting information related to damage of an insured item to governmental agencies such as police stations to allow these agencies to process items such as accident reports, etc. related to the damage.

Using this process, rather than taking pictures with a phone and then submitting the pictures to a third party entity such as a repair agency, the repair agency may obtain damage information in real-time while an agent or consumer associated with an entity managing enhanced claims processing server 101 is holding the phone and gathering image data from different angles around the damaged item. In other aspects, third party entities such as repair agencies may analyze streamed data, images, and video as it is being sent and save only those portions that are of interest (e.g., those portions that clearly depict damage to the insured item). In yet other aspects, customers/potential customers/agents associated with an entity managing enhanced claims processing server 101 may transmit audio information (e.g., a description that explains video and images being streamed) related to damage associated with an insured item in real-time to third party entities.

In additional aspects, a third party entity receiving information related to damage of an insured item may, upon viewing the information, request additional information and/or images. Enhanced claims processing server 101 may transmit the request to a user device and may receive the requested information from the user device for transmission to the third party entity.

Figure 11:
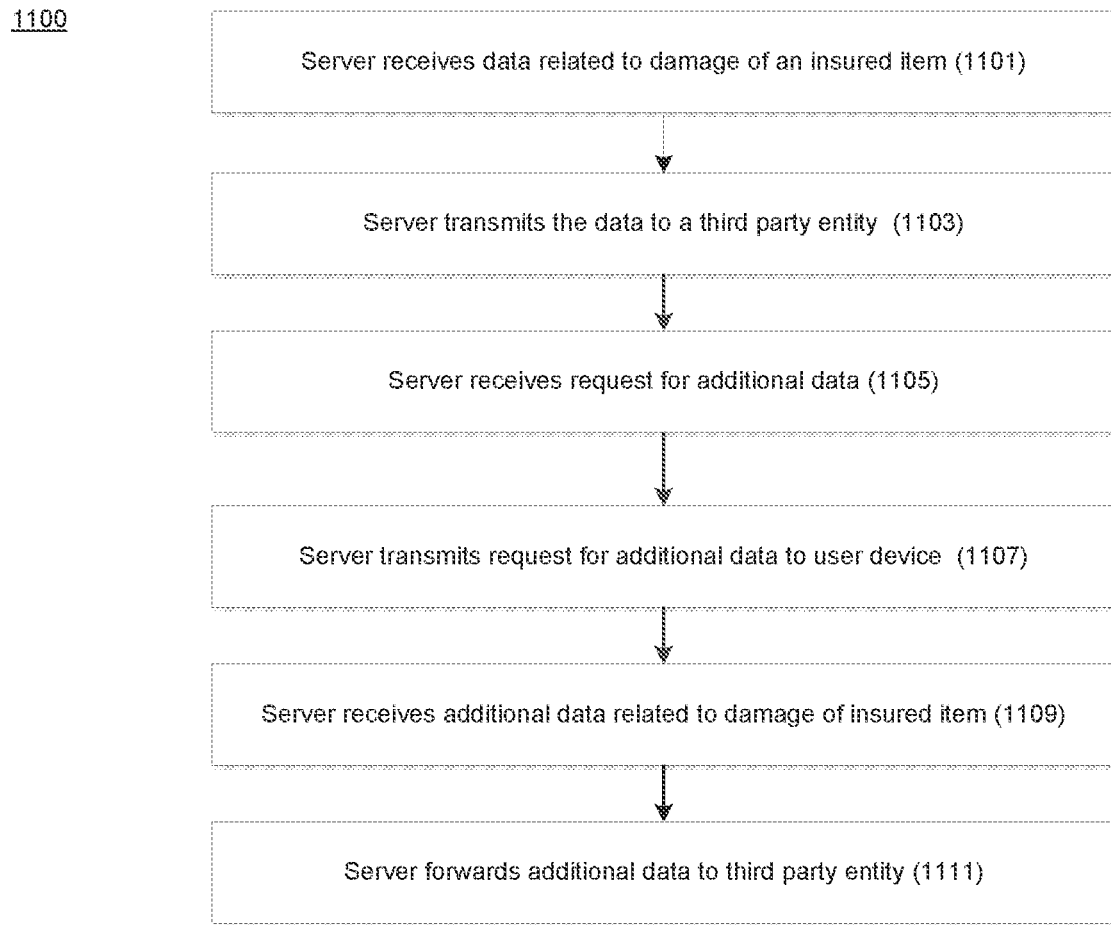
FIG. 11 shows a flow chart for using a user device to allow a third party entity to learn about damage to an insured item while the damage is still being assessed through a claims adjustment process in accordance with certain aspects of the present disclosure.

FIG. 11 shows a flow chart 1100 for using a user device to allow a third party entity to learn about damage to an insured item while the damage is still being assessed through a claims adjustment process in accordance with at least one aspect of the present disclosure. The process may start out at step 1101 where enhanced claims processing server 101 may receive data related to damage of an insured item. Once the data is received, server 101 may immediately (e.g., in real-time) forward the data to a third party entity in step 1103. The third party entity may analyze the data and, if additional data is required, may transmit a request for this additional data in step 1105.

Enhanced claims processing server 101 may transmit this request for additional data to a user device in step 1107 and may receive a response with the additional data in step 1109. Finally, in step 1111, server 101 may forward this additional data to the third party entity.

As an example, consider a scenario where a customer of an insurance company drives his car to a local branch office so that the agent at the branch office can assist him in filing a claim for an accident which caused damage to the front windshield of his car.

The insurance agent at the branch office may use his tablet computer to take images of the damaged windshield and may transmit this information to enhanced claims processing server 101. As the insurance agent is taking photos of the damaged windshield, enhanced claims processing server 101 forwards the image data in real-time to a preferred repair shop.

The repair shop analyzes the information as it is being sent and generates a cost estimate for repairing the broken windshield. The repair shop then transmits this cost estimate to enhanced claims processing server 101 so that the insurance agent and the customer can use this information in assessing the damage and deciding on a vendor for repairing the broken windshield.

In additional aspects of the disclosure, an agent associated with an entity managing enhanced claims processing server 101 (e.g., an insurance company) may use a user device (e.g., mobile device, tablet, etc.) to capture damage data (e.g., images, video, text, etc.) associated with damage to an insured item so that a customer/potential customer of the entity managing enhanced claims processing server 101 may review the data for completeness and accuracy. This particular aspect of the disclosure may reduce the number of potential errors and likelihood of fraud associated with capturing images related to damage of an insured item (e.g., because an agent associated with the entity managing enhanced claims processing server 101 is capturing images rather than the customer/potential customer of the entity managing enhanced claims processing server 101). In addition, a potential customer/customer of an entity managing enhanced claims processing server 101 may not have to wait at the entity managing enhanced claims processing server 101 (e.g., an insurance company) for a claims adjuster to review and analyze damage data, because an agent may submit captured damage data to enhanced claims processing server 101 once appropriate images have been captured. Furthermore, as some potential customers/customers of an entity managing enhanced claims processing server 101 may not possess a user device (e.g., mobile device, tablet, etc.) configured to capture damage data, this aspect of the invention facilitates access of services to these customers/potential customers, as an agent associated with the entity managing enhanced claims processing server 101 may use his or her own user device to capture damage data.

In general, damage data may depict damage using various technologies (e.g., 3-dimensional images for depth information, panoramic images, video data, etc.) to allow different types of information to be gleaned. In addition to video and image data generated by an agent and/or a customer/potential customer associated with an entity managing enhanced claims processing server 101, agents and customers/potential customers may also transmit a verbal description of damage to enhanced claims processing server 101.

If a customer/potential customer of an entity managing enhanced claims processing server 101 finds no problems with the damage data, the data may be forwarded to enhanced claims processing server 101 (e.g., via an agent, directly from a customer/potential customer of an entity managing enhanced claims processing server 101, etc.). If a customer/potential customer of an entity managing enhanced claims processing server 101 determines that there are problems, the customer/potential customer may transmit these concerns to the agent so that the agent can address them prior to transmitting the damage data to enhanced claims processing server 101. In some aspects, a customer/potential customer of an entity managing enhanced claims processing server 101 may certify that damage data shows only damage from a most recent accident (and excludes prior damage).

In some aspects, a customer/potential customer of an entity managing enhanced claims processing server 101 may receive an Internet link (e.g., as part of a message) to damage data captured by an agent associated with the entity managing enhanced claims processing server 101. A customer/potential customer of an entity managing enhanced claims processing server 101 may then review the received damage data and, if required, may add information to the received data set and/or modify the received data set before transmitting the received data and any additional/modified data back to a user device associated with the agent. In yet other aspects, an agent associated with an entity managing enhanced claims processing server 101 may request additional damage data from a potential customer/customer and upon receipt of this request, a potential customer/customer may capture the requested data prior to transmitting the data for review by the agent.

A customer/potential customer of an entity managing enhanced claims processing server 101 may also receive other types information from a user device associated with an agent of an entity managing enhanced claims processing server 101. For instance, if an entity managing enhanced claims processing server 101 is an insurance company, an agent associated with the insurance company may use a user device to transmit information about insurance products, discounts, and/or rewards offered by the insurance company. A customer/potential customer of the insurance company may review this information and transmit to the agent an indication of whether or not he wants to take further action (e.g., purchase, request more information, etc.) on products presented to the customer/potential customer.

Figure 12:
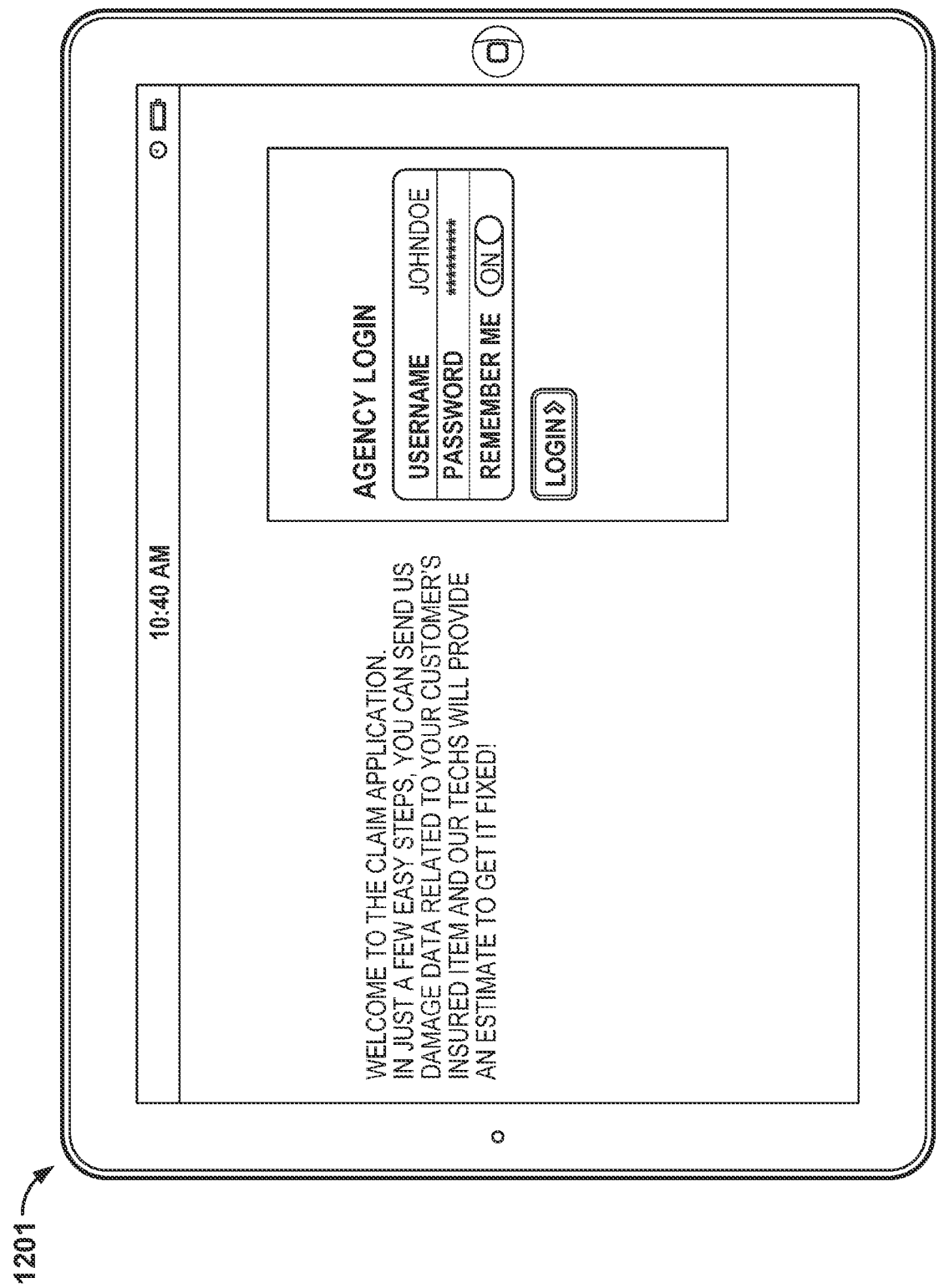
FIG. 12 shows a login screen displayed on a user device in accordance with certain aspects of the present disclosure.

FIG. 12 shows a login screen displayed on a user device (e.g., mobile phone, tablet, etc.) in accordance with at least one aspect of the present disclosure. Login screen 1201 may allow an agent associated with an entity managing enhanced claims processing server 101 to enter a username and password to login to an application and access capabilities related to capturing damage data associated with an insured item owned/operated by a potential customer/customer of an entity managing enhanced claims processing server 101.

FIG. 13 shows two display screens displayed on a user device that allow a user to capture damage information associated with a new claim and/or access information related to claims that have been previously submitted for claims adjustment, in accordance with at least one aspect of the present disclosure. In some aspects, screens 1301 and 1303 and future display screens discussed herein may be displayed only after a user enters login information (e.g., through screen 1201). If an entity managing enhanced claims processing server 101 is an insurance company, an insurance agent associated with the insurance company may access screen 1301 to create a new claim (e.g., for a damaged vehicle) for claims adjustment by selecting the "Get Started" button in section 1301*a*, view a summary of claims that have been initiated by the insurance agent and that are currently being analyzed by a claims adjuster (e.g., "active estimates") by selecting section 1301*b*, and view a summary of claims that have been initiated by the insurance agent and that have already been analyzed by a claims adjuster (e.g., "complete estimates") by selecting section 1301*c*.

Meanwhile, screen 1303 shows an alternative arrangement of information for allowing an insurance agent to create new claims for claims adjustment and/or view claims that have already been submitted. By selecting the "Get Started" button in section 1303*a*, an insurance agent may be directed to other screens that will allow him to capture damage information related to a new claim. In addition, section 1303*b* shows a summary of active claims initiated by the insurance agent in question. Section 1303*b* includes information such as a customer name to which a given claim corresponds, an insurance policy number associated with the claim, a claim number, the name of the insurance agent associated with the claim, the name of a claims adjuster processing the claim, contact information for the claims adjuster, the status of the claim, and the time/date of the last status update, along with a link to any new messages received in connection with the processing of a given claim. Screen 1303 may also include section 1303*c*, which includes a summary of all claims initiated by the insurance agent in question and that have completed the claims adjustment process.

FIG. 14 shows two display screens displayed on a user device for displaying messages associated with a given claim, in accordance with at least one aspect of the present disclosure. Screen 1401 shows a message history in section

1401*a* between two people associated with a given claim (e.g., an insurance agent who initiated the claim and a claims adjuster reviewing claim information, etc.). New messages may be entered by using the keypad shown in section 1401*c* and by selecting the "Send" button 1401*b*.

Screen 1403 shows a second display screen with a message history 1403*a* between people involved with a claim. The message history 1403*a* shown in screen 1403 also includes enhanced features such as a "Retake VIN Photo" button 1403*b* that may allow one of the participants of the conversation to retake a photo associated with a vehicle identification number (VIN) of a vehicle that is being processed in related to the claim. In addition, screen 1403 also includes a "Send" button 1403*c* to allow one of the participants of the conversation to send a new message.

FIG. 15 shows a first set of two display screens displayed on a user device for providing user instructions for capturing images related to damage associated with an insured item, in accordance with at least one aspect of the present disclosure. Screen 1501 includes a window 1501*a* and instructions 1501*b* for capturing a predetermined type of image of the damage associated with an insured item. For instance, in this particular example, window 1501*a* and instruction 1501*b* both relate to capturing a close-up image of damage associated with an insured vehicle. After reviewing the image in window 1501*a* and the related hint specified by instruction 1501*b*, an insurance agent associated with an entity managing enhanced claims processing server 101 may capture an appropriate type of image with a user device by selecting the "Take Photos" button 1501*c*. In addition, an insurance agent may request further instructions on how to capture relevant images by selecting the "Next Hint" button 1501*d*.

Meanwhile, screen 1503 includes a second window 1503*a* and associated instruction 1503*b* for capturing a second type of image associated with damage to an insured item. For instance, window 1503*a* and instruction 1503*b* relate to capturing damage to an insured vehicle from different angles. If a user (e.g., an insurance agent) is ready to capture, with a user device, the type of images specified by window 1503*a* and hint 1503*b*, the user may select the "Take Photos" button 1503*c*. Alternatively, if the user needs further instructions on capturing relevant images, the user may select the "Next Hint" button 1503*d*. It should be noted that the type of images specified by screen 1501 and 1503 are exemplary, and any number of other types of images may also be requested.

FIG. 16 shows two display screens that display images of damage being captured by a user device, in accordance with at least one aspect of the present disclosure. Screen 1601 includes a viewfinder window 1601*a* where a given type of image specified by instruction 1601*b* (e.g., a close-up view of a damaged area) is put into focus with an imaging device (camera, etc.) associated with a user device on which an application supporting this functionality is running. Once a user is ready to capture the image seen in viewfinder window 1601*a*, the user may capture the photo by selecting the "Take Photo" button 1601*c*.

Meanwhile, screen 1603 includes a different viewfinder window 1603*a* where a different type of image specified by instruction 1603*b* (e.g., a view of a damaged area from a different angle) is put into focus with an imaging device (e.g., camera) associated with a user device. Again, once a user is ready to capture the image seen in viewfinder window 1603*a*, the user may capture the image by selecting the "Retake Photo" button 1603*c* (assuming a first version of the photo has already been taken).

FIG. 17 shows a second set of two display screens displayed on a user device for providing user instructions for capturing images related to damage associated with an insured item, in accordance with at least one aspect of the present disclosure. Screen 1701 includes a window 1701*a* and associated instruction 1701*b* for capturing a given type of image. In this particular example, window 1701*a* and instruction 1701*b* direct a user to capture images of each corner of an insured vehicle. If a user is ready to capture the images, the user may select the "Take Photos" button 1701*c*. Alternatively, if a user needs further instructions on capturing relevant images, the user may select the "Next Hint" button 1701*d*.

Screen 1703 includes a window 1703*a* and associated instruction 1703*b* for capturing a different type of image. In this example, window 1703*a* and instruction 1703*b* direct a user to take images of an entire vehicle. As before, if a user is ready to capture the images, the user may select the "Take Photos" button 1703*c*. Alternatively, if a user needs further instructions on capturing relevant images, the user may select the "Next Hint" button 1703*d*.

Figure 18:
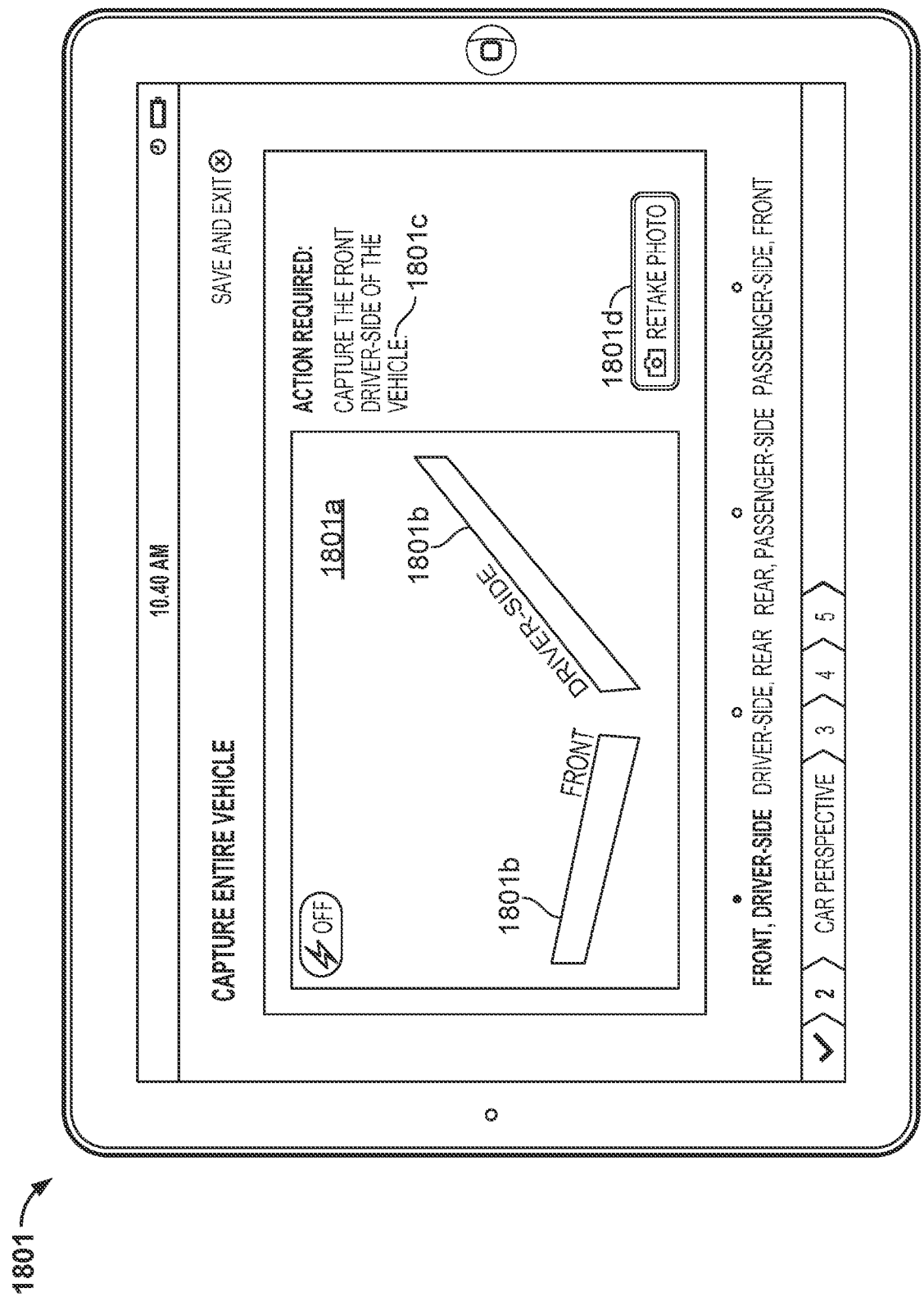
FIG. 18 shows a display screen with visual aids for aiding a user in properly positioning an imaging device associated with a user device to capture images related to damage of an insured item, in accordance with certain aspects of the present disclosure.

FIG. 18 shows a display screen with visual aids for aiding a user in properly positioning an imaging device associated with a user device to capture images related to damage of an insured item, in accordance with at least one aspect of the present disclosure. Screen 1801 may include a window 1801*a* with visual aids 1801*b* to aid a user in positioning an imaging device (e.g., a camera) associated with a user device (e.g., tablet, mobile phone, etc.) so that the imaging device correctly captures an image associated with instruction 1801*c*. In this particular example, window 1801*a* includes markers for positioning a camera so that the front and driver's side of a damaged vehicle appear in the proper location of an image. Once a camera is properly positioned, a user (e.g., an insurance agent associated with an entity managing enhanced claims processing server 101) may select the "Retake Photo" button 1801*d* (assuming a first but somehow defective version of this image had already been taken).

FIG. 19 shows two display screens displayed on a user device for displaying instructions related to capturing images for processing a claim associated with damage of an insured item, in accordance with at least one aspect of the present disclosure. In this particular example, screens 1901 and 1903 include images associated with a vehicle identification number (VIN) and odometer reading associated with a damaged vehicle. Screen 1901 includes a viewfinder window 1901*a* displaying an image of a VIN tag associated with a damaged vehicle. Screen 1901 also includes an instruction 1901*b* for capturing the VIN tag displayed in window 1901*a*. If a user (e.g., an insurance agent) is ready to capture an image displayed in viewfinder window 1901*a*, the user may select the "Retake Photo" button 1901*c* (assuming a first but somehow defective version of this image had already been taken). In alternative embodiments, a user may enter in a VIN through a keypad on a user device and/or may scan the VIN optically (e.g., as a barcode).

Meanwhile, screen 1903 includes a viewfinder window 1903*a* displaying an odometer reading associated with a damaged vehicle. Screen 1903 also includes an instruction 1903*b* for capturing the odometer reading displayed in window 1903*a*. If a user (e.g., an insurance agent) is ready to capture an image displayed in viewfinder window 1903*a*, the user may select the "Retake Photo" button 1903*d* (assuming a first but somehow defective version of this image had already been taken). Alternatively, if a user is satisfied with the image already captured for this step, the user may move to the next step by selecting the "Next Step" button 1903c.

FIG. 20 shows two display screens displayed on a user device for reviewing images depicting damage to an insured item, as captured by an imaging device, in accordance with at least one aspect of the present disclosure. Screen 2001 includes an image 2001a and instructions 2001b related to user review of captured images. Once a user (e.g., an insurance agent associated with an entity managing enhanced claims processing server 101, a potential customer/customer of an entity managing enhanced claims processing server 101) has reviewed and understood instructions 2001b, the user may select the "Continue" button 2001c.

Meanwhile, screen 2003 includes an image 2003a that depicts an insured item (e.g., a vehicle) and that has already been captured by an imaging device associated with a user device (e.g., a mobile phone, tablet, etc.). Screen 2003 also includes various options related to image 2003a; for instance, screen 2003 includes a "Remove" button 2003b for deleting image 2003a from a memory associated with the user device on which image 2003a is stored, a "Retake" button 2003c for recapturing image 2003a, and an "Add Photo" button 2003d for adding another photo related to damage associated with an insured item.

Figure 21:
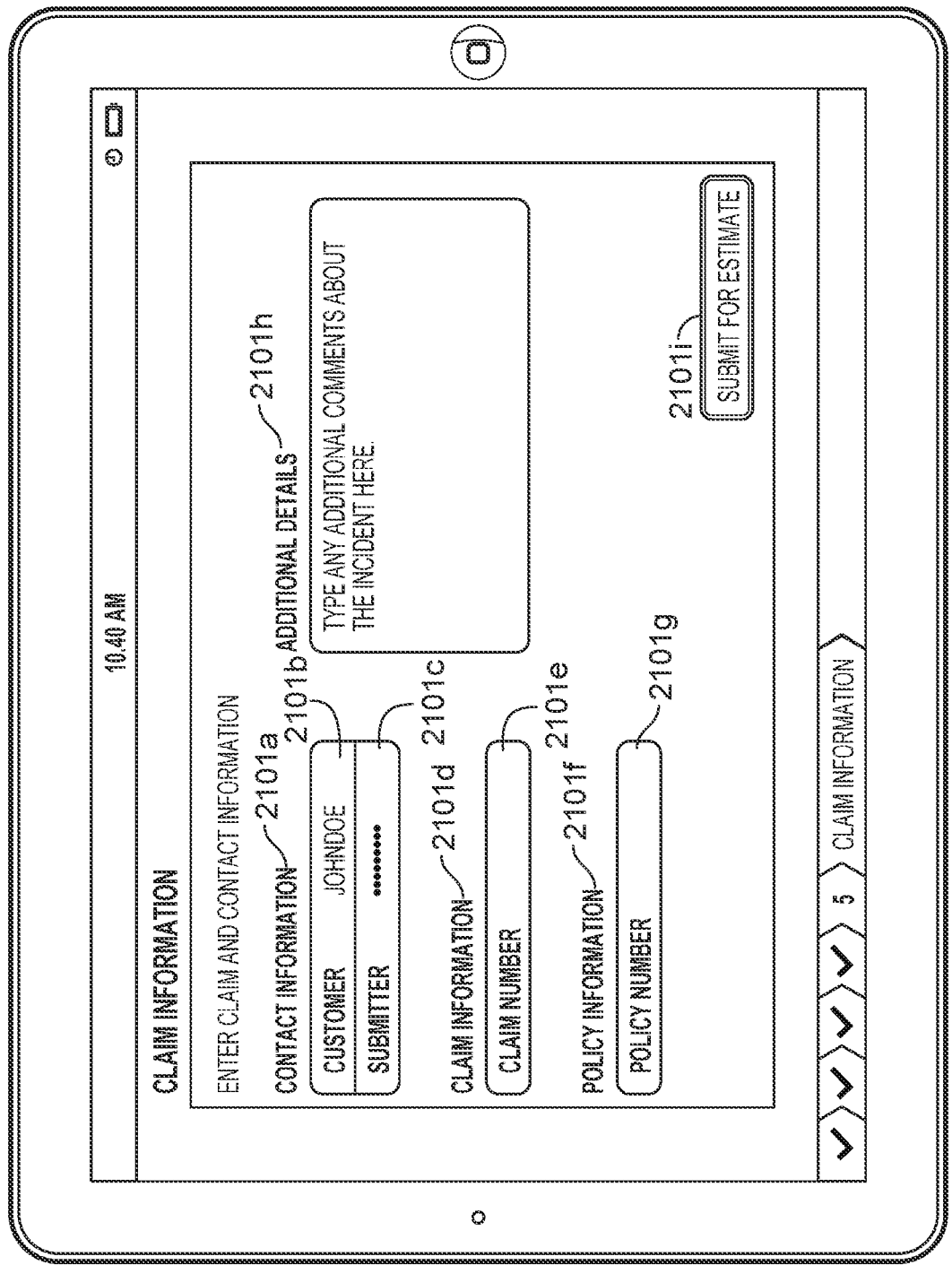
FIG. 21 shows a display screen displayed on a user device for displaying claim information associated with damage to an insured item, in accordance with certain aspects of the present disclosure.

FIG. 21 shows a display screen displayed on a user device for displaying claim information associated with damage to an insured item, in accordance with at least one aspect of the present disclosure. Screen 2101 includes a section 2101a for entering contact information associated with a claim, such as a customer name 2101b and a submitter name 2101c (e.g., an insurance agent associated with an entity managing enhanced claims processing server 101). Screen 2101 also includes a section 2101d for entering claim information such as a claim number 2101e associated with damage to an insured item and a section 2101f for entering policy information such as a policy number 2101g associated with an insurance policy covering damage to the insured item. Finally, screen 2101 may also include a section 2101h for adding additional details associated with the claim in question. These additional details may relate to special processing instructions, information on any of the images captured in relation to the claim, etc. Once all information has been entered, a user may select the "Submit for Estimate" button 2101i for submitting the claim for review by a claims adjuster.

It should be noted that one or more aspects of the above-described embodiments may be applied to various types of items that may or may not be insured, such as vehicles, homes, other properties, etc.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software but the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

What is claimed is:

1. An enhanced claims processing system comprising:
an enhanced claims processing data server at an insurance company, the enhanced claims processing data server comprising at least one processor and a memory storing computer-executable instructions, which when executed by the at least one processor, cause the at least one processor to:
  transmit, to a mobile device having a camera, instructions to display a plurality of photo categories, the plurality of photo categories including at least entire vehicle, VIN, and damaged area related to an insured item;
  receive, via a network and from the mobile device, a request for instructions relating to one or more of the plurality of photo categories;
  transmit, via the network and to the mobile device, instructions relating to the requested one or more of the plurality of photo categories, the transmitted instructions providing directions on capture of images corresponding to the respective photo category;
  present, on a display screen of the mobile device, a viewfinder for the camera;
  indicate a proper positioning for the capture of images within the viewfinder by presenting, on the display screen and within the viewfinder, a visual marker indicating a location at which to position at least a portion of a view of the insured item;
  receive, via the network and from the mobile device, a selection of the entire vehicle photo category and at least one entire vehicle digital photo;
  receive, via the network and from the mobile device, a selection of the VIN photo category and at least one VIN digital photo;
  receive, via the network and from the mobile device, damage data related to the insured item including a selection of the damaged area photo category and at least one damaged area digital photo;
  determine that the damage data is related to the insured item corresponding with an insured individual;
  retrieve, from a database, policy information data corresponding with the insured individual;
  analyze the damage data to determine damage information related to the insured item;
  analyze the policy information data;
  calculate, based on the policy information data and damage information, a projected change in premium and settlement amount;
  calculate, based on the policy information data and damage information, a projected settlement amount;
  determine, an overall monetary valuation based on the projected change in premium and the projected settlement amount;
  determine, based on the overall monetary valuation, an estimated benefit or detriment to the insured individual;
  determine, based on the estimated benefit or detriment to the insured individual, a recommendation regarding claim submission;
  transmit, via a network and to the mobile device of the individual, the recommendation regarding claim submission; and
  receive, via a network and from the mobile device of the individual, a claim submission determination.

2. The enhanced claims processing system of claim 1, wherein the at least one processor is further caused to:

based on determining that the damage data is not related to the insured item, transmit a request for external policy information data to the mobile device via a network;

receive, from the mobile device, the external policy information data; and analyze the external policy information data.

3. The enhanced claims processing system of claim 1, wherein the at least one processor is further caused to transmit, via a network, to the mobile device of the individual and based on the policy information data, upsell material data.

4. The enhanced claims processing system of claim 3, wherein the upsell material data includes at least one of information about new products and special promotions.

5. The enhanced claims processing system of claim 1, wherein the at least one processor is further caused to:

calculate an increase in premium based on the policy information data and the damage data; and transmit, via a network and to the mobile device of the individual, the calculated increase in premium.

6. The enhanced claims processing system of claim 1, wherein the damage data includes images of the damage to a portion of the insured item.

7. A method of providing a pre-claim consultation, the method comprising:

transmitting, by an enhanced claims processing data server and to a mobile device having a camera, instructions to display a plurality of photo categories, the plurality of photo categories including at least entire vehicle, VIN, and damaged area related to an insured item;

receiving, by the enhanced claims processing data server and from the mobile device, a request for instructions relating to one or more of the plurality of photo categories;

transmitting, by the enhanced claims processing data server, instructions to the mobile device relating to the requested one or more of the plurality of photo categories, the transmitted instructions providing directions on capture of images corresponding to the respective photo category;

presenting, on a display screen of the mobile device, a viewfinder for the camera;

indicating a proper positioning for the capture of images within the viewfinder by presenting, on the display screen and within the viewfinder, a visual marker indicating a location at which to position at least a portion of a view of the insured item;

receiving, by the enhanced claims processing data server and from the mobile device, a selection of the entire vehicle photo category and at least one entire vehicle digital photo;

receiving, by the enhanced claims processing data server and from the mobile device, a selection of the VIN photo category and at least one VIN digital photo;

receiving, by the enhanced claims processing data server and from the mobile device, damage data related to the insured item including a selection of the damaged area photo category and at least one damaged area digital photo;

determining, by the enhanced claims processing data server, the damage data is related to the insured item corresponding with an insured individual;

retrieving, by the enhanced claims processing data server, policy information data corresponding to the insured individual;

analyzing, by the enhanced claims processing data server, the damage data to determine damage information related to the insured item;

analyzing, by the enhanced claims processing data server, the policy information data;

calculating, by the enhanced claims processing server and based on the policy information data and damage information, a projected change in premium;

calculating, by the enhanced claims processing data server and based on the policy information data and the damage information, a projected settlement amount;

determining, by the enhanced claims processing data server, an overall monetary valuation based on the projected change in premium and the projected settlement amount;

determining, by the enhanced claims processing data server and based on the overall monetary valuation, an estimated benefit or detriment to the insured individual;

determining, based on the estimated benefit or detriment to the insured individual, a recommendation regarding claim submission;

transmitting, by the enhanced claims processing data server to the mobile device, the recommendation regarding claim submission; and receiving, via a network and from the mobile device, a claim submission determination.

8. The method of claim 7 further comprising:

based on determining that the damage data is not related to the insured item, transmitting a request for external policy information data to the mobile device via a network;

receiving, from the mobile device, the external policy information data; and analyzing the external policy information data.

9. The method of claim 7 further comprising:

transmitting, via a network to the mobile device of the individual and based on the policy information data, upsell material data.

10. The method of claim 9, wherein the upsell material data includes at least one of information about new products and special promotions.

11. The method of claim 7 further comprising:

calculating an increase in premium based on the policy information data and the damage data; and transmitting, via a network and to the mobile device of the individual, the calculated increase in premium.

12. A non-transitory computer-readable medium storing computer-executable instructions, that when executed by one or more processors of an enhanced claims data server of an enhanced claims processing system, cause the enhanced claims processing system to:

transmit, via a wireless network interface and to a mobile device having a camera, instructions to display a plurality of photo categories, the plurality of photo categories including at least entire vehicle, VIN, and damaged area related to an insured item;

receive, via the wireless network interface and from the mobile device, a request for instructions relating to one or more of the plurality of photo categories;

transmit, via the wireless network interface and to the mobile device, instructions relating to the requested one or more of the plurality of photo categories, the transmitted instructions providing directions on capture of images corresponding to the respective photo category;

present, on a display screen of the mobile device, a viewfinder for the camera;

indicate a proper positioning for the capture of images within the viewfinder by presenting, on the display screen and within the viewfinder, a visual marker indicating a location at which to position at least a portion of a view of the insured item;

receive, via the wireless network interface and from the mobile device, a selection of the entire vehicle photo category and at least one entire vehicle digital photo;

receive, via the wireless network interface and from the mobile device, a selection of the VIN photo category and at least one VIN digital photo;

receive, via the wireless network interface and from the mobile device, damage data related to the insured item including a selection of the damaged area photo category and at least one damaged area digital photo;

determine that the damage data is related to the insured item corresponding with an insured individual;

retrieve, from a database, policy information data corresponding with the insured individual;

analyze the damage data to determine damage information related to the insured item;

analyze the policy information data;

calculate, based on the policy information data and damage information, a projected change in premium;

calculate, based on the policy information data and damage information, a projected settlement amount;

determine, an overall monetary valuation based on the projected change in premium and the projected settlement amount determine, based on the overall monetary valuation, an estimated benefit or detriment to the insured individual;

determine, based on the estimated benefit or detriment to the insured individual, a recommendation regarding claim submission;

transmit, via a network and to the mobile device of the individual, the recommendation regarding claim submission; and receive, via a network and from the mobile device of the individual, a claim submission determination.

13. The non-transitory computer-readable medium of claim 12, the enhanced claims processing system further caused to:

based on determining that the damage data is not related to the insured item, transmit a request for external policy information data to the mobile device via a network;

receive, from the mobile device, the external policy information data; and analyze the external policy information data.

14. The non-transitory computer-readable medium of claim 12, further causing the enhanced claims processing system to transmit, via a network to the mobile device of the individual and based on the policy information data, upsell material data.

15. The non-transitory computer-readable medium of claim 14, wherein the upsell material data includes at least one of information about new products and special promotions.

16. The non-transitory computer-readable medium of claim 12, wherein the enhanced claims processing system is further caused to:

calculate an increase in premium based on the policy information data and the damage data; and transmit, via a network and to the mobile device of the individual, the calculated increase in premium.

17. The non-transitory computer-readable medium of claim 16, wherein the damage data includes images of the damage to a portion of the insured item.

* * * * *